(12) United States Patent
Abramov

(10) Patent No.: US 10,514,496 B2
(45) Date of Patent: Dec. 24, 2019

(54) IMPROVING SHAPED COMPONENT FOR AN ANTENNA COMPRISING A SHEAF OF UNCLAD WAVEGUIDE BEAM-MAKERS COMPOSED OF GENERALIZED UNCLAD WAVEGUIDES AND PARABOLIC REFLECTORS

(71) Applicant: SOLITON HOLDINGS CORPORATION, DELAWARE CORPORATION, New York, NY (US)

(72) Inventor: Yuri Abramov, Holon (IL)

(*) Notice: Subject to any disclaimer, the term of this patent is extended or adjusted under 35 U.S.C. 154(b) by 0 days.

(21) Appl. No.: 15/982,483

(22) Filed: May 17, 2018

(65) Prior Publication Data
US 2018/0372949 A1    Dec. 27, 2018

(30) Foreign Application Priority Data

Jun. 21, 2017  (GB) .................................. 1709904.5
Feb. 2, 2018   (GB) .................................. 1801732.7
Feb. 21, 2018  (AU) ................................ 2018201267

(51) Int. Cl.
   *G02B 6/10*      (2006.01)
   *H02S 40/22*     (2014.01)
   (Continued)

(52) U.S. Cl.
   CPC ............... *G02B 6/102* (2013.01); *B64G 1/66* (2013.01); *F24S 23/12* (2018.05); *G01H 17/00* (2013.01);
   (Continued)

(58) Field of Classification Search
   CPC ..... B64G 1/407; H02S 40/20; G02B 19/0042; G02B 19/0038; G02B 6/102; G02B 6/2852; G02B 6/0006; G02B 6/001; G02B 6/06; G02B 6/262; G02B 6/4249; G02B 6/30; G10K 11/20; F24S 23/12; F24S 23/71; H01Q 19/18; H01Q 3/01; G02F 1/0118; G02F 1/2252
   (Continued)

(56) References Cited

U.S. PATENT DOCUMENTS 4,117,829 A    10/1978  Gross et al.
4,297,000 A    10/1981  Fries
   (Continued)

FOREIGN PATENT DOCUMENTS

GB    2287122 A    9/1995
GB    2485332 A    5/2012
   (Continued)

*Primary Examiner* — Que Tan Le
(74) *Attorney, Agent, or Firm* — Marc Van Dyke; Fourth Dimension IP

(57) ABSTRACT

The invention provides an improved method and apparatus, in general, for a use of a sheaf of unclad waveguide beam-makers to provide for a multi-stage forcedly-conveying waveguide effect of waveguide fibers in combination with the self-focusing waveguide effect of parabolic antennas, on the one hand, to absorb the ambient radiation, and in particular, for sunlight rays energy absorption to detect and transform the energy into either warmth, or electrical power, or mechanical thrust, and, on the other hand, to transmit the wave-energy through a homogeneous poorly-permeable medium.

15 Claims, 19 Drawing Sheets

(51) Int. Cl.
*F24S 23/00* (2018.01)
*G01H 17/00* (2006.01)
*G02B 19/00* (2006.01)
*G10K 11/20* (2006.01)
*G10K 11/24* (2006.01)
*B64G 1/66* (2006.01)
*F24S 23/71* (2018.01)
*B64G 1/40* (2006.01)
*H01Q 1/28* (2006.01)
*H01Q 3/01* (2006.01)
*H01Q 19/18* (2006.01)

(52) U.S. Cl.
CPC ..... *G02B 19/0019* (2013.01); *G02B 19/0042* (2013.01); *G02B 19/0076* (2013.01); *G10K 11/20* (2013.01); *G10K 11/24* (2013.01); *H02S 40/22* (2014.12); *B64G 1/407* (2013.01); *F24S 23/71* (2018.05); *H01Q 1/28* (2013.01); *H01Q 3/01* (2013.01); *H01Q 19/18* (2013.01)

(58) Field of Classification Search
USPC .......................................... 250/203.4, 227.11
See application file for complete search history.

(56) References Cited

U.S. PATENT DOCUMENTS

| | | | |
|---|---|---|---|
| 4,387,954 A * | 6/1983 | Beasley | G02B 6/2826 356/73.1 |
| 4,798,444 A | 1/1989 | McLean | |
| 4,974,922 A | 12/1990 | Mori | |
| 5,089,055 A | 2/1992 | Nakamura | |
| 6,467,969 B1 * | 10/2002 | Shmulovich | G02B 6/245 385/49 |
| 2011/0232719 A1 | 9/2011 | Freda | |
| 2012/0154941 A1 | 6/2012 | Zalevsky et al. | |
| 2013/0118550 A1 | 5/2013 | Sahin | |
| 2015/0255658 A1 | 9/2015 | Morgan et al. | |
| 2016/0276514 A1 | 9/2016 | Simavoryan et al. | |
| 2016/0336467 A1 | 11/2016 | Janet | |
| 2018/0017227 A1 | 1/2018 | Greene et al. | |

FOREIGN PATENT DOCUMENTS

WO     9211495 A1    7/1992
WO    2009028868 A2   3/2009

* cited by examiner

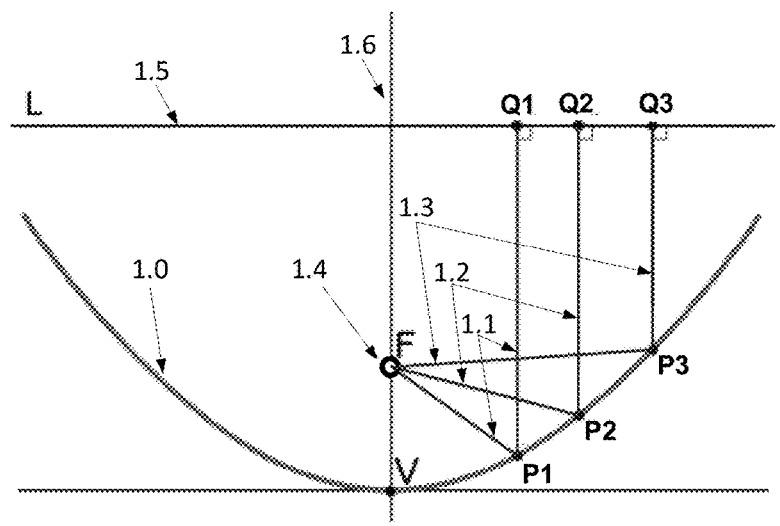
Prior Art Fig. 1a
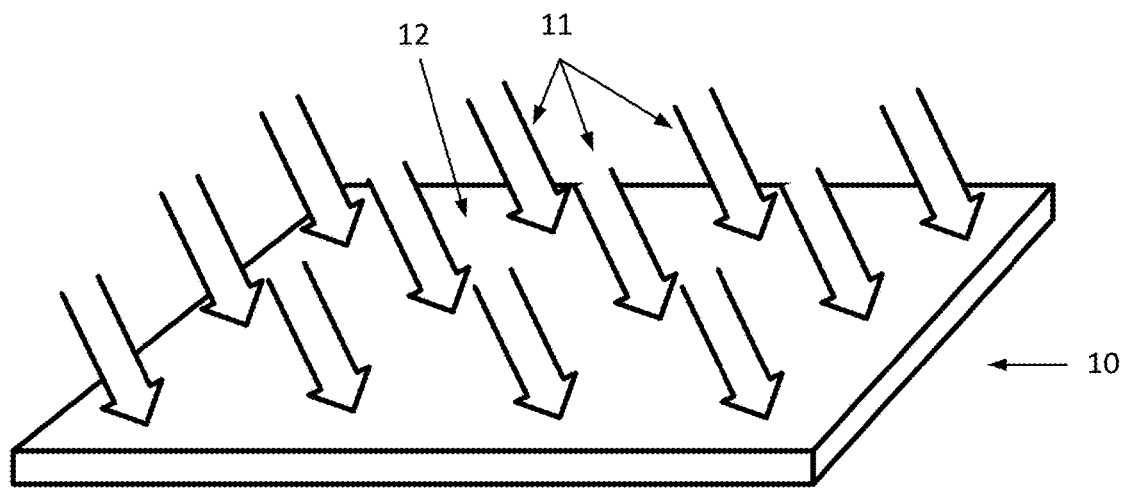
Prior Art Fig. 1b

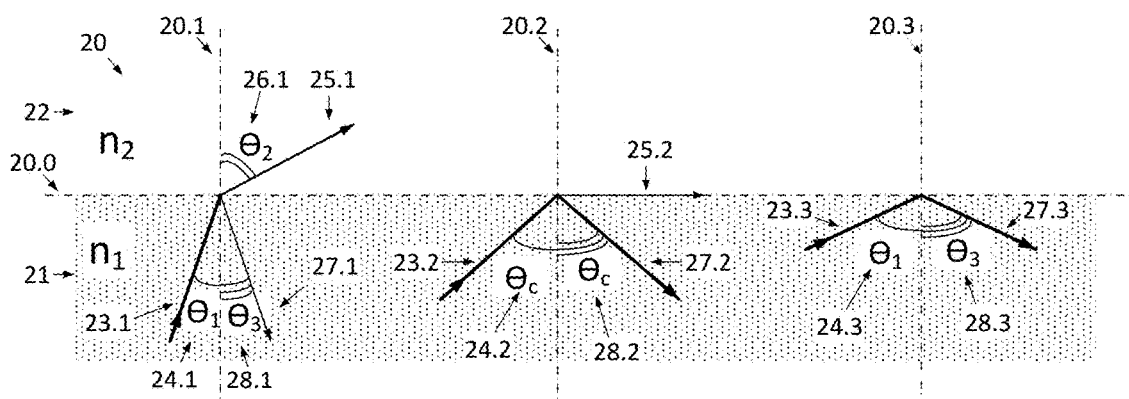
Prior Art Fig. 2a
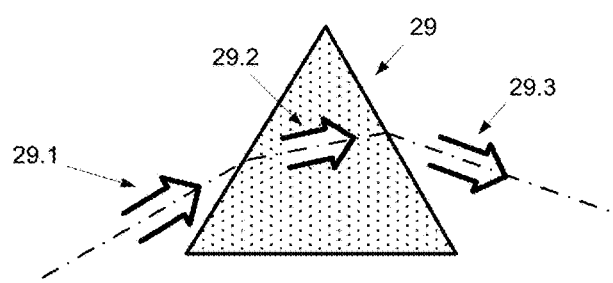
Prior Art Fig. 2b

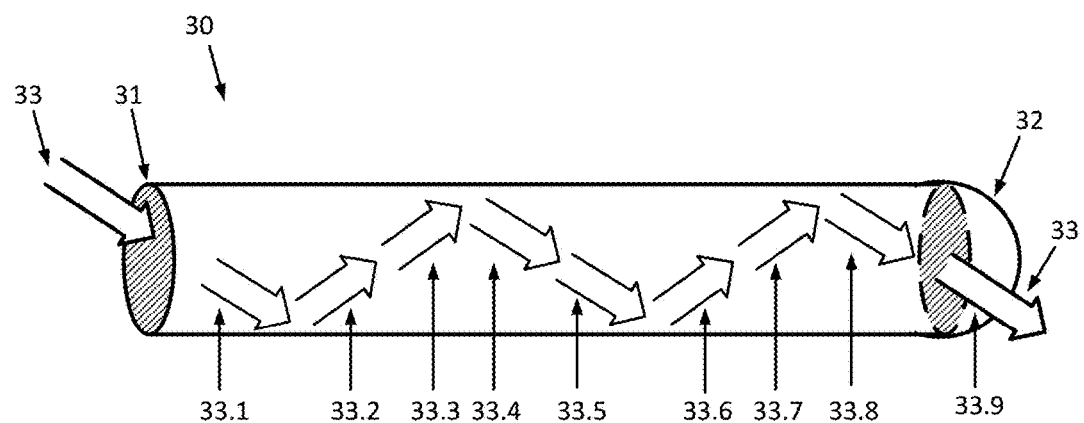
Prior Art Fig. 3a
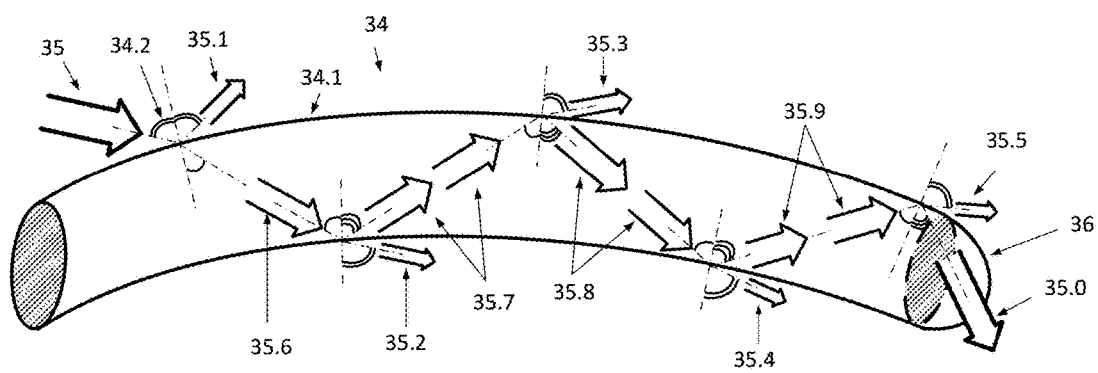
Prior Art Fig. 3b

IMPROVING SHAPED COMPONENT FOR AN ANTENNA COMPRISING A SHEAF OF UNCLAD WAVEGUIDE BEAM-MAKERS COMPOSED OF GENERALIZED UNCLAD WAVEGUIDES AND PARABOLIC REFLECTORS

FIELD OF THE INVENTION

The present disclosure relates generally to use of a multi-stage waveguide effect in combination with the focusing effect of parabolic reflectors, and more specifically, to use of a sheaf of a multiplicity of unclad waveguides supplied with interface parabolic reflectors to concentrate and control the wave energy, and, in particular,
- to use a sheaf of a big number of optical fibers in solar power systems such as solar thermal collector, and/or photovoltaic system, and/or solar sail;
- to use a sheaf of a big number of dielectric fibers in RF antennas;
- to use a sheaf of a big number of elastic fibers in a transformer of the acoustic wave power; and
- to use a sheaf of a big number of self-bordering (i.e., in this sense, imaginary) waveguides in complicatedly shaped parabolic antennas;

wherein in all the cases, each of the waveguides being supplied with a parabolic reflector.

BACKGROUND OF THE INVENTION

The following issued patents and patent publications provide potentially relevant background material and are all incorporated by reference in their entirety: U.S. Pat. No. 4,974,922 A (Mori), WO92/11495A1 (Moeller), GB2485332 A (Melling), GB2287122 A (Gregson), U.S. Pat. No. 4,798,444 A (McLean), US 20120154941 A1 (Zalevsky), U.S. Pat. No. 5,089,055 A (NAKAMURA TAKASHI), WO 2009/028868 A2 (O SE DAE) US 20150255658 A1 (MORGAN), 20160276514 A1 (Simavoryan), 20160336467 A1 (JANET), US2011/0232719 A1 (FREDA), US2013/0118550 A1 (SAHIN), U.S. Pat. No. 4,117,829 (GROSS), and 20180017227 A1 (Prins).

TERMINOLOGY

For the purposes of the present patent application, the term "propagating wave" or "wave" is defined as, commonly known in physics, an oscillation accompanied by a transfer of energy that travels through a medium being at least one of vacuum and matter. The term "wave" should be understood as generalized in a wide sense including:
- an electromagnetic wave, being at least one of a radio frequency (RF) electromagnetic wave and an electromagnetic radiation as sunlight, including infrared, visible, and ultraviolet light; and
- an elastic wave, frequently called an acoustic or sound wave, for instance, ultrasound.

The wave-front, defined as a surface of an equal phase, propagates in accordance with the Huygens-Fresnel principle saying that every point, which a wave-front disturbance reaches, becomes a source of a secondary spherical wave, wherein the interference superposition of these secondary waves determines the form of the wave at any subsequent time.

For the purposes of the present patent application, the term "waveguide effect" should be understood in a wide sense as a tendency of wave beam propagation along and within a certain spatial wave-conveying corridor, i.e. along and within a portion of medium being bordered by a generalized shell reflecting and/or deflecting a wave beam; wherein the wave beam reflecting and/or deflecting generalized shell is implemented as either:
- real solid walls, and/or
- imaginary walls formed by jumping changes of spatial physical parameters of the medium, and/or, in a widened sense,
- imaginary walls, predetermined by propagation and superposition of wave portions in accordance with the Huygens-Fresnel principle and defined as a spatial boundary separating a portion of medium, being subjected to the propagation of the wave beam, from a portion of the medium, being free from the propagation of the wave beam; in other words, the imaginary walls are formed by superposition of wave portions of a beam of rays causing constructive-destructive interference and thereby resulting in jumping changes of an interference map pattern associated with the beam of rays.

Correspondingly, the term "waveguide" should be understood in a wide sense a portion of medium, transparent for a wave beam, wherein the portion of medium being bordered by the wave beam reflecting and/or deflecting generalized shell, i.e. the term "waveguide" should be understood as generalized, relating to different kinds of waveguides, either dielectric, capable of conveying the electromagnetic radiation, or acoustic, capable of conveying the elastic waves.

Further, for the sake of concretization only and without loss of generality, the electromagnetic waves, electromagnetic waveguides, and antennas of electromagnetic radiation will be discussed dominantly, which will be further translated into acoustic applications.

For the purposes of the present patent application, the term "homogeneous medium" should be understood as medium, characterized by a certain density, elasticity, viscosity, dielectric constant, and electrical conductivity, which (the medium) when being subjected to penetration of a wave, has non-homogeneousness fragments (i.e. heterogeneousness) of a size much smaller than the wavelength of the penetrating wave. Correspondingly, a non-homogeneousness spot within a dominantly homogeneous medium is defined as a non-homogeneousness of at least one of the density, elasticity, viscosity, dielectric constant, and electrical conductivity, wherein the non-homogeneousness spot has a linear size at least commensurate with the wavelength of the penetrating wave.

For the purposes of the present patent application, the term "homogeneous lossy medium" should be understood as a matter being poorly-permeable for the penetrating wave, wherein:
- in relation to the sunlight propagating through dominantly dielectric air, a well-known phenomenon of the sky was taking on a blueish tint is explained by so-called Rayleigh scattering of sunlight in the atmosphere; namely, the Rayleigh scattering refers to the scattering of light off the molecules of the air and can be extended to Rayleigh-like scattering from medium heterogeneousness up to about a tenth of the wavelength of electromagnetic wave; thereby, the effect of Rayleigh scattering causes, in particular, that the scattered light is enriched with an ultraviolet component of sunlight, and vice-versa, the ultraviolet component of sunlight rays directly reaching the Earth's surface through the atmosphere becomes depleted;
- in relation to the conductive medium, the non-zero electrical conductivity causes the dissipation of electromagnetic wave energy due to partial transforming of the electromagnetic wave energy into the energy of oscillating electrical current within the homogeneous conductive medium, wherein the oscillating electrical current, in turn, on the one hand, becoming scattered within the homogeneous conductive medium, and, on the other hand, becoming a source of the secondary electromagnetic waves, i.e. becoming partially transformed back into reincarnated electromagnetic waves, scattered within the homogeneous conductive medium as well; wherein, in the final analysis, the scattered energy of oscillating electrical current becomes transformed into the heat energy of the homogeneous medium due to the so-called Joule heating, also known as ohmic heating and resistive heating; and in relation to the elastic viscous medium, the viscosity causes the dissipation of the penetrating acoustic wave energy.

Thus, in particular, the dominantly dielectric air and the conductive seawater, both scatter a part of the electromagnetic wave energy and thereby dissipate the electromagnetic wave energy into the warmth. In this sense, the dominantly dielectric air, comprising the molecular heterogeneousness, and the conductive seawater, dissipating electromagnetic waves, both are called "homogeneous lossy medium".

In contrast, the term "homogeneous easily-permeable medium" should be understood as the homogeneous medium, either:

the conductivity of which is negligible to interact with the penetrating electromagnetic wave substantially, or the viscosity of which is negligible to interact with an acoustic wave substantially.

For the purposes of the present patent application, the term "RF signal" is applied to RF oscillating electrical current and voltage within a wire-conductor, and, furthermore, is applied to the RF electromagnetic wave and RF oscillating electrical current, both propagating, partially inter-reincarnating, and becoming scattered and, thereby, dissipating in the homogeneous medium; wherein the homogeneous medium being conductive and thereby scattering and further partially transforming the RF signal energy into the warmth, and, in this sense, being lossy.

For the purposes of the present patent application, the term "antenna" should be understood in a wide sense as a shaped transducer designed to transmit and/or receive different kinds of waves propagating wirelessly through a medium, namely, to transmit and/or receive, correspondingly, either:

electromagnetic waves, including, in particular, RF electromagnetic waves and electromagnetic waves as sunlight, i.e. in particular, infrared, visible, and ultraviolet light; or acoustic waves, including ultrasound.

Wherein, for the purposes of the present patent application, the term "feed of antenna" should be understood as commonly known in telecommunications, electronics, optics, and acoustics, namely, an antenna feed refers to the components of an antenna, which, in the case of a transmitting antenna, feed the waves, either electromagnetic or acoustic, to the rest of the antenna structure; or, in the case of a receiving antenna, collects the intensities (wave-power) of incoming waves, either electromagnetic or acoustic, convert the intensities into either electric and/or heat power to convey the power to a receiver.

Antennas of electromagnetic waves are widely used, for instance:

Antennas of RF electromagnetic waves are widely used in RF radars for scanning as open space;

Antennas of RF electromagnetic waves are used also in so-called ground penetrating radars (GPR) for scanning an underground space;

A large-scale optical antenna receiving sun's rays, i.e. electromagnetic light waves, is an inherent constructive solution for a well-known solar power tower; wherein the large-scale optical antenna comprises an array of relatively small, flat, movable mirrors to focus the sun's rays upon a collector tower.

Antennas of acoustic waves are used in sonars.

Transmitting and receiving antennas, in radio engineering, frequently called Tx-antenna and Rx-antenna, correspondingly, are evidently differ as inverse-operating. The Tx-antennas and Rx-antennas, both may differ in property of directivity. One distinguishes between:

a narrow-directional antenna, frequently called directional antenna, or beam antenna, or high-gain antenna; and a wide-directional antenna, also called and specified as a wide-angle directional antenna, or low-gain antenna, or omnidirectional antenna.

A geometrical shape of antenna primarily defines the directivity, and more sophisticated phased-array antennas have a controllable directivity. Either narrow-directional and/or wide-directional either Tx- and/or Rx- and/or reflecting (i.e. retranslating) antennas are appropriate for different purposes.

One of the primary advantages of a use of shaped antennas to transmit electromagnetic energy on a long distance in space is a possibility to use the property of electromagnetic waves to propagate in vacuum thereby allowing to avoid a use of either long wire-conductors for RF waves and/or optical fibers for electromagnetic light waves.

A principal disadvantage of the use of antennas is that in reality, on the one hand, compact antennas of RF waves have restricted so-called gain of antenna, and on the other hand, the ambient surroundings comprise a lossy matter: either gaseous (for instance, dominantly dielectric air), and/or liquid (for instance, conductive water), and/or solid (for instance, conductive ground), and/or combined comprising solid and fluid fragments, wherein sometimes the ambient matter is a poorly-permeable medium.

Parabolic Antenna as Self-Bordering Waveguide

Prior Art FIG. 1a is a schematic illustration of parallel rays focusing caused by a reflection from a parabolic reflector. A narrow-directional parabolic antenna is an antenna that uses a parabolic reflector, a curved surface with the cross-sectional shape of a parabola, to direct the radio waves. The most common form is shaped like a dish and is popularly called a dish antenna or parabolic dish. As well, toroidal parabolic trough is frequently used as the parabolic reflector.

The main advantage of a parabolic antenna is that it has high directivity. It functions similarly to a searchlight or flashlight reflector:

to parallelize-and-direct the radio waves in a narrow beam, or, vice versa, to receive parallelized radio waves from one particular direction only.

Parabolic antennas are based on the geometrical property of the paraboloid 1.0 that the paths F-P1-Q1 1.1, F-P2-Q2 1.2, and F-P3-Q3 1.3 are all the same length.

Considering a wave, being launched from an antenna feed located at the dish's focus F 1.4 and having a spherical wave-front propagating in accordance with the Huygens-Fresnel principle, the self-bordering waveguide effect is implemented using the specific shaping of paraboloid dish 1.0 acting on the wave-front causing a spatial modulation and reflection of the wave such that the further wave propagation, marked by portions P1-Q1, P2-Q2, and P3-Q3, becomes parallelized and self-focused in a certain direction.

Thus, a spherical wave-front emitted by an antenna feed at the dish's focus F 1.4 will be reflected in an outgoing plane wave L 1.5 traveling parallel to the dish's axis VF 1.6. Thereby spatially modulated wave has a tendency of self-wave-guiding resulting in an increased gain. Parabolic antennas have some of the highest gains, that is, they can produce the narrowest beam-widths, of any antenna type operating in vacuum. In order to achieve narrow beam-widths, the parabolic reflector must be much larger than the wavelength of the radio waves used. So to provide an appropriate trade-off between the beam-width and the diameter of the parabolic reflector, the parabolic antennas are used in the high-frequency part of the radio spectrum, at ultra-high frequency (UHF) and microwave (SHF) frequencies, at which the wavelengths are small enough that conveniently-sized reflectors can be used. Evidently, parabolic antennas are well-applicable to sunlight, i.e. in particular, to infrared, visible, and ultraviolet light.

An advantage of parabolic antennas is that most of the structure of the antenna is non-resonant, so it can function over a wide range of frequencies, that is a wide bandwidth. All that is necessary to change the frequency of operation is to replace the antenna feed with one that works at the new frequency. Some parabolic antennas transmit or receive at multiple frequencies by having several feeds of antenna mounted at the focal point, close together.

The directive quality of an antenna is measured by a dimensionless parameter, so-called "gain", which is the ratio of the power received by the antenna from a source along its beam axis to the power received by a hypothetical isotropic antenna. The gain of a parabolic antenna, indicated by G, is:

$$G = \frac{4\pi A}{\lambda^2} e_A = \frac{4\pi A \varepsilon}{\lambda_0^2} e_A = \left(\frac{\pi d}{\lambda}\right)^2 e_A = \left(\frac{\pi d \sqrt{\varepsilon}}{\lambda_0}\right)^2 e_A \quad \text{(Eq. 1)}$$

where:

A is the area of the antenna aperture, that is, the mouth of the parabolic reflector. For a circular dish antenna, $A=\pi d^2/4$, giving the third and fourth expressions in equation (1);

d is the diameter of the parabolic reflector, if it is circular;

$\varepsilon$ is the dimensionless dielectric constant of the environment matter;

$\lambda_0$ is the wavelength of the radio waves in vacuum;

$\lambda$ is the wavelength of the radio waves in an environment matter, wherein $\lambda$ interrelates with $\lambda_0$ as follows: $\lambda=\lambda_0/\sqrt{\varepsilon}$; and $e_A$ is a dimensionless parameter between 0 and 1 called the aperture efficiency. The aperture efficiency of typical parabolic antennas is 0.55 to 0.70.

Thus, in the final analysis, each portion of the paraboloid dish 1.0, and so the paraboloid dish 1.0 as a whole, gathers the multiplicity of rays, emitted radially by the feed located at the dish's focus F 1.4 and subjected to the specific spatial modulation, into a beam of rays as a multiplicity of the parallelized rays, self-bundled into a sheaf self-bordered by an imaginary shell having a cylindrical-like shape having a cross-section in a frontal plane determined by the projection the considered portion of the paraboloid dish 1.0 on the frontal plane, wherein the self-originated waveguide effect, i.e. the self-bundling and self-bordering, is provided by the Huygens-Fresnel principle of beam propagation in a homogeneous medium.

The inventor points out that the property of a parabolic reflector to "bundle" and "border" and, thereby, to direct a narrow beam in vacuum is interpreted as the self-wave-guiding by a spatial modulation based on the Huygens-Fresnel principle of beam propagation in a homogeneous medium, and, thereby, the portion of parabolic reflector itself and the associated imaginary shell of the narrow beam, together as a whole is interpreted as a self-focusing waveguide.

The self-wave-guiding property depends on:
the parabolic portion geometry and size, and
on permeability of a homogeneous medium.

However, on the one hand, the antenna gain G is limited, and on the other hand, the self-wave-guiding property is degrading in a lossy medium and especially in a conductive lossy medium, for instance, in seawater.

There is, therefore, a need in the art for a method and apparatus to provide an improved self-wave-guiding performance of an antenna operating in a lossy medium.

Looking ahead, in view of the description of subparagraph "Useful Derivative Idea: Self Wave-Guiding in Homogeneous Lossy Medium" referring to FIG. 8*d* and of subparagraph "Further Derivative Idea: Self-Wave-Guiding Parabolic Antennas" referring to FIG. 9*a* of the invention, it will become evident to a person studied the present invention that a use of a complicated spatially modulated beam of rays, formed by a sheaf of a big number of the self-focusing waveguides each of which comprising a portion of a parabolic reflector (wherein the complicated spatially modulated beam of rays is composed of a multiplicity of sub-beams differing in phase of wave-fronts in a cross-sectional plane such that the sub-beams, when propagating and multi-stage inter-swopping their portions superposing in accordance with the Huygens-Fresnel principle, becoming self-bundled), provides for enhanced self-wave-guiding (i.e. self-bundling into a sheaf self-bordered by an imaginary cylindrical-like shell) of the complicated and spatially modulated beam of rays as a whole.

Sunlight Electromagnetic Energy

The Sun is an exemplary source of electromagnetic radiation and sunlight is a portion of the electromagnetic radiation given off by the Sun, in particular, infrared, visible, and ultraviolet light. On Earth, sunlight is filtered through Earth's atmosphere and is obvious as daylight when the Sun is above the horizon. When the direct solar radiation is not blocked by clouds, it is experienced as the sunshine, a combination of bright light and radiant heat. When it is blocked by the clouds or reflects off other objects, it is experienced as diffused light.

The total amount of energy received at ground level from the Sun at the zenith depends on the distance to the Sun and thus on the time of year. It is about 3.3% higher than average in January and 3.3% lower in July. If the extraterrestrial solar radiation is around 1367 watts per square meter, then the direct sunlight at Earth's surface when the Sun is at the zenith is about 1050 W/m², but the total amount (direct and scattered) hitting the ground is around 1120 W/m². In terms of energy, sunlight at Earth's surface is around 52 to 55 percent infrared (above 700 nm), 42 to 43 percent visible (400 to 700 nm), and 3 to 5 percent ultraviolet (below 400 nm). At the top of the atmosphere, sunlight is about 30% more intense, having about 8% ultraviolet (UV), with most of the extra UV consisting of biologically-damaging shortwave ultraviolet.

A well-known phenomenon of the sky was taking on a bluish tint is explained by so-called Rayleigh scattering of sunlight in the atmosphere. The Rayleigh scattering refers to the scattering of light off the molecules of the air and can be extended to Rayleigh-like scattering from medium heterogeneousness up to about a tenth of the wavelength of the electromagnetic wave. The effect says, in particular, that the scattered light is enriched with an ultraviolet component of sunlight, and vice-versa, the ultraviolet component of sunlight rays directly reaching the Earth's surface becomes depleted.

A well-known phenomenon of human tan on the background of fresh snow. The effect says, in particular, that the ultraviolet component of sunlight coming from the fresh snow is more intensive than the ultraviolet component of sunlight coming with the direct sunrays.

Absorption of Electromagnetic Radiation Energy

Absorption of electromagnetic radiation energy is the way in which the energy of a photon is taken up by matter, typically the electrons of an atom. Thus, the electromagnetic energy is transformed into internal energy of the absorber, for example, thermal energy. An efficacy of the absorption depends, in particular, on the efficacy of an Rx-antenna used for the purpose.

Prior Art FIG. 1b illustrates schematically a well-known sunlight-absorbing flat panel 10, having surface 12 exposed to sunlight rays 11 to absorb the sunlight electromagnetic energy. The sunlight-absorbing panel 10 is a trivial Rx-antenna, which may be either:

A mirror, reflecting sunlight rays to a point on a solar power tower;

A solar thermal collector converting sunlight rays 11 into warmth; or

A photovoltaic system (briefly, PV system) converting sunlight rays 11 into electricity due to the photovoltaic effect;

wherein the introduced terms "a solar thermal collector" and "a photovoltaic system" are further detailed hereinbelow in subparagraphs "Solar thermal collector" and "Photovoltaic (PV) system", correspondingly.

Solar Thermal Collector

A solar thermal collector is a device for capturing solar radiation. The term "solar collector" commonly refers to solar hot water panels but may refer to installations such as solar parabolic troughs, focusing sunlight rays along a tube, or parabolic dishes, focusing sunlight rays at a point on a solar power tower, or basic installations such as solar air heaters. Concentrating solar power plants, usually, use more complex collectors to generate electricity either by heating a fluid to drive a turbine connected to an electrical generator or, alternatively, by heating a matter in a thermo-photovoltaic (TPV) system providing for a direct conversion process from the heat to electricity via photons.

Photovoltaic (PV) System

The photovoltaic effect is the creation of voltage or electric current in a material upon exposure to light and is a physical and chemical phenomenon. The standard and obvious photovoltaic effect is directly related to the photoelectric effect, though they are different processes. When the sunlight or any other light is incident upon a material surface, the electrons present in the valence band absorb energy and, being excited, jump to the conduction band and become free. The chemical bonds of the material are vital for the process to work, as crystallized atoms are ionized and create a chemical electric imbalance, driving the electrons. These highly excited, non-thermal electrons diffuse, and some reach a junction where they are accelerated into a different material by a built-in potential (Galvani potential). This generates an electromotive force, and thus some of the light energy is converted into electric energy.

The quantity of solar energy striking the Earth's surface (solar constant) averages about 1,000 watts per square meter under clear skies, depending on weather conditions, location, and orientation. Efficacy of sunlight-absorbing panel 10 depends on an Illuminance quantifying how much the incident sunlight rays 11 illuminate sunlight-absorbing panel 10 and on the area of sunlight-absorbing panel 10's surface 12 exposed to sunlight rays 11. When light rays 11 fall obliquely to surface 12 to be illuminated, the illumination is reduced in proportion to the cosine of the angle of incidence of sunlight rays 11. Hence, the useful output of sunlight-absorbing panel 10 depends on orientation (if stationary, then preferable to the South), a tilt angle (if stationary, then between 30 and 45 degrees from horizontal), and tracking after the Sun.

Thereby, an efficacy of sunlight-absorbing panel 10 is restricted by a footprint area and by adaptation to the relative motion of the Sun. Furthermore, the efficacy of panel sunlight-absorbing 10 is restricted by the ultraviolet component of sunlight coming with the sunrays.

All the said in relation to the efficacy of sunlight-absorbing panel 10 is relevant if sunlight-absorbing panel 10 is functioning as sunlight-reflecting mirror redirecting the sunlight rays to a point on a solar power tower.

There is, therefore, a need in the art for a method and apparatus to provide an improved performance of an antenna operating for the sunlight energy absorption and/or reflection.

Radiation Pressure

Radiation pressure is the time-averaged pressure exerted upon any surface exposed to electromagnetic radiation. The radiation pressure implies an interaction between electromagnetic radiation and bodies of various types, including clouds of particles or gases. The electromagnetic radiation pressure is determined in Maxwell's theory by the so-called Poynting vector or, strictly speaking, the time-averaged Poynting vector. Considering an electromagnetic wave, the Poynting vector is proportional to the vector multiplication of the electrical field by the magnetic field of the electromagnetic wave, so the time-averaged Poynting vector is oriented to the direction of electromagnetic wave propagation and the magnitude of the time-averaged Poynting vector is proportional to the time-averaged intensity of the electromagnetic wave. The forces generated by the radiation pressure are generally too small to be detected under everyday circumstances; however, they do play a crucial role in some settings, such as astronomy and astrodynamics; furthermore, for example, a so-called solar sail of spacecraft is based on the effects of the Sun's radiation pressure.

In acoustics, acoustic radiation pressure, called also sound radiation pressure or, briefly, sound pressure, is the time-average excess pressure on an obstacle exposed to the sound. The acoustic radiation pressure is determined by the pulse wave transmitted per unit time per unit area of obstruction and determined by the so-called Umov-Poynting vector, as the Poynting vector, but generalized for the case of acoustic waves propagating in a homogeneous elastic fluid medium. A redirection of the Umov-Poynting vector results in the acoustic radiation pressure, in particular:

The acoustic radiation pressure generated by the acoustic beam:
   having a confined front area of a plane wave,
   propagating in an infinite undisturbed environment, and
   being incident on a fully reflecting flat surface at the right angle,
(i.e. when the Umov-Poynting vector is subjected to redirection on 180°) is called Langevin radiation pressure; and At normal incidence on a flat surface fully reflecting a portion of an omnidirectional sound (i.e. when the Umov-Poynting vector is subjected to omnidirectional scattering, caused by non-linearity of the medium, resulting in the effective redirection of the scattered Umov-Poynting vector on 180°), the acoustic radiation pressure is called Rayleigh radiation pressure.

The pressure of sound radiation is the effect of the second order; so, in zero gravity, one can design an acoustic pusher for stabilizing objects in indoor space and for pumping of fluids.

Refractive Index, Total Internal Reflection, and Critical Angle

Prior Art FIG. 2a illustrates schematically a diagram 20 of refractions and reflections of optic rays.

In optics, the refractive index or index of refraction n of a material is a dimensionless number that describes how light propagates through that medium. It is defined as n=c/u, where c is the speed of light in vacuum and u is the phase velocity of light in the medium. For example, the refractive index of water is 1.333, meaning that light travels 1.333 times faster in a vacuum than it does in water.

Considering electromagnetic waves, having a wavelength much greater than a spatial discrete of the medium (i.e. the distance between molecules), the refractive index n is defined as $n=\sqrt{\epsilon\mu}$, where $\epsilon$ is dimensionless dielectric constant and $\mu$ is dimensionless magnetic permeability. For distilled water, $\mu=1$ and $\epsilon=81$.

Two mediums: 21 and 22, differ in refractive index are imaginarily separated by boundary 20.0. Medium 21 is characterized by the refractive index $n_1$, and medium 22 is characterized by the refractive index $n_2$, wherein the condition $n_1>n_2$ is satisfied. Three optic rays propagating in medium 21 and incident on boundary 20.0, namely, 23.1, 23.2, and 23.3 are shown schematically.

Ray 23.1 incidents on boundary 20.0 under an angle of incidence marked by arc 24.1 equal to $\theta_1$ with respect to imaginary axis 20.1 perpendicular to boundary 20.0. When crossing boundary 20.0 between two mediums: 21 and 22, ray 23.1 becomes divided into two rays: 25.1, refracted on angle marked by double arc 26.1 equal to $\theta_2$, and 27.1, reflected on angle marked by triple arc 28.1 equal to $\theta_3$, wherein $\theta_3=\theta_1$, according to the law: "an angle of incidence is equal to an angle of reflection". According to Snell's law of refraction, $n_1 \sin \theta_1 = n_2 \sin \theta_2$. The reflection and refraction, both are in accordance with the Huygens-Fresnel principle of beam propagation crossing a boundary separating two transparent mediums, differing in refractive index.

Ray 23.2 incidents on boundary 20.0 under a so-called critical angle of incidence 24.2 equal to $\theta_C$ with respect to imaginary axis 20.2, perpendicular to boundary 20.0. The critical angle of incidence 24.2 is defined as $\theta_C=\arcsin(n_2/n_1)$. In this case, refracted ray 25.2 declined on the right angle becomes degenerated with zero power, and ray 27.2, reflected on angle 28.2 equal to $\theta_3=\theta_C$, brings all the power of origin ray 23.2.

Total internal reflection is a phenomenon, which occurs when a propagating wave strikes a medium boundary at an angle larger than a particular critical angle with respect to the normal to the surface. If the refractive index is lower on the other side of the boundary and the incident angle is greater than the critical angle, the wave cannot pass through and is entirely reflected. The critical angle is the angle of incidence above which the total internal reflection occurs.

Ray 23.3 incidents on boundary 20.0 under an angle of incidence 24.3 equal to $\theta_1$ with respect to imaginary axis 20.3, perpendicular to boundary 20.0, wherein the value $\theta_1$ is greater that the critical angle of incidence $\theta_C$. In this case, ray 27.3, reflected on angle 28.3 equal to $\theta_3=\theta_1$, brings all the power of origin ray 23.3 as the condition $\theta_1 \geq \theta_C$ for total internal reflection is satisfied.

In general, the theory of wave beam refraction on a boundary between two mediums, as illustrated schematically in prior art FIG. 2a, and in particular, the law of refraction, written in the form: $u_1 \sin \theta_2 = u_2 \sin \theta_1$, where $u_1$ and $u_2$ are velocities of the wave beam propagation in the two mediums, is applicable to different kinds of waves, namely, to electromagnetic RF waves, to electromagnetic light waves, including infrared, visible, and ultraviolet light, as well as to acoustic (i.e. elastic) waves, including ultrasound.

Prior Art FIG. 2b is a schematic illustration of a refraction of optic rays propagating through a triangular prism 29. When optic rays 29.1 cross triangular prism 29, made from a transparent matter with an index of refraction n higher than the index of refraction of ambient matter, the direction of the rays propagation is declined to the basis of prism 29, as shown schematically by redirected arrows 29.2 and 29.3. Moreover, rays of higher frequencies and especially ultraviolet rays become declined on bigger angles.

Forcedly-Conveying Waveguide Effect and Optical Fiber

In contrast to the mentioned self-originated waveguide effect caused due to the paraboloidal shaping of a reflecting dish, as described hereinabove with reference to prior art FIG. 1a, another kind of the waveguide effect, namely, the forcedly-created forcedly-conveying refractive waveguide effect, can be implemented by spatial forced bordering and thereby directing a propagating wave.

Prior Art FIG. 3a illustrates schematically a waveguide 30, having a shape of an elongated pipe characterized by a long length and by a cross-section having the maximal linear size being small with respect to the long length. In electromagnetics and communications engineering, the term waveguide may refer to any linear structure that conveys electromagnetic waves 33 between its butt-ends: input 31 and output 32.

In the simplest trivial case, an electro-conductive or super-conductive transmission line plays a role of such a waveguide for electromagnetic waves. An organ pipe is an example for acoustic waveguides. The original and most common meaning of waveguide is a hollow metal pipe used to carry radio waves. This type of waveguide is used as a transmission line mostly at microwave frequencies, for such purposes as connecting microwave transmitters and receivers to their antennas, in equipment such as microwave ovens, radar sets, satellite communications, and microwave radio links.

A dielectric waveguide employs a solid dielectric rod rather than a hollow pipe. An optical fiber is a dielectric waveguide designed to work at optical frequencies. In general, the electromagnetic waves 33 in a waveguide may be imagined as traveling down the waveguide in a zig-zag path, being repeatedly reflected between opposite walls of the waveguide, and passing positions 33.1, 33.2, 33.3, 33.4, 33.5, 33.6, 33.7, 33.8, and 33.9. In particular, optical fibers typically include a transparent core surrounded by a transparent cladding material with a lower index of refraction. The absence of the cladding is possible when the refractive index of ambient medium is lower than the refractive index of the waveguide core, and then the outer shell of the waveguide core can be interpreted as the presence of the transparent cladding, or, alternatively, the adjacent portion of the ambient medium can be interpreted as the transparent cladding material. Light 33, once has entered the fiber 30, is kept in the core due to the phenomenon of total internal reflection that causes the fiber to act as a waveguide. The output butt-end 32, preferably having a shape of a half of sphere, so that electromagnetic waves 33 become incident on the spherically shaped shell of output butt-end 32 at position 33.9 substantially at a right angle, i.e. at an angle of incidence, being smaller than the critical angle for the case. The substantially right angle provides for electromagnetic waves 33 to cross the butt-end 32's spherically shaped shell at least partially.

Usually, an optical fiber is a flexible, transparent fiber made by drawing glass (silica) or plastic to a diameter slightly thicker than that of a human hair. Optical fibers are used most often as a means to transmit light between the two butt-ends of the fiber and find wide usage in fiber-optic communications, where they permit transmission over longer distances and at higher bandwidths (data rates) than wire cables. Fibers are used instead of metal wires because signals travel along them with lesser amounts of loss. Fibers are also used for illumination and are wrapped in bundles so that they may be used to carry images, thus allowing viewing in confined spaces, as in the case of a fiberscope. Specially designed fibers are also used for a variety of other applications, some of them being fiber optic sensors and fiber lasers.

Bundle of Optical Fibers

A fiber optic bundle consists of multiple optical fibers in a single assembly. Multi-branch fiber optic bundles, normally, is used to split light into several beams to convey portions of the light separately and independently. A complete customization of fiber count, terminations, fiber routing and a number of legs allows for a design that meets specific needs. For instance, U.S. Pat. No. 4,177,829 by Daniel Gross comprises a "fur-like" bundle of optic fibers applied to increase an efficiency of accumulation of solar radiation energy, wherein the efficiency of the solution remains unwantedly-sensitive to an angle of the radiation incidence on the "fur-like" bundle.

Transparent Waveguide Exposed to Ambient Radiation

Prior Art FIG. 3*b* illustrates schematically a fragment of a curved waveguide 34, in principle, similar to waveguide 30, but being exposed to ambient ray 35, incident on the transparent cladding shell 34.1 (or not covered surface 34.1) under an angle of incidence marked by double arc 34.2. Ray 35 is partially reflected outside waveguide 34 as sub-ray 35.1 and partially penetrates into waveguide 34 having a higher refractive index as sub-ray 35.6. Further, sub-ray 35.6, in general, is partially subjected to the forcedly-conveying waveguide effect and thereby propagates along a zig-zag path within waveguide 34 as sub-rays 35.7, 35.8, 35.9, and 35.0, while partially escapes from waveguide 34 as sub-rays 35.2, 35.3, 35.4, and 35.5. Finally, sub-ray 35.0 partially crosses rounded butt-end 36. Normally, the lost portions 35.1, 35.2, 35.3, 35.5, and 35.5 prevent such an extravagant use of waveguide, however, looking ahead, in view of the description of subparagraph "Sunlight-Absorbing System" referring to FIG. 4 of the invention, it will become evident to a person studied the present invention that a use of a multiplicity of a big number of waveguides, having no (or having transparent) cladding shell, being supplied with parabolic reflectors, and being bundled into a sheaf, wherein the sheaf as a whole
being exposed to ambient radiation at an arbitrary angle of incidence allowing for the radiation to cross through the waveguides and to become subjected to multi-stage reflections and refractions and thereby to become subjected to division among the waveguides of the sheaf, provides for a new quality of the sheaf, namely, enhanced accumulation and parallelizing of the ambient radiation power.

Interference of Waves

In physics, interference of waves is a phenomenon in which two waves superpose to form a resultant wave of greater, lower, or the same amplitude. Interference usually refers to the interaction of waves that are correlated or coherent with each other, either because they come from the same source or because they have the same or nearly the same frequency. Interference effects can be observed with all types of waves, for example, light, radio, acoustic, surface water waves or matter waves.

The principle of superposition of waves states that when two or more propagating waves of the same type are incident on the same point, the resultant amplitude at that point is equal to the vector sum of the amplitudes of the individual waves. If a crest of a wave meets a crest of another wave of the same frequency at the same point, then the amplitude is the sum of the individual amplitudes—this is constructive interference. If a crest of one wave meets a trough of another wave, then the amplitude is equal to the difference in the individual amplitudes—this is known as destructive interference.

The constructive interference occurs when the phase difference between the waves is an even multiple of $\pi$ (180°) (a multiple of $2\pi$, 360°), and the destructive interference occurs when the difference is an odd multiple of $\pi$. If the difference between the phases is intermediate between these two extremes, then the magnitude of the displacement of the summed waves lies between the minimum and maximum values.

A result of interference between two waves traveling in opposite directions is a so-called standing wave. Wherein, for waves of equal amplitude traveling in opposing directions, there is, on average, no net propagation of energy, i.e. the standing wave does not provide for propagation of energetic signals.

In book "The Feynman Lectures on Physics", volume 1, chapter 30 "Diffraction" by Richard P. Feynman, Robert B. Leighton, and Matthew Sands, it is shown that the intensity of constructive interference of N identical in-phase waves is higher than the intensity of the single wave by the factor $N^2$; so, the inventor points out that the cumulative intensity of the N identical in-phase superposed waves is higher than the sum intensity of these waves, but yet to be superposed, by the factor N.

For the purposes of the present patent application, the terms "superposition" and "interference" are applied to the RF signals representing oscillating electrical current and voltage analogously as the terms are applied to waves.

SUMMARY OF THE INVENTION

Unity and Novelty of the Invention

The unity and novelty of the invention are in a method providing for a use of a sheaf of a big number of specifically bundled together unclad and so transparent waveguides multi-stage inter-swopping portions of a wave beam (propagating in accordance with the Huygens-Fresnel principle) to provide the multi-stage waveguide effect, in turn, to provide the enhanced waveguide effect acting on the wave beam as a whole, wherein each of the unclad waveguides is supplied with a parabolic reflector to parallelize and, thereby, to form a desired unidirectional wave beam composed of parallel rays.

Primary Basic Features of the Present Invention

From the construction point of view, one of the primary features of the present invention is that the disclosed sheaf comprises the big number of the specifically bundled together unclad waveguides being: either refractive (forcedly-conveying) or self-focusing, wherein:

each of the forcedly-conveying unclad waveguides comprises a matter characterized by a refractive index being higher than the refractive index of the ambient medium and is supplied with a specifically arranged and oriented interface parabolic reflector, and wherein the sheaf as a whole is exposed to ambient radiation at an arbitrary angle of incidence, and/or each of the self-focusing waveguides comprises a portion of a parabolic reflector, and wherein the multiplicity of the self-focusing waveguides is divided between at least two groups conveying at least two portions of a wave beam, correspondingly, differing in phase of wave-fronts in a cross-sectional plane to provide a spatial modulation of the wave beam;

and

From the function point of view, one of the primary features of the present invention is that, in contrast to the classical use of waveguide bundles:

a use of the sheaf of the big number of the specifically bundled unclad forcedly-conveying waveguides, when the sheaf as a whole being exposed to ambient source of rays and being oriented at an arbitrary angle of the rays incidence, provides an increased efficacy of the ambient rays enhanced catching and directional conveying due to the multi-stage waveguide effect and due to parallelizing the rays released from the waveguides butt-ends; and/or a use of the sheaf of the big number of the specifically bundled unclad self-focusing waveguides provides an enhanced penetration of the spatially modulated wave beam as a whole through a homogeneous poorly-permeable medium.

Principal Objects

Accordingly, it is a principal object of the present invention to overcome the limitations of existing method and apparatuses for wave-guiding electromagnetic signals by antennas using the multi-stage waveguide effect in combination with the focusing effect of interface parabolic reflectors, namely, using an improving shaped component comprising a sheaf of a big number of at least one of:

unclad forcedly-conveying waveguides, each of which being characterized by a refractive index being higher than the refractive index of the ambient medium and being supplied by an interface parabolic reflector, and self-focusing waveguides, each of which comprising a portion of a parabolic reflector applied to a spatial modulation of a radially emitted spherical wave.

It is an object of the present invention to provide methods and apparatus for either:

an enhanced sunlight absorption implementation, applied to solar power systems; and/or concentration and parallelizing electromagnetic radiation, thereby providing an embodiment of a modified solar sail having improved performance; and/or detection of weak and scattered electromagnetic signals by a modified antenna having improved sensitivity; and/or transmission of the wave energy through a homogeneous poorly-permeable medium; and/or detection of weak and scattered acoustic signals by a modified acoustic antenna of sonar having improved sensitivity; and/or concentration and parallelizing acoustic waves, thereby providing an embodiment of a modified acoustic sail having improved performance.

BRIEF DESCRIPTION OF THE DRAWINGS

In order to understand the invention and to see how it may be carried out in practice, a preferred embodiment will now be described, by way of a non-limiting example only, with reference to the accompanying drawings, in the drawings:

Prior Art FIG. 1a is a schematic illustration of parallel rays focusing caused by a reflection from a parabolic reflector;

Prior Art FIG. 1b is a schematic illustration of a panel exposed to sunlight rays to absorb the sunlight electromagnetic energy;

Prior Art FIG. 2a is a schematic illustration of a diagram of refractions and reflections of optic rays;

Prior Art FIG. 2b is a schematic illustration of a refraction of optic rays propagating through a triangular prism;

Prior Art FIG. 3a is a schematic illustration of a waveguide;

Prior Art FIG. 3b is a schematic illustration of a waveguide, exposed to an ambient ray;

DETAILED DESCRIPTION OF PREFERRED EMBODIMENTS

The principles and operation of a method and an apparatus according to the present invention may be better understood with reference to the drawings and the accompanying description, it being understood that these drawings are given for illustrative purposes only and are not meant to be limiting.

Sunlight-Absorbing System

Figure 4:
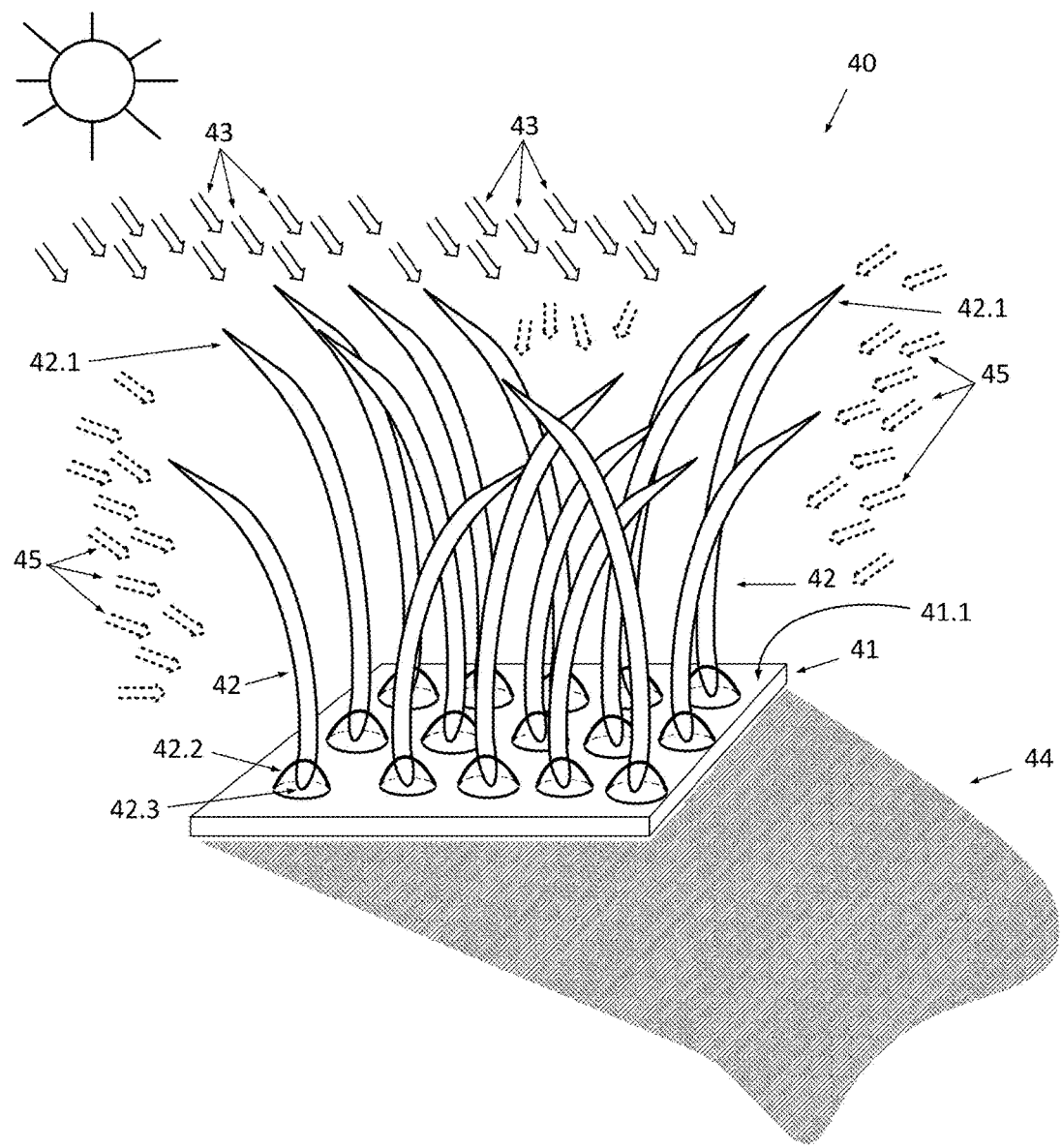
FIG. 4 is a schematic illustration of a sunlight-absorbing system, designed conceptually in accordance with an exemplary embodiment of the present invention.

FIG. 4 shows schematically a sunlight-absorbing system 40, modified in accordance with an exemplary embodiment of the present invention. Sunlight-absorbing system 40 comprises sunlight-absorbing panel 41 as a trivial flat Rx-antenna having surface 41.1, subjected to impact by sunlight rays (further called an impacted surface 41.1), but now being supplied by a sheaf of a big number of unclad optical fibers 42, optionally, differing in length and in a curved shape and having pointed tips 42.1. Each of optical fibers 42 is supplied by interface butt-end dish 42.2, having a light-reflecting inner concave arch-vault, shaped as a paraboloid, so that interface butt-end 42.3 of fiber 42 occupies the interface butt-end dish 42.2 paraboloid's focus. Thus, the interface butt-end dish 42.2 plays the role of an interface parabolic reflector parallelizing the caught sunlight rays. Sunlight-absorbing system 40 is exposed to ambient sunlight rays: direct, marked as substantially parallel arrows 43, and indirect, marked by dashed arrows 45, partially have been subjected to the Rayleigh scattering of sunlight in the atmosphere and partially have been reflected from reflective surroundings, for instance, from fresh snow.

The open side surfaces of unclad optical fibers are interpreted as transparent shells. Longer optical fibers 42 have a bigger area of the optical fibers 42 unclad transparent shells collecting sunlight rays. The sheaf of unclad optical fibers 42 catches both sunlight rays: direct 43 and indirect 45 due to the phenomenon of total internal reflection. The sheaf of unclad optical fibers 42 catches the sunlight rays multi-stage repeatedly and so more completely as the quantity of unclad optical fibers 42 increases. The catching of direct substantially parallel rays 43 results in shadow 44. Indirect sunlight rays 45 enter optical fibers 42, in principle, from any direction, thereby providing a substantial increase in sunlight-absorbing system 40 efficacy. Pointed tips 42.1 in addition decline incident rays and especially ultraviolet rays to the desired direction to sunlight-absorbing panel 41, as described hereinabove referring to prior art FIG. 2b. The sheaf of optical fibers 42, thereby filled by sunlight rays energy, partially irradiates the sunlight, thereby resulting in backlighting of the whole environment and, in particular, of shadow 44, prevalently by visible yellow-reddish and invisible infrared components of the sunlight. Even though shadow 44 becomes backlighted, shadow 44's area remains a measure of the direct sunlight rays 43 catching and waveguide-redirecting by the sheaf of the big number of unclad optical fibers 42. The light-reflecting paraboloid arch-vault of interface butt-end dishes 42.2 parallelizes sunlight rays, leaving optical fibers 42 through the interface butt-end 42.3 and entering sunlight-absorbing panel 41 at a reduced angle of incidence (i.e. angle between the considered ray and the normal to the impacted surface 41.1), wherein a hypothetically ideal design of both the interface butt-end 42.3 and the light-reflecting paraboloid arch-vault of interface butt-end dish 42.2 provides for the zero angle of the considered ray incidence. Thus, the aggregation of the unclad optical fiber 42 and the interface butt-end dish 42.2 as a whole represents a waveguide beam-maker, capable of transformation of the ambient omnidirectional radiation into a beam composed of parallel rays falling on the impacted surface 41.1 at the zero angle of incidence.

Comparing to sunlight-absorbing panel 10 of prior art FIG. 1b, sunlight-absorbing system 40 having the wave-guiding receiving antenna, composed of a trivial flat Rx-antenna, having said impacted surface 41.1, and of optical fibers 42, is characterized by a substantially increased efficacy at least because of:

- A cross-sectional area of direct sunlight rays 43, reaching sunlight-absorbing panel 41, is bigger, wherein shadow 44's area is a measure of the profit;
- Indirect sunlight rays 45, subjected to the Rayleigh scattering of sunlight in atmosphere as well as reflected from reflective surroundings, both, enriched with powerful ultraviolet component of the sunlight, reached the sheaf of the big number of unclad optical fibers 42 at an arbitrary angle of incidence, become kept by the sheaf of the big number of unclad optical fibers 42 and delivered to the interface butt-end 42.3 due to the forcedly-conveying waveguide effect; and moreover,
- Direct sunlight rays 43 and indirect sunlight rays 45, both, subjected to the forcedly-conveying waveguide effect and thereby past through zig-zag waveguide paths leading to the interface butt-end 42.3 located in the focus of paraboloid reflector 42.2, in turn, reflected from the paraboloid arch-vault of butt-end dishes 42.2, and, further, incident on sunlight-absorbing panel 41 dominantly at the zero angle of incidence.

In view of the foregoing description referring to FIG. 4, it will be evident to a person studied the present invention that a use of a multiplicity of a big number of unclad waveguide beam-makers, i.e. waveguides,

- having no or having transparent cladding shell,
- being supplied with parabolic reflectors, and
- being bundled into a sheaf, wherein the sheaf as a whole being exposed to ambient radiation at an arbitrary angle of incidence allowing for the omnidirectional radiation to cross through the waveguides, to become subjected to multi-stage reflections, refractions, and thereby divisions among waveguides of the sheaf, and to become reincarnated into a cumulative beam of parallel rays, provides for a new quality of the sheaf, namely, enhanced accumulation and control of the ambient radiation power.

Further Modifications and Applications

Figure 5A:
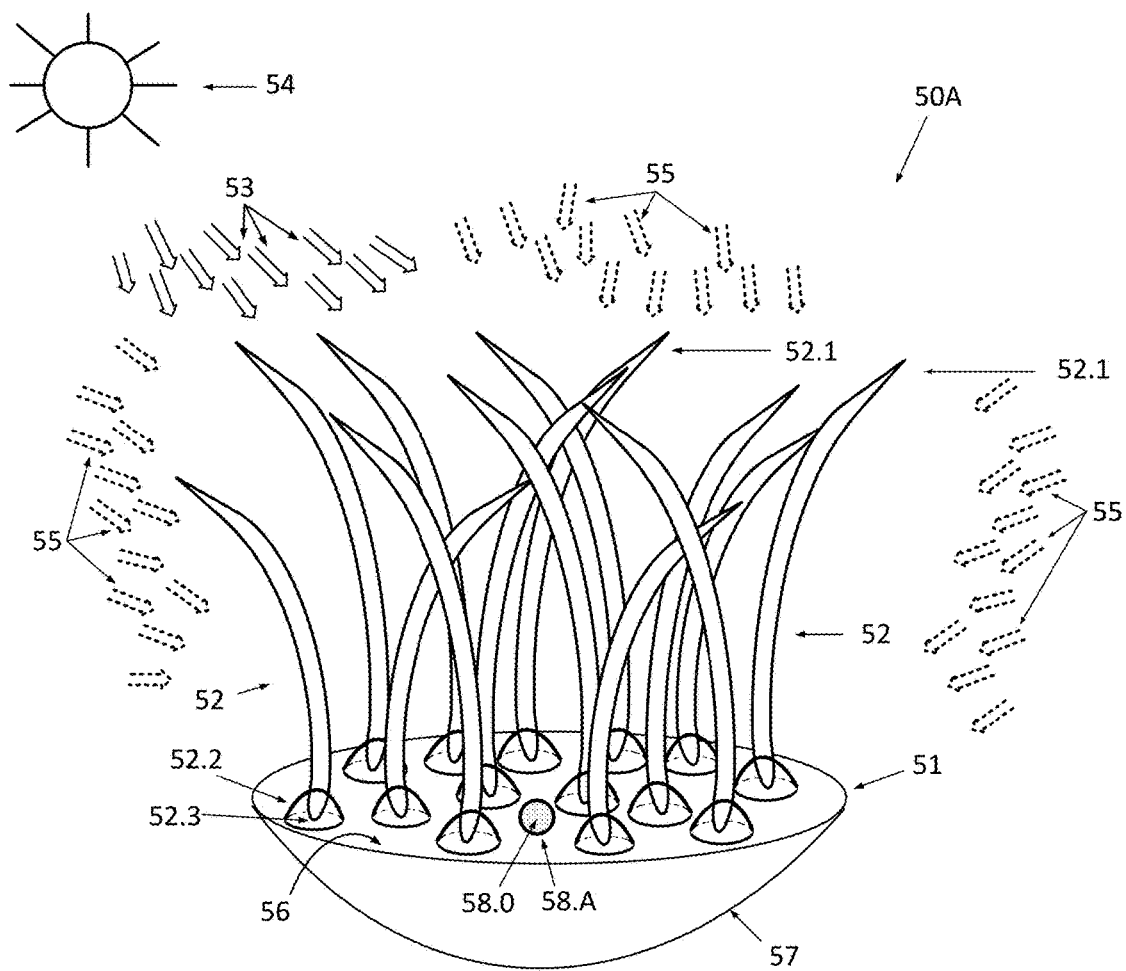
FIG. 5a is a schematic illustration of a wide-directional electromagnetic radiation absorbing and detecting wave-guiding Rx-antenna, designed conceptually in accordance with an exemplary embodiment of the present invention.

FIG. 5a shows schematically a wide-directional electromagnetic radiation absorbing and detecting wave-guiding Rx-antenna 50A, constructed in accordance with an exemplary embodiment of the present invention. For concretization and without loss of generality, the source 54 of radiation is the sun, and the ambient homogeneous lossy medium is air characterized by the molecular heterogeneousness causing in the sunlight scattering. The wide-directional electromagnetic radiation absorbing and detecting wave-guiding Rx-antenna 50A comprises a primary reflecting dish 51, in principle, the same as a paraboloidal dish of classic parabolic antenna 1.0 (Prior Art FIG. 1a), but now, preferably, filled by dielectric matter 56 characterized by a relatively high dielectric constant (for instance, distilled water) and supplied by a sheaf of a big number of unclad dielectric waveguides 52 comprising a core made from the same dielectric matter 56. The primary reflecting dish 51 has paraboloid bottom 57, characterized by focal point 58.0 where an electromagnetic radiation detector having said impacted surface 58.A is located. The electromagnetic radiation absorbing and detecting wave-guiding Rx-antenna 50A is exposed to electromagnetic rays: direct 53 reaching from source 54 of radiation, arranged in a line of sight, and indirect 55, partially have been subjected to the Rayleigh-like scattering of the electromagnetic rays in the molecular lossy medium and partially have been reflected from reflective surroundings. The sheaf of unclad dielectric waveguides 52 catches direct 53 and indirect 55 electromagnetic rays due to the phenomenon of total internal reflection. Preferably, waveguides 52 differ in length and in a curved shape and have pointed tips 52.1 in addition declining the electromagnetic rays, incident on pointed tips 52.1, to the desired direction to the primary reflecting dish 51, as described hereinabove referring to prior art FIG. 2b. Each of dielectric waveguides 52, preferably, is supplied by a butt-end dish 52.2, having an inner concave arch-vault, shaped as a paraboloid and reflecting electromagnetic rays, so that butt-end 52.3 of dielectric waveguide 52 occupies the butt-end dish 52.2 paraboloid's focus. The butt-end dish 52.2 plays the role of an interface parabolic reflector parallelizing the caught electromagnetic rays. Direct 53 and indirect 55 electromagnetic rays become subjected to waveguide effect and thereby at least partially parallelized. Further, direct 53 and indirect 55 electromagnetic rays, leaving dielectric waveguide 52 through interface butt-end 52.3, being reflected from the inner concave arch-vault of the butt-end dish 52.2, and entering the primary reflecting dish 51 dominantly, in parallel and at a desired angle of incidence. The aggregation of the unclad optical fiber 52 and the interface butt-end dish 52.2 as a whole represents a waveguide beam-maker, capable of transformation of the ambient omnidirectional radiation into a beam composed of parallel rays. The parallelized electromagnetic rays are focused at the electromagnetic radiation detector having said impacted surface 58.A. Thus, the primary reflecting dish 51 plays the role of an intermediate parabolic reflector focusing the caught electromagnetic rays at the impacted surface 58.A.

Comparing to the classic narrow-directional parabolic antenna described hereinbefore with reference to prior art FIG. 1a, the wide-directional electromagnetic radiation absorbing and detecting wave-guiding Rx-antenna 50A is characterized by a substantially increased efficacy at least because:

A cross-sectional area of direct sunlight rays 53, reaching the paraboloidal primary reflecting dish 51, is bigger;

Indirect sunlight rays 55, subjected to the Rayleigh scattering of sunlight in atmosphere as well as reflected from reflective surroundings, both, enriched with powerful ultraviolet component of the sunlight, become kept by the sheaf of a big number of unclad optical fibers 52 and delivered to the paraboloidal primary reflecting dish 51 due to the waveguide effect; and moreover, Direct sunlight rays 53 and indirect sunlight rays 55, both, subjected to the waveguide effect and thereby past through zig-zag waveguide paths leading to the interface butt-end 52.3 located in the focus of paraboloid reflector 52.2, in turn, reflected from the paraboloid arch-vault of butt-end dishes 52.2, and, further, incident to the paraboloidal primary reflecting dish 51 dominantly at the optimal angle of incidence.

In view of the foregoing description referring to FIG. 5a, it will be evident to a person skilled in the art that:

longer optical fibers result in a higher positive effect. A use of optical fibers, longer than 10 cm, provides a significant desired effect;

in particular, source 54 of radiation may be a source, hidden in depth within heterogeneous medium and launching a weak electromagnetic radiation being undetectable by an alone detector arranged on a certain distance in a line of sight, and electromagnetic radiation detector having said impacted surface 58.A becomes capable of reaction on the weak electromagnetic radiation concentrated at focal point 58.0; and dielectric waveguides 52 can be supplied by built-in electro-conductive or super-conductive cores, thereby providing an increase of waveguide effect.

Figure 5B:
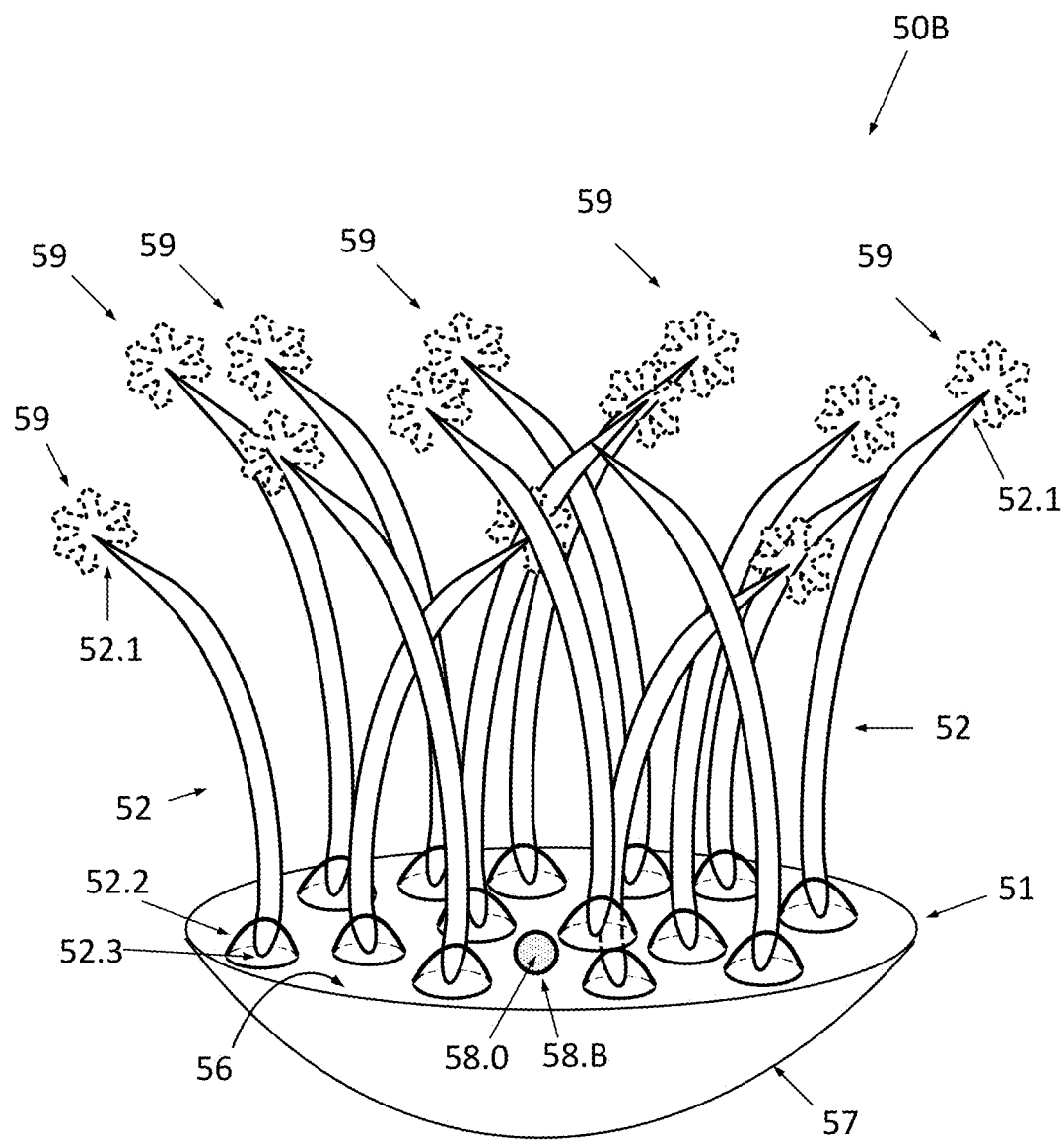
FIG. 5b is a schematic illustration of a wide-directional electromagnetic radiation transmitting wave-guiding Tx-antenna, designed conceptually in accordance with an exemplary embodiment of the present invention.

FIG. 5b shows schematically a wide-directional electromagnetic radiation transmitting wave-guiding Tx-antenna 50B, constructed in accordance with an exemplary embodiment of the present invention. The Tx-antenna 50B and Rx-antenna 50A, which is described hereinbefore with reference to FIG. 5a, have identical geometries and differ in functionality. So the numerals 51, 52, 52.1, 52.2, 52.3, 56, 57, and 58.0 are of the same sense as in FIG. 5a, and numeral 58.B symbolizes an emitter having a surface emitting electromagnetic radiation, further called an emitting surface. As emitter 58.B is located in the focal point 58.0 of paraboloid bottom 57, the electromagnetic radiation becomes reflected from the paraboloid bottom 57, directed to the interface butt-end reflector dish 52.2, and focused at butt-end 52.3 of dielectric waveguide 52. Then the electromagnetic radiation becomes subjected to the forcedly-conveying waveguide effect within the transparent refractive waveguides 52, where the electromagnetic radiation reaches pointed tips 52.1 and exits to ambient medium in all directions that is shown schematically by arrows 59.

Figure 5C:
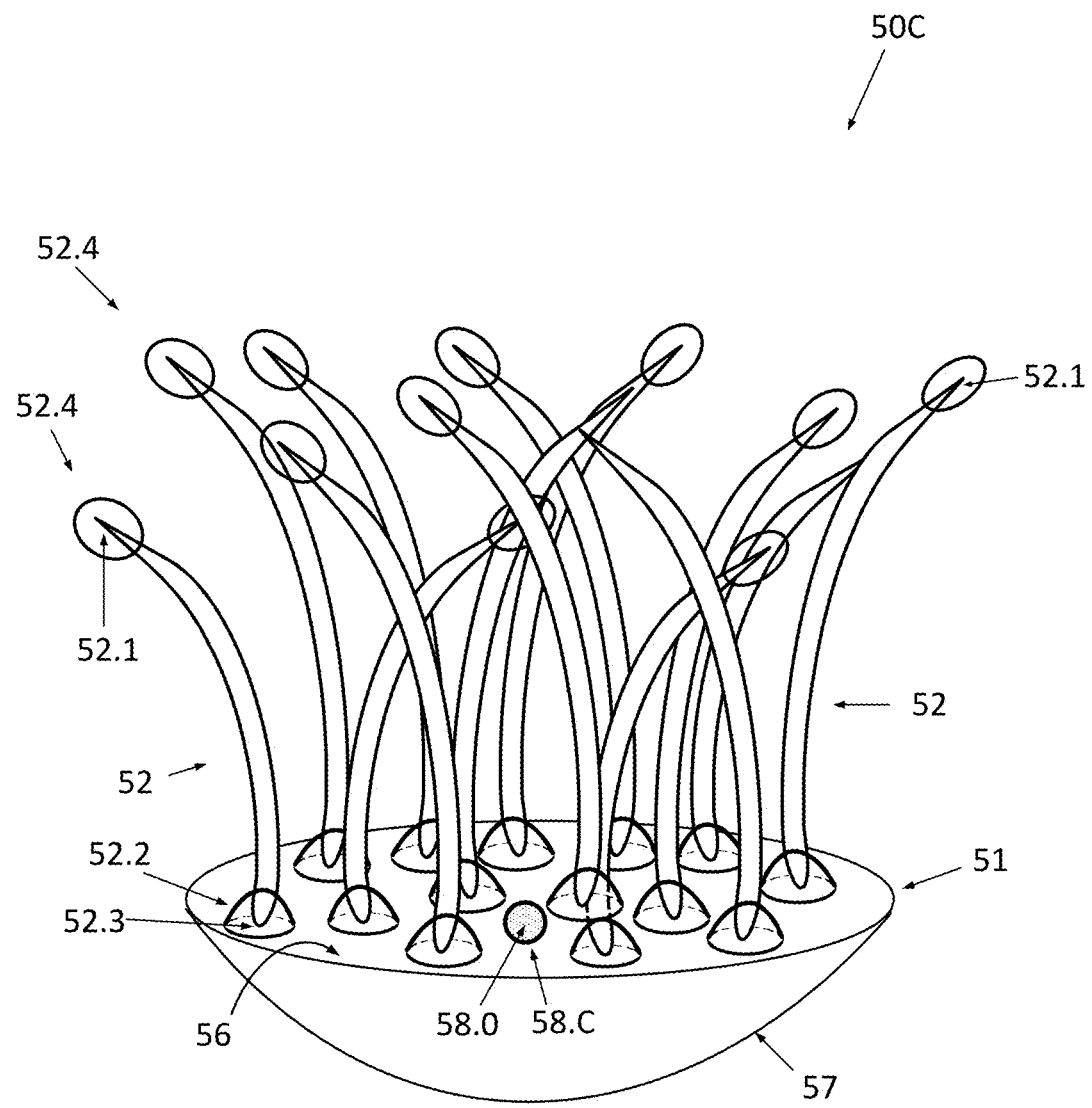
FIG. 5c is a schematic illustration of a wide-directional electromagnetic radiation receiving wave-guiding Rx-antenna, designed conceptually in accordance with an exemplary embodiment of the present invention.

FIG. 5c shows schematically a wide-directional electromagnetic radiation receiving wave-guiding Rx-antenna 50C, constructed in accordance with an exemplary embodiment of the present invention. The Rx-antenna 50C is similar to Rx-antenna 50A, which is described hereinbefore with reference to FIG. 5a, but differs by the presence of not-transparent ellipsoids 52.4 having a reflecting mirror at their inner side. The numerals 51, 52, 52.1, 52.2, 52.3, 56, 57, and 58.0 are of the same sense as in FIG. 5*a*.

When the electromagnetic waves, being caught by the dielectric waveguides 52 and being further subjected to the waveguide effect within the dielectric waveguides 52, the electromagnetic waves becomes concentrated and superposed within the dielectric waveguides 52. The superposed waves result in constructive and destructive interferences, wherein the destructively interfering waves become subjected to partial self-reflections, as described hereinbelow in subparagraph "Enhanced Concentration of Electromagnetic Waves" as a preamble to the description of FIG. 7*a*. Thereby, the electromagnetic radiation propagates in both directions along the dielectric waveguides 52. When a portion of the electromagnetic radiation reaches pointed tip 52.1 and exits to ambient medium in all directions, the radiation portion will be reflected from the reflecting mirror, which is at the inner side of not-transparent ellipsoid 52.4, and so, the radiation portion will be returned back into unclad dielectric waveguides 52. Thus, in the final analysis, the cumulative intensity (wave-power) of the caught electromagnetic waves, which reach the detector having said impacted surface 58.C, is higher than the cumulative power of the caught electromagnetic waves, which reach the detector having said impacted surface 58.A (FIG. 5*a*).

Figure 6:
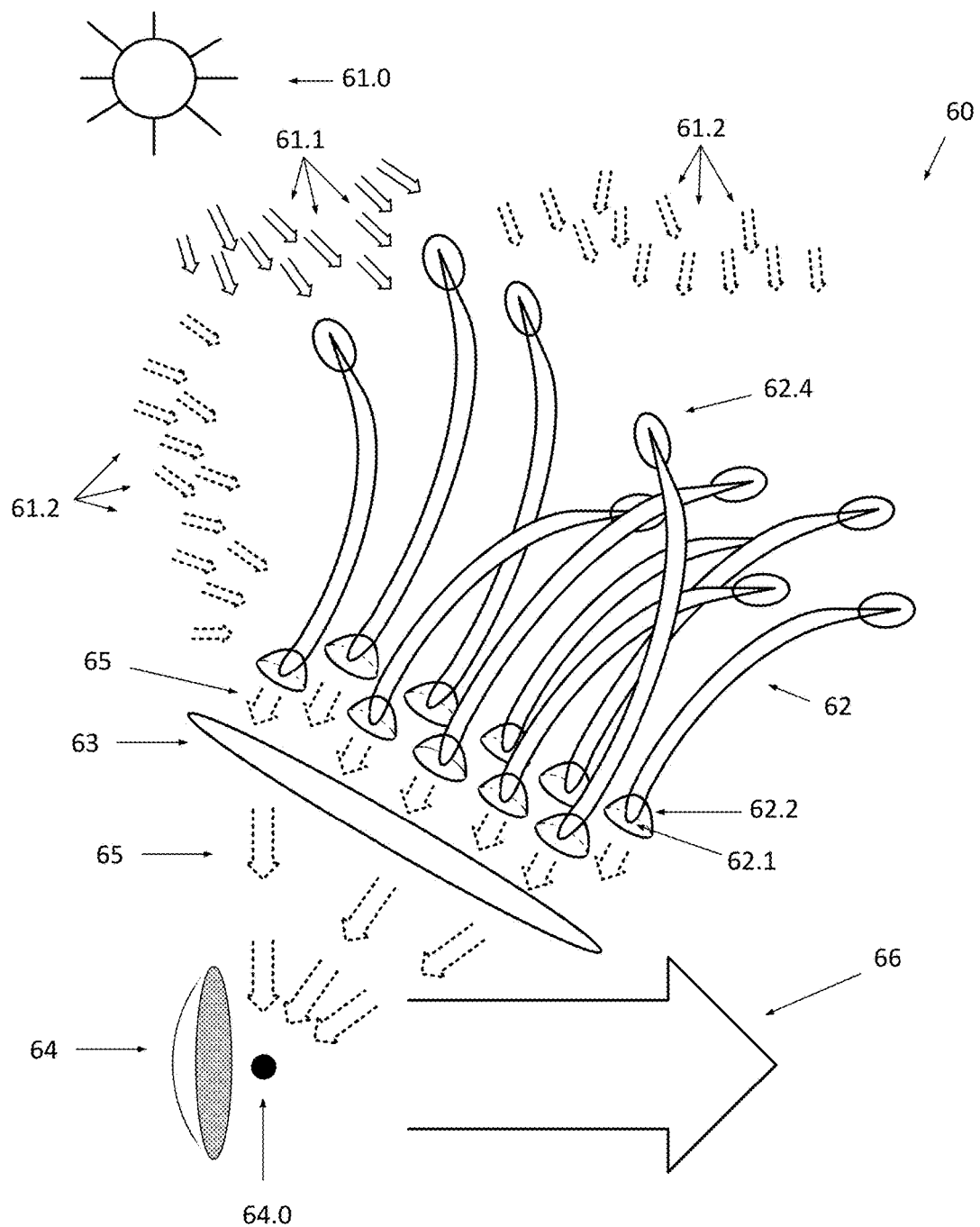
FIG. 6 is a schematic illustration of an improved mirror redirecting electromagnetic radiation to an absorbing and detecting point, designed conceptually in accordance with an exemplary embodiment of the present invention.

FIG. 6 shows schematically a stationary mirror-antenna 60 redirecting electromagnetic radiation in the desired direction to a device of light absorbing and detecting, for instance, a light absorbing solar power tower [not shown here]. For concretization and without loss of generality, the source 61.0 of radiation (direct 61.1 as well as indirect 61.2) is the sun, and the ambient lossy medium is air characterized by the molecular heterogeneousness causing the sunlight scattering. Stationary mirror-antenna 60, modified to become a wave-guiding reflecting antenna in accordance with an exemplary embodiment of the present invention, comprises:

a sheaf of a big number of unclad optical fibers 62, which are similar to unclad optical fibers 52 described hereinbefore referring to FIG. 5*a*;

lens 63; and paraboloidal dish mirror 64.

The unclad optical fibers 62 have curved shape and are preferably supplied with not-transparent ellipsoids 62.4 having a reflecting mirror at their inner side and are supplied with light-reflecting butt-end dishes 62.2 having inner concave paraboloid arch-vaults, wherein butt-ends 62.1 of optical fibers 62 occupy the paraboloid's focuses. Thus, the butt-end dishes 62.2 play the role of interface parabolic reflectors parallelizing the caught light. Lens 63 focuses the previously parallelized rays 65 at a spherical body 64.0 located at the focus of paraboloidal dish mirror 64 and, preferably, is made from a transparent matter having a dielectric constant being higher than the dielectric constant of the ambient medium. Thereby, the spherical body 64.0 plays the role of a feed of antenna, wherein paraboloidal dish mirror 64 parallelizes and directs the cumulative light beam 66 to light absorbing solar power tower. This technique allows avoiding mirrors tracing after the position of Sun.

In view of the foregoing description referring to FIG. 6, it will be evident to a person skilled in the art, that mirror-antenna 60, redirecting the accumulated electromagnetic radiation, can be used as a so-called "solar sail" as a kind of a solar power system, where the direction of the solar sail mechanical thrust is opposite to the direction of the reflected beam 66.

Enhanced Concentration of Electromagnetic Waves

The inventor points out that when focusing, i.e. constricting and thereby concentrating electromagnetic waves originally being distributed in space and randomly differing in frequency, polarization, and phase, one observes the well-known effects of superposing of in-phase, orthogonal, and anti-phase waves. In particular, while the superposing of co-directed in-phase waves results in constructive interference, the superposing of two co-directed anti-phase waves results in destructive interference. One interprets the destructive interference as a change of a so-called wave-impedance, which is a reason of reflecting the pair of inter-superposed anti-phase waves in the back direction. This, in particular, means that a use of either solar parabolic troughs and/or parabolic dishes and/or a set of flat mirrors faced on the focal point results in the inevitable loss of sunlight intensity due to the destructive interference causing the change of wave-impedance, in turn, causing the reflection of rays.

Figure 7A:
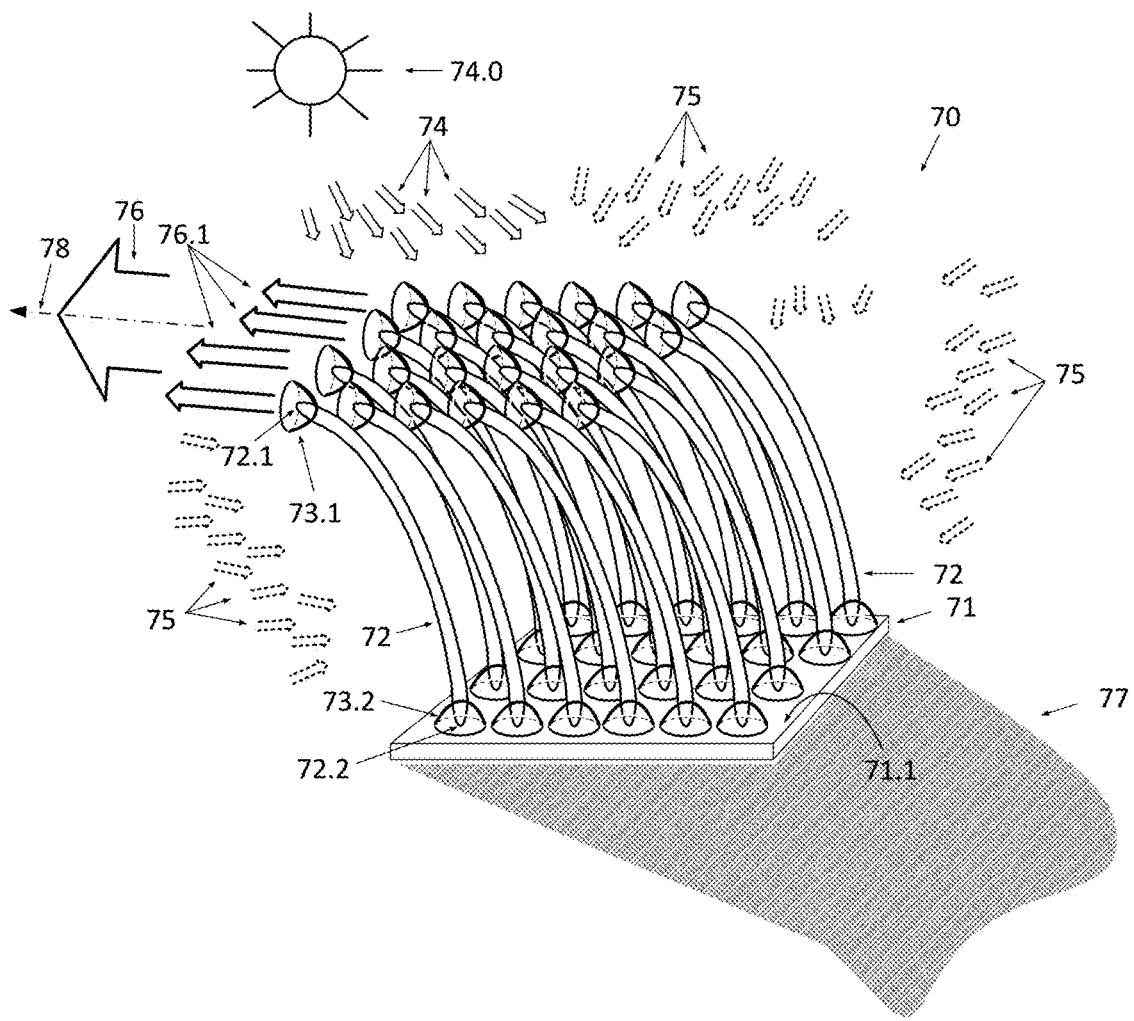
FIG. 7a is a schematic illustration of an improved mirror redirecting electromagnetic radiation to an absorbing and detecting point, designed conceptually in accordance with an exemplary embodiment of the present invention.

FIG. 7*a* shows schematically an improved mirror-antenna 70 redirecting electromagnetic radiation to a device absorbing and detecting the electromagnetic rays, for instance, a light absorbing solar power tower [not shown here]. For concretization and without loss of generality, the source 74.0 of radiation is the sun, and the ambient medium is air characterized by the molecular heterogeneousness. Improved mirror-antenna 70, modified to become a wave-guiding reflecting antenna in accordance with an exemplary embodiment of the present invention, comprises sunlight-mirror 71, having impacted-transmitting surface 71.1, supplied by a sheaf of a big number of unclad optical fibers 72 thereby having transparent side surfaces to implement the forcedly-created forcedly-conveying waveguide effect multi-stage repeatedly. Each optical fiber 72 has a curved shape and is supplied with a pair of the light-reflecting butt-end dishes: 73.1 and 73.2, both having inner concave paraboloid arch-vaults, wherein butt-ends: 72.1 and 72.2 of fiber 72 occupy the paraboloid's focuses correspondingly. Thus, butt-end dishes 73.1 and 73.2 play the role of interface parabolic reflectors parallelizing the caught sunlight rays and the aggregation of the unclad optical fiber 72 and the pair of light-reflecting parabolic butt-end dishes: 73.1 and 73.2, as a whole represents a waveguide beam-maker, capable of transformation of the ambient omnidirectional radiation into a beam composed of parallel rays. The improved wave-guiding mirror-antenna 70 is exposed to the ambient sunlight rays: direct, marked by solid-line arrows 74, and indirect, marked by dashed arrows 75, partially have been subjected to the Rayleigh scattering of sunlight in the atmosphere and partially have been reflected from reflective surroundings, for instance, from fresh snow.

Evidently, longer optical fibers 72 have a bigger side area of optical fibers 72 transparent sides collecting the sunlight rays: direct 74 and indirect 75. The sheaf of a big number N of unclad optical fibers 72 catches both sunlight rays: direct 74 and indirect 75, independently of the angles of incidence of the rays on the transparent fibers side surfaces due to the phenomenon of total internal reflection. The sheaf of the big number N of transparent optical fibers 72 catches the sunlight rays multi-stage repeatedly and so more completely as the number N of optical fibers 72 increases, wherein the big number N having the claimed sense is at least 10. The catching of direct substantially parallel rays 74 results in shadow 77. Indirect sunlight rays 75 enter optical fibers 72, in principle, from any direction, thereby providing a substantial increase of the improved wave-guiding mirror-antenna 70 efficacy. The sheaf of transparent optical fibers 72, thereby filled by the sunlight rays energy, partially irradiates the sunlight, thereby resulting in backlighting of the whole environment and, in particular, of shadow 77, prevalently by visible yellow-reddish and invisible infrared components of the sunlight. Even though shadow 77 becomes backlighted, shadow 77's area remains a measure of the direct sunlight rays 74 catching and waveguide-redirecting by the sheaf of transparent optical fibers 72. The light-reflecting paraboloid arch-vaults of butt-end dishes 73.2 parallelize in-phase, anti-phase, and orthogonally polarized sunlight rays. The orthogonally polarized and in-phase sunlight rays leave optical fibers 72 through interface butt-ends 72.2 and impact said impacted-transmitting surface of sunlight-mirror 71 at a reduced angle of incidence, while pairs of parallelized anti-phase sunlight rays run on the destructive interference accompanied by the increased wave-impedance. The increased wave-impedance causes a reflection of the pairs of inter-superposed originally anti-phased rays to butt-ends 72.1 of optical fibers 72. Thus, in the final analysis, the in-phase and orthogonal sunlight rays, reflected from sunlight-mirror, as well as the pairs of originally anti-phase sunlight rays, reverted due to the inter-superposition, the all are propagating to butt-ends 72.1 of optical fibers 72 and further, when releasing from butt-ends 72.1 and reflecting and thereby becoming parallelized by light-reflecting butt-end dishes: 73.1, are reincarnating into launching elemental sub-beams 76.1 forming cumulative beam 76 propagating along axis 78 to the light absorbing solar power tower [not shown here].

Comparing to the classic sunlight-reflecting mirror 71 being alone, i.e. not supplied with a sheaf of a big number of transparent optical fibers 72, the improved wave-guiding mirror-antenna 70 is characterized by a substantially increased efficacy at least because:

An original cross-sectional area of direct sunlight rays 74, which further reach sunlight-mirror 71, is bigger, wherein shadow 77's area is a measure of the profit;

Indirect sunlight rays 75, subjected to the Rayleigh scattering of sunlight in atmosphere as well as reflected from reflective surroundings, the both, enriched with powerful ultraviolet component of the sunlight, become kept by the sheaf of the big number N of transparent of optical fibers 72 and delivered to interface butt-ends 72.2 due to the forcedly-created forcedly-conveying waveguide effect being multi-stage repeated;

Direct sunlight rays 74 and indirect sunlight rays 75, both, subjected to the multi-stage repeated forcedly-created forcedly-conveying waveguide effect and thereby past through zig-zag waveguide paths leading to the interface butt-ends 72.2 located in the focuses of paraboloid reflectors 73.2, in turn, reflected from the paraboloid arch-vault of butt-end dishes 73.2, and, further, incident on said impacted-transmitting surface 71.1 of sunlight-mirror 71 dominantly at the zero angle of incidence;

In the final analysis, the originally in-phase and orthogonal sunlight rays, as well as the pairs of originally anti-phase sunlight rays, the all become redirected to the light absorbing solar power tower;

and, furthermore,

Looking ahead, in view of the description of subparagraph "Useful Derivative Idea: Self-Wave-Guiding in Homogeneous Lossy Medium" referring to FIG. 8d of the invention, it will become evident to a person studied the present invention that a use of cumulative beam 76 composed of elemental sub-beams 76.1 results in an enhanced self-wave-guiding of the cumulative beam 76 as a whole propagating along axis 78 to the mentioned light absorbing solar power tower that is observed as seemingly boosted permeability of the air thick.

In view of the foregoing description referring to FIGS. 4 and 7a, it will be evident to a person skilled in the art, that sunlight-absorbing panel 41 can be used instead of sunlight-mirror 71 thereby providing partial absorbing the sunlight rays energy by sunlight-absorbing panel 41 and partially redirecting the sunlight rays energy to the light absorbing solar power tower as cumulative beam 76 composed of a sheaf of a big number N of parallel elemental sub-beams 76.1 launched by the multiplicity of outlet parabolic light-reflecting butt-end dishes 73.1.

Receiving Cloven Antenna

Figure 7B:
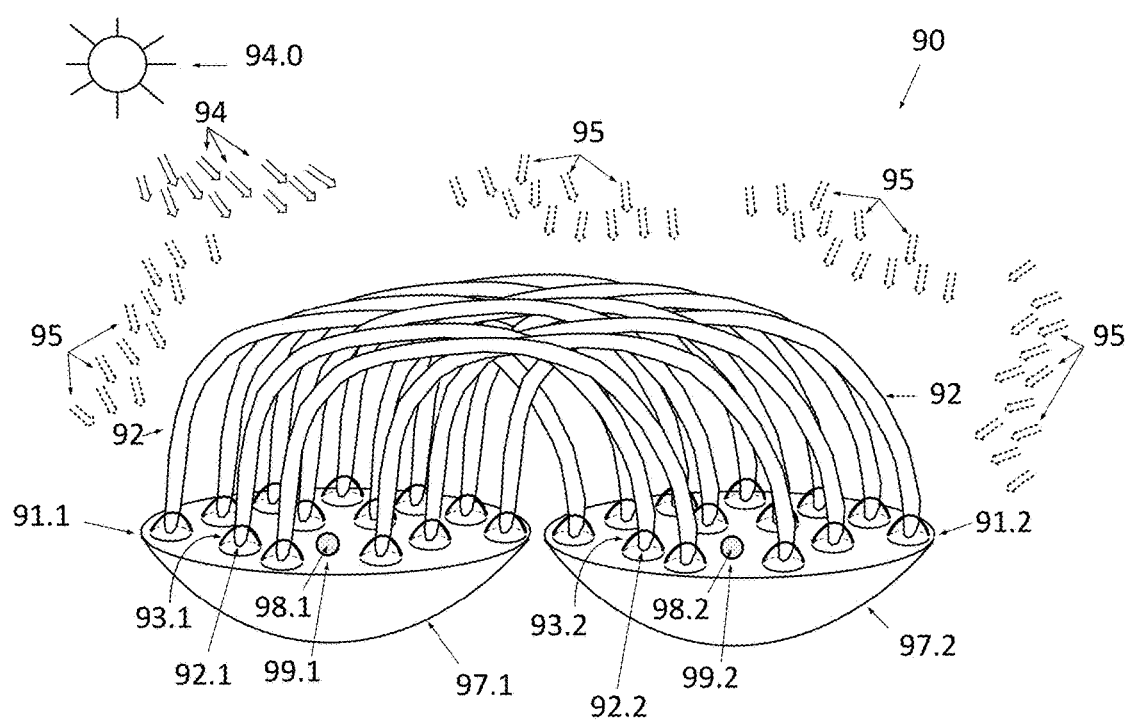
FIG. 7b illustrates schematically an electromagnetic radiation absorbing and detecting cloven antenna, modified conceptually in accordance with an exemplary embodiment of the present invention.

FIG. 7b shows schematically an electromagnetic radiation absorbing and detecting cloven Rx-antenna 90, modified conceptually in accordance with an exemplary embodiment of the present invention. In general, here, the applied term "cloven" should be understood in the wide sense as "having at least two parts". The electromagnetic radiation absorbing and detecting cloven Rx-antenna 90 comprises a pair of reflecting dishes 91.1 and 91.2 supplied by a sheaf of U-type dielectric waveguides 92, for instance and without loss of generality, optical U-type fibers 92, having a transparent cladding and two interface butt-ends: 92.1 and 92.2, and comprising a core made from a dielectric matter having a relatively high dielectric constant. Optical U-type fibers 92 have smoothly curved shape and supplied with the interface butt-end dishes: 93.1 and 93.2, both having inner concave paraboloid light-reflecting arch-vaults, wherein the interface butt-ends: 92.1 and 92.2 of U-type fiber 92 occupy the focuses of the arch-vaults paraboloids of the interface butt-end dishes 93.1 and 93.2, correspondingly. The aggregation of the unclad optical U-type fiber 92 and the pair of interface butt-end dishes: 93.1 and 93.2, as a whole represents a waveguide beam-maker, capable of transformation of the ambient omnidirectional radiation into a beam composed of parallel rays. Reflecting dishes 91.1 and 91.2 have paraboloid bottoms 97.1 and 97.2, characterized by focal points 98.1 and 98.2, correspondingly, where electromagnetic radiation detectors 99.1 and 99.2, correspondingly, are located. The electromagnetic radiation absorbing and detecting cloven Rx-antenna 90 is exposed to electromagnetic rays: direct 94 reaching from source 94.0 of radiation, arranged in a line of sight, and indirect 95, partially have been subjected to the Rayleigh-like scattering of the electromagnetic rays in heterogeneous medium and partially have been reflected from reflective surroundings. The sheaf of U-type dielectric waveguides 92 catches direct 94 and indirect 95 electromagnetic rays as having no an opaque shell and due to the phenomenon of total internal reflection. Direct 94 and indirect 95 electromagnetic rays become subjected to waveguide effect and thereby at least partially parallelized. Further, direct 94 and indirect 95 electromagnetic rays, leaving U-type dielectric waveguide 92 through interface butt-ends 92.1 and 92.2, further becoming reflected from the inner concave light-reflecting arch-vaults of pedestals 93.1 and 93.2, and entering the reflecting dishes 91.1 and 91.2, correspondingly, dominantly, in parallel and at the desired angle of incidence. The parallelized electromagnetic rays are focused at electromagnetic radiation detectors 99.1 and 99.2, wherein, in the final analysis, as in-phase and orthogonal as well as anti-phase components of both: direct 94 and indirect 95 electromagnetic rays, reach detector either 99.1 or 99.2.

In view of the foregoing description referring to FIG. 7b, it will be evident to a person skilled in the art, that, the applied term "cloven", understood in the wide sense as "having at least two parts", provides for a diversity of Rx-antenna 90 geometrical modifications.

In view of the foregoing description referring to FIGS. 7a and 7b, it will be evident to a person skilled in the art, that the mentioned light absorbing solar power tower is preferably supplied with U-type waveguides 92.

In view of the foregoing description referring to FIGS. 4, 5a, 5b, 5c, 6, 7a, and 7b, it will be evident to a person skilled in the art, that, in particular, in the case when source 94.0 of radiation is hidden in depth within a heterogeneous medium and is launching a weak electromagnetic radiation being undetectable by a prior art detector having an opaque shell cladding the waveguides, the electromagnetic radiation detectors 99.1 and 99.2 of the absorbing and detecting cloven Rx-antenna 90 become capable of reacting on the weak electromagnetic radiation caught, concentrated, and conveyed to and, in the final analysis, focused at focal points 98.1 and 98.2, correspondingly.

Solar Sail

Figure 8A:
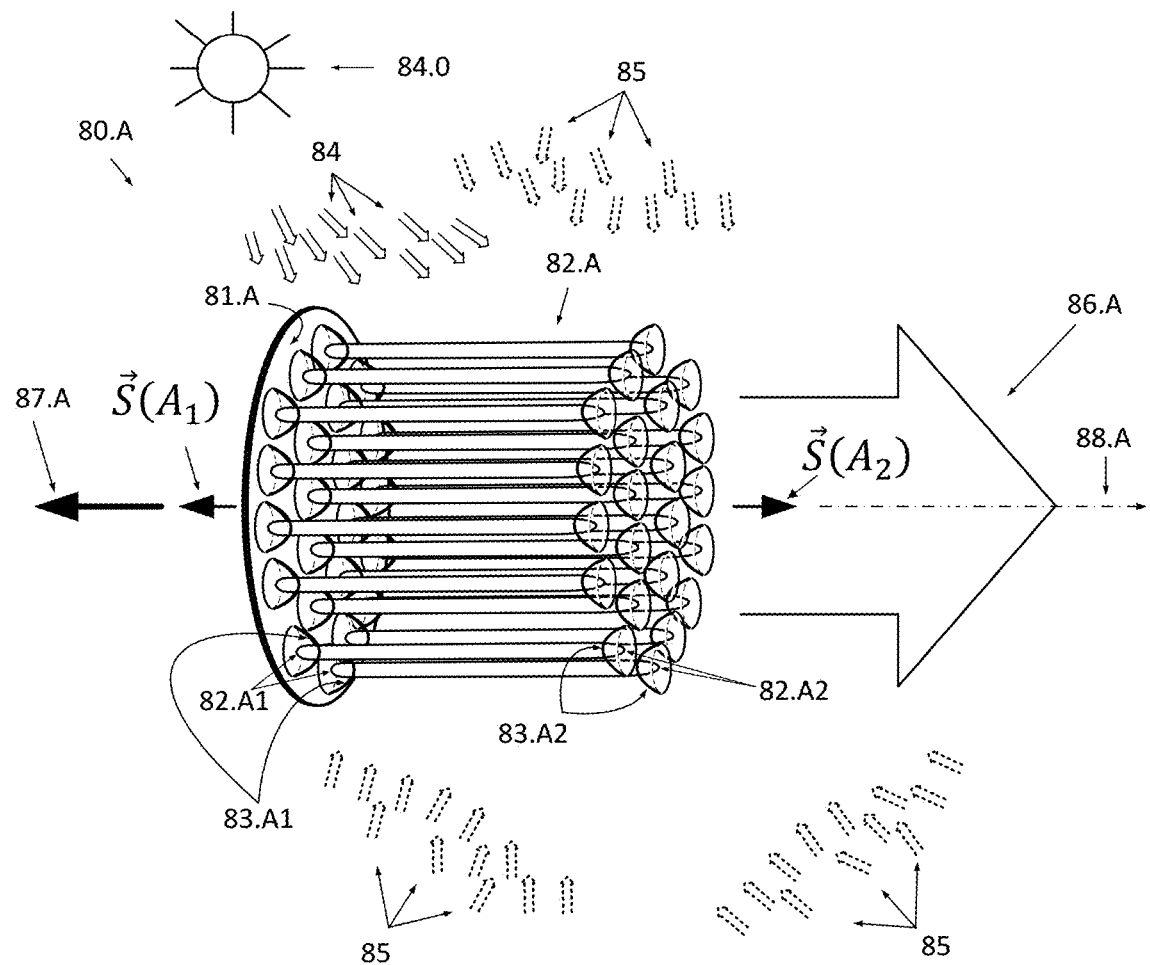
FIG. 8a is a schematic illustration of an improved solar sail comprising a sheaf of a big number of unclad fibers and parabolic arches, designed conceptually in accordance with an exemplary embodiment of the present invention.

FIG. 8a shows schematically a concept of an improved solar sail 80.A comprising a mirror (i.e. said impacted-emitting surface) 81.A of electromagnetic waves and being supplied with a sheaf of a big number of straight unclad optical fibers 82.A, each being supplied with a pair of the light-reflecting butt-end dishes: interface 83.A1 and outlet 83.A2, both having inner concave paraboloid arch-vaults, wherein butt-ends: interface 82.A1 and outlet 82.A2, of each optical fiber 82.A occupy the paraboloid focuses, correspondingly. Thus, butt-end dishes: interface 83.A1 and outlet 83.A2, play the role of interface parabolic reflectors parallelizing the sunlight rays. The cumulative frontal cross-sectional area of all the interface dishes 83.A1, indicated by $A_1$, is equal to the cumulative frontal cross-sectional area of all the outlet dishes 83.A2, indicated by $A_2$.

Taking into the consideration the foregoing description referring to FIG. 7a, it will be evident to a person skilled in the art that, in relation to the improved solar sail 80.A:

the improved solar sail 80.A catches, concentrates, parallelizes, and reflects as the sunlight rays 84 reaching from the Sun, marked by numeral 84.0, as well as other electromagnetic waves 85 existing in the space. The resulting Poynting vector, indicated by $\vec{S}(A_1)$, of the cumulated caught but yet to be reflected electromagnetic waves, predetermines the radiation pressure acting on mirror 81.A comprising said impacted-emitting surface. The reflection of cumulated caught waves results in reincarnation of the resulting Poynting vector $\vec{S}(A_1)$ into the Poynting vector, indicated by $\vec{S}(A_2)$, associated with the cumulative electromagnetic beam 86.A, propagating away from the impacted-emitting surface of mirror 81.A. The difference of the Poynting vectors $\vec{S}(A_1)$ and $\vec{S}(A_2)$, having the resulting amplitude of $|\Delta\vec{S}_A|=|\vec{S}(A_1)|+|\vec{S}(A_2)|=2\times|\vec{S}(A_1)|$, specifies the radiation pressure exerted upon the impacted-emitting surface of mirror 81.A. The radiation pressure provides the desired directional thrust, shown schematically by the arrow marked by numeral 87.A;

wherein a longer length of the straight unclad optical fibers 82.A provides a bigger transparent area for catching the electromagnetic rays 84 and 85 and so, in the final analysis, results in a stronger thrust 87.A;

wherein the direction of thrust 87.A is independent of the Sun 84.0 position in the space; and wherein an efficacy of the improved solar sail 80.A depends substantially on the presence of other possible sources of electromagnetic waves, for instance, on radiation of Jupiter.

Figure 8B:
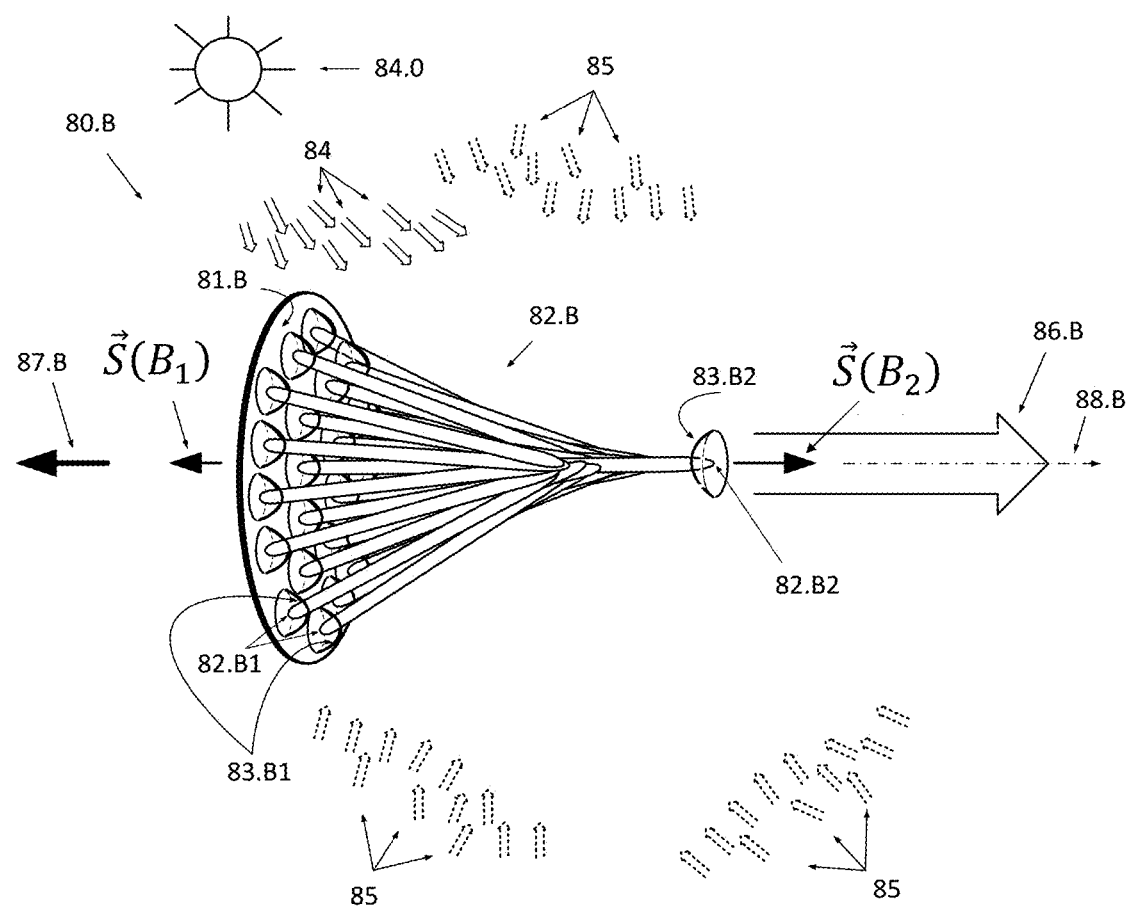
FIG. 8b is a schematic illustration an improved solar sail comprising a sheaf of a big number of unclad fibers and parabolic arches, designed conceptually in accordance with an exemplary embodiment of the present invention.

FIG. 8b shows schematically a modified concept 80.B of an improved solar sail comprising a mirror 81.B of electromagnetic waves and being supplied with a sheaf of a big number of unclad optical fibers 82.B having interface butt-ends 82.B1 faced to mirror 81.B and having a common outlet butt-end 82.B2. Butt-ends: interface 82.B1 and outlet 82.B2 are supplied with light-reflecting butt-end dishes: 83.B1 and 83.B2 correspondingly. Light-reflecting butt-end dishes: interface 83.B1 and outlet 83.B2, both have inner concave paraboloid arch-vaults, wherein interface butt-ends 82.B1 of optical fibers 82.B and the common outlet butt-end 82.B2 are located at the focuses of the corresponding paraboloids. Thus, butt-end dishes: interface 83.B1 and outlet 83.B2, play the role of interface parabolic reflectors parallelizing the caught sunlight rays, wherein the cumulative frontal cross-sectional area of all the interface dishes 83.B1, indicated by $B_1$, is bigger than the frontal cross-sectional area of outlet dish 83.B2, indicated by $B_2$. The ratio $(B_1/B_2)$ characterizes further concentration of the cumulative caught electromagnetic beam 86.B. The further concentration of cumulative electromagnetic beam 86.B assumes constructive-destructive interference of randomly (in-phase, anti-phase, and orthogonally) superposed electromagnetic rays composing the caught beam. The random superposition of electrical and magnetic fields of the rays results in increase of resulting fields by the factor $\sqrt{(B_1/B_2)}$, as it follows from the theory of statistics, and so results in that the intensity of beam 86.B is higher than the intensity of the cumulated caught but yet to be reflected-and-concentrated electromagnetic waves by the factor $(B_1/B_2)$.

Analogously to the improved solar sail 80.A described hereinbefore referring to FIG. 8a:

the modified improved solar sail 80.B catches, concentrates, parallelizes, and reflects as the sunlight rays 84 reaching from the Sun, marked by numeral 84.0, as well as other electromagnetic waves 85 existing in the space. The resulting Poynting vector, indicated by $\vec{S}(B_1)$, of cumulated caught electromagnetic waves, yet to be reflected, predetermines the radiation pressure acting on mirror 81.B comprising an impacted-emitting surface. To compare the resulting radiation pressure for the case with the radiation pressure pushing off the improved solar sail 80.A described hereinabove referring to FIG. 8a, let the resulting Poynting vector $\vec{S}(B_1)$ is equal to the resulting Poynting vector $\vec{S}(A_1)$ (FIG. 8a). The reflection and further concentration of cumulated caught waves results in reincarnation of the resulting Poynting vector $\vec{S}(B_1)$ into the Poynting vector, indicated by $\vec{S}(B_2)$, associated with the cumulated and further concentrated electromagnetic beam 86.B, propagating away from the impacted-emitting surface of mirror 81.B. The difference of the Poynting vectors $\vec{S}(B_1)$ and $\vec{S}(B_2)$, having the resulting amplitude of $|\Delta\vec{S}_B|=|\vec{S}(B_1)|+|\vec{S}(B_2)|$, specifies the radiation pressure exerted upon the impacted-emitting surface of mirror 81.A. As the cumulated and further concentrated electromagnetic beam 86.B is composed of superposed electromagnetic fields of the cumulated caught but yet to be reflected-and-concentrated electromagnetic waves, wherein the superposition resulting in random constructive-destructive interference, the effective amplitude of the electromagnetic field of beam 86.B is higher than the amplitude of the electromagnetic field of the cumulated caught but yet to be reflected-and-concentrated electromagnetic waves by the factor $\sqrt{(B_1/B_2)}$. This means that the intensity of beam 86.B is higher than the intensity of the cumulated caught but yet to be reflected-and-concentrated electromagnetic waves by the factor $(B_1/B_2)$, and so the Poynting vector $\vec{S}(B_2)$ is bigger than the Poynting vector $\vec{S}(B_1)$ by the factor $(B_1/B_2)$ as well. Hence, the resulting amplitude $|\Delta \vec{S}_B|$ of vector-difference of the Poynting vectors $\vec{S}(B_1)$ and $\vec{S}(B_2)$ related to the improved solar sail 80.B is greater than the resulting amplitude $|\Delta \vec{S}_A|$ of vector-difference of the Poynting vectors $\vec{S}(A_1)$ and $\vec{S}(A_2)$ related to the improved solar sail 80.A (FIG. 8*a*), and so, the radiation pressure, providing the desired directional thrust, shown schematically by the arrow marked by numeral 87.B, is higher than the radiation pressure, providing the aforementioned directional thrust 87.A (FIG. 8*a*);

wherein a longer length of the optical fibers 82.B provides a bigger transparent area for catching the electromagnetic rays 84 and 85 and so, in the final analysis, results in a stronger thrust 87.B;

wherein the direction of thrust 87.B is independent of the Sun 84.0 position in the space; and wherein an efficacy of the improved solar sail 80.B depends substantially on other possible sources of electromagnetic waves, for instance, on radiation of Jupiter.

The primary difference between solar sails 80.A (FIG. 8*a*) and 80.B is that the modified improved solar sail 80.B, at first, extremely concentrates the caught electromagnetic rays 84 and 85, and only then releases the resulting reflected parallelized cumulative beam 86.B, characterized by a substantially reduced cross-sectional area and, as a result, by an increased portion subjected to constructive interference within the resulting beam 86.B. The increased portion subjected to the constructive interference provides an increased radiation pressure and the Poynting vector directed along sagittal axis 88.B and thereby, in the final analysis, provides the increased thrust 87.B caused by the resulting concentrated reflected parallelized cumulative beam 86.B.

Figure 8C:
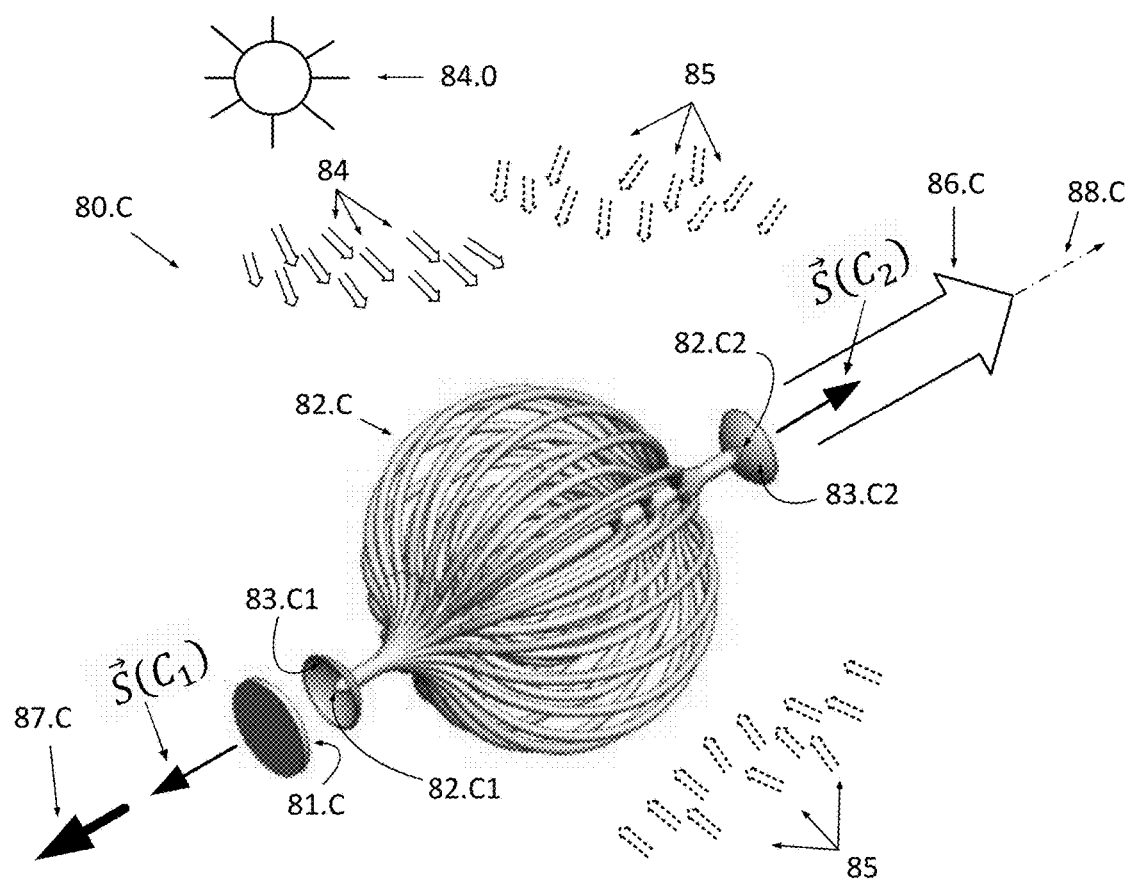
FIG. 8c is a schematic illustration of a narrow-directional retranslation antenna and/or an improved solar sail comprising a sheaf of a big number of unclad fibers having common parabolic arches, designed conceptually in accordance with an exemplary embodiment of the present invention.

FIG. 8*c* shows schematically a modified concept 80.0 of an improved solar sail comprising a mirror 81.0 of electromagnetic waves and being supplied with a sheaf of a big number of unclad optical fibers 82.0 having a common interface butt-end 82.C1, faced to mirror 81.C, and having common outlet butt-end 82.C2, faced away from mirror 81.C. The common butt-ends: interface 82.C1 and outlet 82.C2, are supplied with paraboloidal light-reflecting butt-end dishes: interface 83.C1 and outlet 83.C2, correspondingly; wherein butt-ends: interface 82.C1 and outlet 82.C2, are located at the focuses of the paraboloidal light-reflecting butt-end dishes: interface 83.C1 and outlet 83.C2, correspondingly.

The primary difference between solar sails 80.B (FIG. 8*b*) and 80.0 is that the modified improved solar sail 80.C, at first, extremely concentrates the caught electromagnetic rays 84 and 85, and only then directs the concentrated caught electromagnetic waves to the impacted-emitting surface of mirror 81.C. To compare the resulting radiation pressure for the case with the radiation pressure pushing off the modified improved solar sail 80.B described hereinabove referring to FIG. 8*b*, let the sum cross-sectional area of optical fibers 82.0 is equal to the sum cross-sectional area of optical fibers 82.B. In view of the foregoing description referring to FIG. 8*b* in relation to the Poynting vector associated with the concentrated electromagnetic beam 86.B, when, for the comparison, assuming that the Poynting vector $\vec{S}(C_2)$, associated with the electromagnetic beam 86.0 propagating along the sagittal axis 88.0 away from the mirror 81.C, is equal to the aforementioned Poynting vector $\vec{S}(B_2)$, the inventor points out that the Poynting vector $\vec{S}(C_1)$ is greater than the aforementioned Poynting vector $\vec{S}(B_1)$. Hence, the resulting amplitude $|\Delta \vec{S}_C|$ of vector-difference of the Poynting vectors $\vec{S}(C_1)$ and $\vec{S}(C_2)$ related to the improved solar sail 80.C, equal to $|\vec{S}(C_1)|+|\vec{S}(C_2)|$, is greater than the resulting amplitude $|\Delta \vec{S}_B|$ of vector-difference of the Poynting vectors $\vec{S}(B_1)$ and $\vec{S}(B_2)$ related to the improved solar sail 80.B, and so, the radiation pressure, providing the desired directional thrust, shown schematically by the arrow marked by numeral 87.C, is higher than the radiation pressure, providing the aforementioned directional thrust 87.B.

Useful Derivative Idea: Self Wave-Guiding in Homogeneous Lossy Medium

Figure 8D:
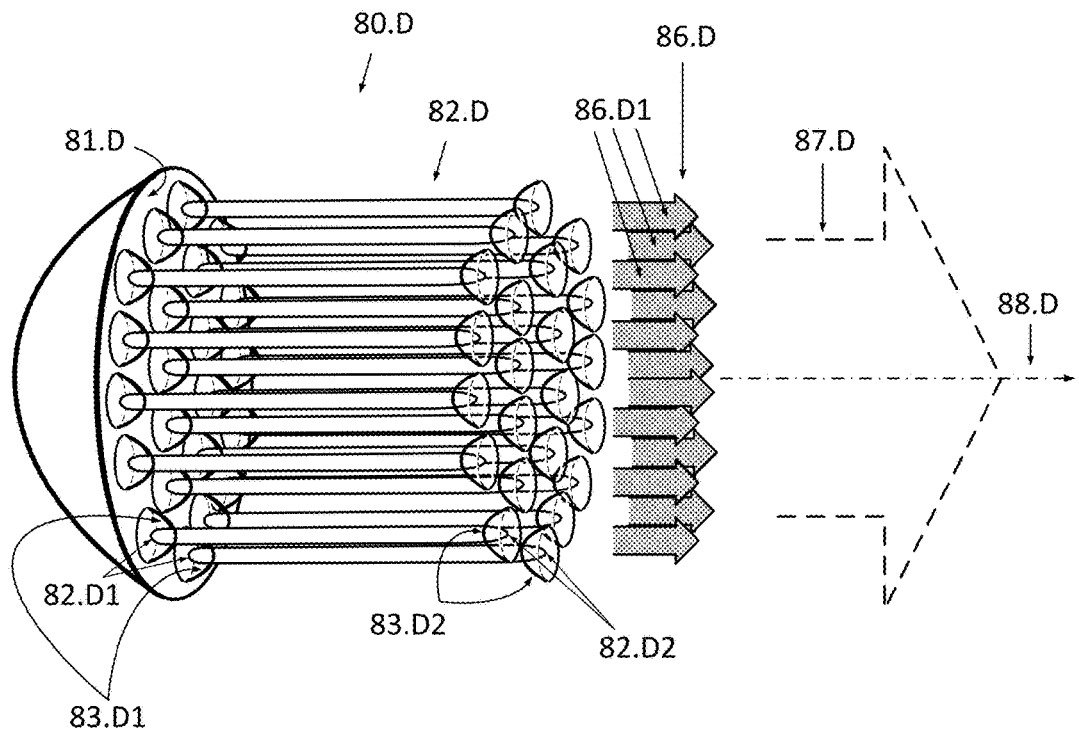
FIG. 8d is a schematic illustration of a transmitting wave-guiding Tx-antenna.

Reference is now made to FIG. 8*d* in connection with FIG. 8*a* described hereinabove. The inventor points out that the concept of improved solar sail 80.A (shown in FIG. 8*a*) can be easily modified into a concept of a transmitting wave-guiding Tx-antenna 80.D (shown in FIG. 8*d*) by using a plane emitter instead of mirror 81.A. In this case (FIG. 8*d*), the paraboloid antenna 81.D, playing the role of such a plane emitter, launches electromagnetic radiation to a multiplicity of a big number N of interface butt-end dishes 83.D1. The electromagnetic radiation, directed to the multiplicity of the big number N of interface butt-end dishes 83.D1 having interface parabolic reflectors, becomes focused at interface butt-ends 82.D1 of the sheaf of the big number N of dielectric waveguides 82.D, correspondingly. Then the electromagnetic radiation:

becomes subjected to the forcedly-conveying waveguide effect within the sheaf of the big number N of the transparent refractive dielectric waveguides 82.D and thereby conveyed to outlet butt-ends 82.D2, further becomes subjected to a spatial modulation and thereby parallelized by the big number N of the outlet parabolic butt-end dishes 83.D2, and enters the ambient homogeneous lossy medium as a sheaf of the big number N of parallel elementary sub-beams 86.D1 altogether forming the resulting directional, complicated, and spatially modulated cumulative electromagnetic beam 86.D.

Thus, the resulting directional, complicated, and spatially modulated cumulative electromagnetic beam 86.D is composed of a sheaf of the big number N of parallel elemental sub-beams 86.D1 formed by reflections of the electromagnetic radiation portions from the multiplicity of the big number N of parabolic butt-end outlet dishes 83.D2, correspondingly.

The inventor points out that, when implementing the sheaf of the big number N of optical fibers 82.D each of which supplied with butt-end dishes: interface 83.D1 and outlet 82.D2, in reality, one expects that tolerances of the implementation inevitably result in variety of zig-zag path lengths of the big number N of the electromagnetic rays within the corresponding big number N of fibers 82.D. In turn, the variety of zig-zag path lengths results in the variety of phases among the big number N of parallel elemental sub-beams 86.D1 characterized by a common frequency spectrum. When the wavelengths, corresponding to the common frequency spectrum:

- are shorter than the propagating rays zig-zag path length differences caused by the variety of the zig-zag path lengths, then the case, called "the case of random delays and phases", is characterized by that the N parallel elemental sub-beams 86.D1 have randomly-different phases in a cross-sectional plane perpendicular to the sagittal axis 88.D (speaking strictly, the zig-zag path length differences bigger than a half of the wavelengths provide for the condition of random distribution of phases); and
- are much longer than the propagating waves path differences caused by the variety of zig-zag path lengths, then the case, called "the case of controllable delays and phases", is characterized by that the variety of phases can be controlled, for instance, by purposely varying of fibers 82.D characteristics.

When trying to transmit an electromagnetic wave through a homogeneous lossy medium, for instance, through seawater, one runs on the well-known effect of strong dissipation of the electromagnetic wave within the medium, seeming as poorly-permeable for the electromagnetic wave. As well, a beam of ultrasound is subjected to dissipation when propagating in the fluid medium.

Considering the propagation of the resulting directional, complicated, and spatially modulated cumulative electromagnetic beam 86.D through a homogeneous and substantially lossy medium (for instance, air or, especially, water), the two cases: "the case of random delays and phases" and "the case of controllable delays and phases" are detailed as follows.

In Relation the Case of Random Delays and Phases

The functioning of the transmitting wave-guiding Tx-antenna 80.D lunching the resulting directional, complicated, and spatially modulated cumulative electromagnetic beam 86.D, composed of a sheaf of the big number N of parallel elemental sub-beams 86.D1 having the randomly-different phases, differs from the functioning of the paraboloid antenna 81.D operating alone (i.e. in the absence of waveguides 82.D) and so launching a uniform beam 87.D, i.e. composed of originally in-phase parallel elemental rays. Namely, when the in-phase parallel elemental rays of the uniform beam 87.D, originally propagating along the sagittal axis 88.D within an imaginary cylindrical space, penetrate into the homogeneous lossy medium, one expects that portions of the in-phase elemental rays, which are continuing to propagate strictly along the sagittal axis 88.D, are not interfering (or exacter, seemingly not interfering), while other portions, which being subjected to scattering and thereby propagate in the cross-sectional plane perpendicular to the sagittal axis 88.D outside the imaginary cylindrical space, become superposed in accordance with the Huygens-Fresnel principle and thereby accompanied by constructive and destructive interference. The constructively interfered portions are subjected to further scattering that results in a spread-directional effective propagation of the originally uniform beam 87.D, thereby becoming fast dissipating as penetrating into the homogeneous lossy medium.

In contrast, N portions of the N parallel elemental sub-beams 86.D1 having the randomly-different phases, which (the N portions) propagating in the cross-sectional plane perpendicular to the sagittal axis 88.D outside the imaginary cylindrical space due to the scattering in the homogeneous lossy medium, when superposing in accordance with the Huygens-Fresnel principle, provide for the condition of constructive interference partially only, wherein the energetic part of the constructive interference is estimated as inverse-proportional to N, according to the statistics theory. Thus, the resulting directional, complicated, and spatially modulated cumulative electromagnetic beam 86.D as a whole is characterized by the suppressed tendency of the propagation in the cross-sectional plane perpendicular to the sagittal axis 88.D outside the imaginary cylindrical space with respect to the uniform beam 87.D. This is interpreted as self-wave-guiding, i.e. as an improved property of the complicated and spatially modulated beam 86.D as a whole to propagate through the homogeneous lossy medium along the original direction along the sagittal axis 88.D.

Thus, a comparison between the effective propagations,
- on the one hand, of the uniform beam 87.D emitted by the paraboloid antenna 81.D operating alone, and
- on the other hand, of the resulting directional, complicated, and spatially modulated cumulative electromagnetic beam 86.D composed of the sheaf of the big number N of elemental sub-beams 86.D1 having random phases, shows that the resulting directional, complicated, and spatially modulated cumulative electromagnetic beam 86.D, is characterized by enhanced self-wave-guiding when propagating through a homogeneous lossy medium. In other words, the homogeneous lossy medium is seemingly characterized by boosted permeability for the resulting directional, complicated, and spatially modulated cumulative electromagnetic beam 86.D composed of the sheaf of the big number N of elemental sub-beams 86.D1 having random phases with respect to the uniform beam 87.D emitted by the paraboloid antenna 81.D operating alone.

In Relation to the Case of Controllable Delays and Phases

In view of the foregoing sub-paragraph "In relation to the case of random delays and phases", it will be evident to a person skilled in the art that the controllable delays and phases provide for additional degrees of freedom to modulate the spatial distribution of the phases of the sub-beams 86.D1, originally propagating along the sagittal axis within an imaginary cylindrical space, to provide an optimized dominant destructive interference of scattered portions of sub-beams which propagate in the cross-sectional plane perpendicular to the sagittal axis 88.D outside the imaginary cylindrical space and thereby to provide an extreme suppression of the scattered portions of sub-beams in favor to not-scattered portions of the sub-beams which propagate straight along the sagittal axis 88.D, that is interpreted as enhanced self-wave-guiding of the resulting directional, complicated, and spatially modulated cumulative electromagnetic beam 86.D composed of the sheaf of the big number N of elemental sub-beams 86.D1 having modulated phases. In other words, the homogeneous lossy medium is seemingly characterized by further boosted permeability for the resulting directional, complicated, and spatially modulated cumulative electromagnetic beam 86.D composed of the sheaf of the big number N of elemental sub-beams 86.D1 having the controllable delays and phases:
with respect to the resulting directional, complicated, and spatially cumulative modulated electromagnetic beam 86.D composed of the sheaf of the big number N of elemental sub-beams 86.D1 having random phases, and so much the more,
with respect to the uniform beam 87.D emitted by the paraboloid antenna 81.D operating alone.

Summarizing the foregoing description of subparagraph "Useful Derivative Idea: Self-Wave-Guiding in Homogeneous Lossy Medium" referring to FIG. 8d of the invention, the inventor points out that a use of a complicated spatially modulated beam of rays (wherein the complicated spatially modulated beam of rays is composed of a multiplicity of a big number of sub-beams differing in phase of wave-fronts in a cross-sectional plane such that the complicated spatially modulated beam of rays becomes self-bundled when propagating and superposing in accordance with the Huygens-Fresnel principle) provides for enhanced self-wave-guiding (i.e. self-bundling into a sheaf self-bordered by an imaginary cylindrical-like shell) that is observed as seemingly boosting of permeability of the homogeneous lossy medium.

The described technique of enhancing the beam self-wave-guiding by using a sheaf of a big number of wave-guides is one of the useful derivative teachings of the present invention. Evidently, the enhanced self-wave-guiding provided by a wave-guiding antenna allows for the transmission of information signals and/or energy with higher performance.

In view of the foregoing description referring to FIG. 8d in connection with the sub-paragraph "Enhanced Concentration of Electromagnetic Waves" described hereinabove referring to FIG. 7a, the inventor points out that a use of the cumulative spatially modulated beam 76 (FIG. 7a), composed of elemental sub-beams 76.1, as a whole propagating along axis 78 to the mentioned light absorbing solar power tower and being characterized by enhanced self-wave-guiding (that is observed as seemingly boosted permeability of the air thick), allows for a solution requiring an extremely long distance between the improved wave-guiding mirror-antenna 70 and the light absorbing solar power tower.

Figure 8E:
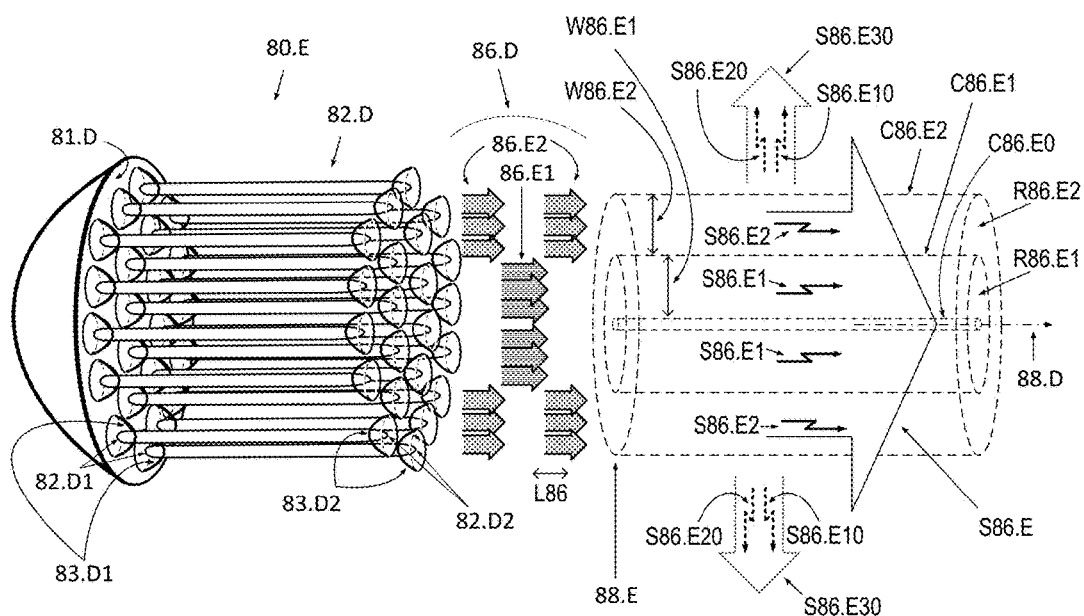
FIG. 8e is a schematic illustration of a transmitting wave-guiding Tx-antenna.

Reference is now made to FIG. 8e in connection with FIG. 8d for an exemplary concretization and without loss of generality of the case when the big number N of elemental sub-beams of the cumulative beam have controllable delays and phases as described hereinabove referring to FIG. 8d. In FIG. 8e, the numerals 81.D, 82.D, 82.D1, 82.D2, 83.D1, 83.D2, 86.D, and 88.D are of the same sense as in FIG. 8d, wherein now:

The transmitting wave-guiding Tx-antenna 80.E emits a periodically modulated electromagnetic RF signal s(t) having carrier RF wave with the frequency f and corresponding wavelength $\lambda$ and having the modulation periodicity $\tau$ equal to $\tau = n/f$, where n is the number of wavelengths in the modulation period (for simplicity and without loss of generality, k is integer), such that the periodical RF signal s(t), where t is the current time, has an anti-symmetrical shape, namely: $s(t) = -s(t-\tau/2)$ [for instance, in a trivial case of not modulated sinusoidal signal, the trivial signal is characterized by n=1 and $\tau = 1/f$];

The propagating waves path differences, caused by the controllable variety of zig-zag path lengths provided by the big number N of dielectric waveguides 82.D, predetermine that the directional, complicated, and spatially modulated cumulative electromagnetic beam 86.D, originally propagating within and along the imaginary cylinder C86.E2, is composed of the big number N of elemental sub-beams with controllable delays and phases divided between two groups: insular, indicated by arrows 86.E1, and cladding, indicated by arrows 86.E2;

The insular group 86.E1 of elemental sub-beams forms signal S86.E1 originally in-phase propagating within and along the imaginary insular cylindrical corridor R86.E1, being bordered by the imaginary cylindrical surfaces C86.E1 and C86.E0;

The cladding group 86.E2 of elemental sub-beams forms signal S86.E2 originally in-phase propagating within and along the imaginary cladding cylindrical corridor R86.E2, being bordered by the imaginary cylindrical surfaces C86.E1 and C86.E2 and so being cladding with respect to the cylindrical corridor R86.E1;

The two groups: insular 86.E1 and cladding 86.E2, differ in the zig-zag path lengths providing the time-delay $\tau/2$ between the two RF signals: insular S86.E1 and cladding S86.E2, i.e. when considering a frontal cross-section (for instance, frontal cross-section 88.E), the periodically modulated cladding RF signal S86.E2 becomes delayed and outrunning with respect to the periodically modulated insular RF signal S86.E1 on $\tau/2$ thereby providing the phase shift on 180° as $s(t) = -s(t-\tau/2)$, i.e. becomes delayed on a certain path length L86, which, in the trivial case of not modulated sinusoidal signal, is equal to $k \times \lambda$, where k is half-integer; and Width W86.E1 of the imaginary insular cylindrical corridor R86.E1 is equal to width W86.E2 of the imaginary cladding cylindrical corridor R86.E2 and both are equal to the specific characteristic length equal to the certain path length L86 (which, in the trivial case of not modulated sinusoidal signal, is equal to $k \times \lambda$, where k is half-integer).

Thus, two RF signals S86.E1 and S86.E2 are originally emitted to propagate dominantly along sagittal axis 88.D within the imaginary cylindrical corridors: insular R86.E1 and cladding R86.E2, correspondingly, wherein:
the insular RF signal S86.E1 originally has the cross-section being in the form of a ring with cross-sectional width W86.E1 equal to the specific characteristic length (for instance, $k \times \lambda$) in a frontal cross-sectional plane, as well as
the cladding RF signal S86.E2 originally has the cross-section being in the form of a ring with cross-sectional width W86.E2 equal to the specific characteristic length (for instance, $k \times \lambda$) in the frontal cross-sectional plane.

The signals: insular S86.E1 and cladding S86.E2, have a tendency to propagate also out of imaginary cylinder C86.E2 and within the imaginary cylinder C86.E0 because:
each of dishes 83.D2 (and altogether as a whole) has limited cross-sectional area; and, what is in principle important,
the signals: insular S86.E1 and cladding S86.E2, become scattered within the homogeneous lossy medium and become partially reincarnated into scattered RF electromagnetic waves S86.E10 and S86.E20, correspondingly, in the cross-sectional directions perpendicular to sagittal axis 88.D.

Namely,
RF signal S86.E10 is the scattered part of insular RF signal S86.E1, which has the tendency to propagate outside imaginary cylinder C86.E1;

RF signal S86.E20 is the scattered part of cladding RF signal S86.E2, which has the tendency to propagate outside imaginary cylinder C86.E2; and RF signal S86.30 is the superposition of the two signals: insular S86.E10 and cladding RF S86.E20.

The inter-delayed identically-modulated RF signals S86.E1 and S86.E2, when partially scattered in the cross-sectional directions, thereby, partially reincarnated into signals S86.E10 and S86.E20, correspondingly, and superposed in points outside the imaginary cylinder C86.E2 and within the imaginary cylinder C86.E0 are differing in phase on 180°. The inter-delay and sign difference result in the inter-compensation of the anti-phase superposed signals S86.E10 and S86.E20 such that the combined scattered signal S86.E30 brings no energy outside imaginary cylinder C86.E2 as well as inside imaginary cylinder C86.E0. The superposition of scattered components of RF signals S86.E1 and S86.E2, propagating in the frontal cross-sectional directions perpendicular to sagittal axis 88.D, results in a so-called standing wave within the frontal cross-section of between imaginary cylinders C86.E2 and C86.E0. As the standing wave does not provide for propagation of energetic signals, there is no energy propagating in the frontal cross-sectional directions perpendicular to sagittal axis 88.D. This results in an effective propagation of cumulative spatially modulated signal S86.E, superposed of RF signals S86.E1 and S86.E2, along sagittal axis 88.D within imaginary cylinder C86.E2 only.

In other words, imaginary cylinder C86.E2 performs an imaginary waveguide for signal S86.E composed and superposed of RF signals S86.E1 and S86.E2:
  having the modulation periodicity of τ;
  inter-delayed on τ/2 (in the trivial case, corresponding to path length of k×λ, where k is half-integer) thereby providing the difference in sign (i.e. difference in phase of 180°), and
  differing in cross-sectional distribution of intensity wherein the cross-sections are separated by the distance equal to the specific characteristic length.

I.e. identically modulated RF signals: insular S86.E1 and cladding S86.E2, form modulated signal S86.E, self-wave-guiding along the imaginary waveguide between imaginary cylinders C86.E2 and C86.E0. Thereby, the modified transmitting wave-guiding Tx-antenna 80.E, when radiating a specifically periodically modulated electromagnetic signal S86.E, composed of a big number of sub-signals S86.E1 and S86.E2 having controllable delays and phases, into a homogeneous lossy medium, operates as a self-wave-guiding antenna having an extremely increased directivity.

Further Derivative Idea: Self-Wave-Guiding Parabolic Antennas

In view of the foregoing description referring to FIG. 8e, the inventor points out that the directional, complicated, and spatially modulated cumulative electromagnetic beam 86.D, composed of the big number N of elemental sub-beams with controllable delays and phases divided between two groups: insular 86.E1, and cladding 86.E2, can be interpreted as a multiplicity of imaginary waveguides (i.e. having imaginary walls), self-bundled into a sheaf, self-bordered by an imaginary cylindrical-like shell, wherein the self-originated waveguide effect, i.e. the self-bundling and self-bordering, is provided by the Huygens-Fresnel principle of beam propagation. The introduced term "imaginary walls" should be understood as a spatial boundary predetermined by propagation and superposition of wave portions in accordance with the Huygens-Fresnel principle resulting in separation a portion of medium, being subjected to the propagation of the wave beam, from a portion of the medium, being free from the propagation of the wave beam.

In view of the foregoing description referring to FIG. 8e, the inventor points out that a directional cumulative electromagnetic beam, composed of the big number N of elemental sub-beams with controllable delays and phases divided between two groups: insular and cladding, to provide the condition for self-wave-guiding, can be implemented using a multiplicity of controllable parabolic antennas, wherein the self-originated waveguide effect, i.e. the self-bundling and self-bordering, is provided by the Huygens-Fresnel principle of beam propagation in a homogeneous medium described hereinabove in subparagraph "Parabolic Antenna as Self-Bordering Waveguide" referring to FIG. 1a.

Figure 9A:
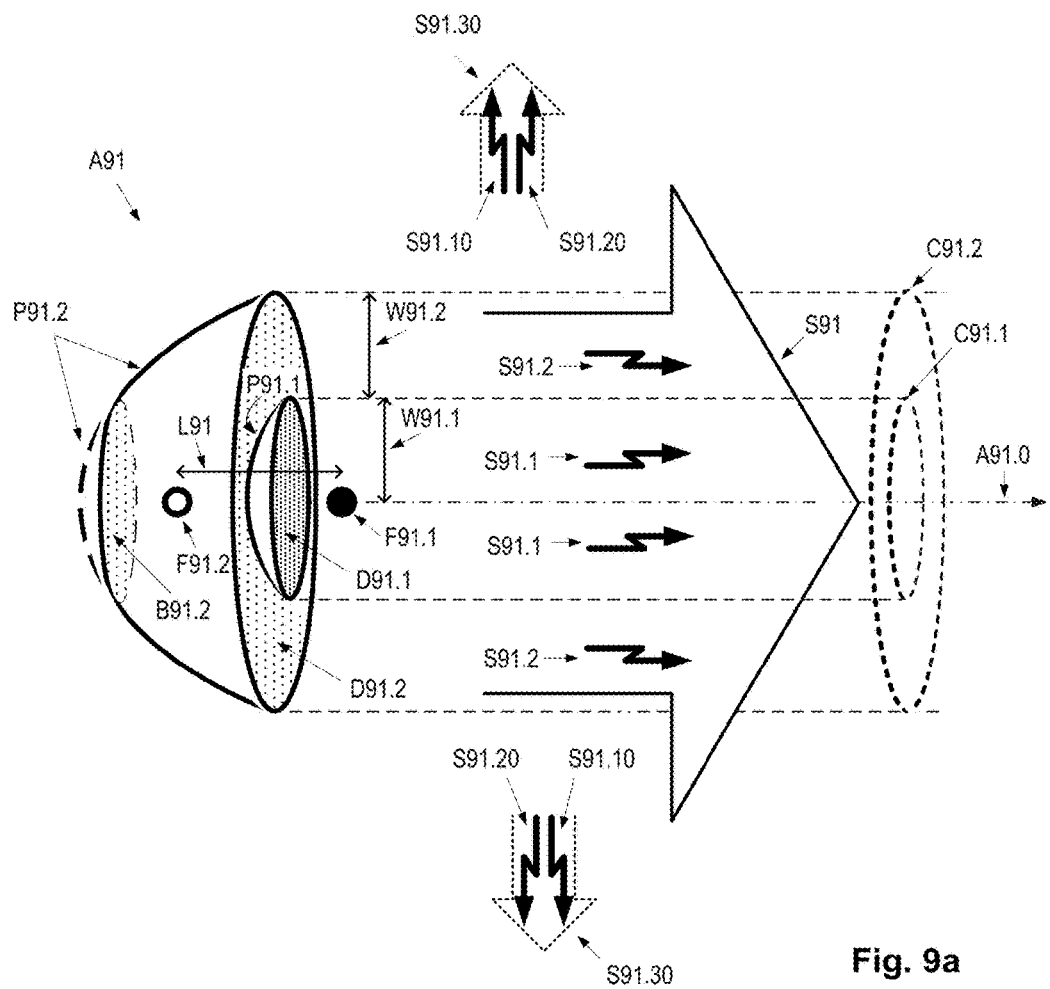
FIG. 9a is a schematic illustration of a double-dish antenna.

FIG. 9a is a schematic illustration of a specifically modified cloven parabolic self-wave-guiding double-dish antenna A91 destined for a transmission of a periodically modulated electromagnetic signal through the mentioned homogeneous poorly-permeable lossy medium. A modified double-dish antenna A91, as an exemplary enhancing embodiment of the present invention, comprising two paraboloid reflectors, namely, small parabolic dish D91.1 and big parabolic dish D91.2, both having paraboloid arches with radially-sectional contour fragments P91.1 and P91.2 correspondingly. For concretization and without loss of generality, the periodically modulated electromagnetic signal is an RF signal having carrier RF wave with the wavelength λ and having the modulation periodicity T. For simplicity and without loss of generality, radially-sectional contour fragments P91.1 and P91.2 are parabolically-curved contour fragments of identical parabolas. Big parabolic dish D91.2 is truncated by excluding butt-end part B91.2, which is identical with small parabolic dish D91.1, from the geometrical point of view. Widths W91.1 and W91.2, both equal to the radius of small parabolic dish D91.1, wherein the radius of small parabolic dish D91.1 is chosen equal to n×λ, where n is chosen such that the specific characteristic length equal to 2×n×λ corresponds to the time period τ of the periodical signal modulation repeating. For simplicity and without loss of generality, n is integer. Two point sources of RF radiation F91.1 and F91.2 take places in the focuses of the paraboloid arches of parabolic dishes D91.1 and D91.2 correspondingly. An antenna-interface [not shown here] splits the RF signal and provides that two point RF sources F91.1 and F91.2, frequently called antenna feeds, radiate identically modulated RF signals S91.1 and S91.2, wherein signal S91.2, when considered at focal point F91.2, differs from signal S91.1, wherein signal S91.2, considered at focal point F91.1, by sign. The added degree of freedom to manipulate by the sign difference between the two signals S91.1 and S91.2 distinguishes the case of the modified double-dish antenna A91 from the case described herein above referring to FIG. 8e, where the required sign difference is implemented using path-lengths differing on half-integer number k of wavelengths λ. The added degree of freedom to manipulate by the sign difference provides for the condition $s_1(t) = -s_2(t-\tau/2)$, where t is the current time, $s_1(t)$ is the characteristic of RF signal S91.1 and $s_2(t)$ is the characteristic of RF signal S91.2. Two RF signals S91.1 and S91.2 are originally launched to propagate dominantly along sagittal axis A91.0, wherein
  insular RF signal S91.1 originally has the circle cross-section with the diameter of the specific characteristic length equal to 2×n×λ in a frontal cross-sectional plane, and cladding RF signal S91.2 originally has the cross-section in the form of a ring with cross-sectional width W91.2 equal to a half of the specific characteristic length in a frontal cross-sectional plane [i.e. the cross-sectional width W91.2 equals $n \times \lambda$].

Two RF signals: insular S91.1 and cladding S91.2, differing in a spatial way, together form the cumulative spatially modulated signal S91 within imaginary cylinder C91.2, wherein the cumulative spatially modulated signal S91 originally has the cross-sectional division between two RF signals: insular S91.1 and cladding S91.2. The distance L91 between the two point sources of RF radiation F91.1 and F91.2 defines the path difference between two RF signals S91.1 and S91.2. Moreover, a certain time-delay between insular and cladding RF signals S91.1 and S91.2, correspondingly, is chosen such that, when considering points belonging to the side of imaginary cylinder C91.1, cladding RF signal S91.2 becomes delayed on $\tau/2$ (i.e. on $n \times \lambda$) with respect to insular RF signal S91.1.

Each of signals: insular S91.1 and cladding S91.2 has a tendency to propagate also out of imaginary cylinder C91.2 because both dishes D91.1 and D91.2 of the modified double-dish A91 have limited cross-sectional areas and, what is in principle important, because the mentioned homogeneous poorly-permeable lossy medium, usually, has a non-zero electrical conductivity causing the dissipation of RF electromagnetic wave energy due to transforming of the RF electromagnetic wave energy into the energy of oscillating RF electrical current within the homogeneous conductive medium, wherein the oscillating RF electrical current, in turn, becoming scattered within the homogeneous conductive medium and further becoming reincarnated into scattered RF electromagnetic waves, in particular, in the cross-sectional directions perpendicular to sagittal axis A91.0. Thus, insular and cladding RF signals S91.1 and S91.2, correspondingly, become scattered in the homogeneous conductive and so lossy medium, causing the tendency of RF signals S91.1 and S91.2 propagation also out of imaginary cylinder C91.2. Here, RF signal S91.10 is the scattered part of insular RF signal S91.1, which has the tendency to propagate outside imaginary cylinder C91.2;

RF signal S91.20 is the scattered part of cladding RF signal S91.2, which has the tendency to propagate outside imaginary cylinder C91.2; and RF signal S91.30 is the superposition of insular and cladding RF signals S91.10 and S91.20, correspondingly.

The inter-delayed identically-modulated RF signals S91.1 and S91.2, when scattered in the cross-sectional directions and superposed in points outside the imaginary cylinder C91.2, are differing in phase on 180°, as, when originally launched, being differing in sign.

The delay and sign difference result in the dominant inter-compensation of superposed signals S91.10 and S91.20 such that combined signal S91.30 brings no energy outside imaginary cylinder C91.2. The superposition of scattered components of RF signals S91.1 and S91.2, propagating in the frontal cross-sectional directions perpendicular to sagittal axis A91.0, gives a so-called standing wave within the frontal cross-section of imaginary cylinder C91.2. Thus, there are no energetic signals propagating in the frontal cross-sectional directions perpendicular to sagittal axis A91.0. This results in a propagation of cumulative spatially modulated signal S91, composed of identically modulated RF signals S91.1 and S91.2, along sagittal axis A91.0 within imaginary cylinder C91.2 only.

In other words, imaginary cylinder C91.2 performs an imaginary waveguide for signal S91 composed and superposed of identically modulated RF signals S91.1 and S91.2
- having the modulation periodicity of T corresponding to $2 \times n \times \lambda$,
- differing in delay corresponding to phase difference of $n \times 360°$,
- differing in sign (i.e. in addition differing in phase of 180°), and
- differing in cross-sectional distribution of intensity wherein the cross-sections are separated by the distance of $n \times \lambda$.

I.e. identically modulated insular and cladding RF signals S91.1 and S91.2, correspondingly, form modulated signal S91, self-wave-guiding along the imaginary waveguide within imaginary cylinder C91.2. Thereby, modified double-dish antenna A91, when radiating a specifically periodically modulated electromagnetic signal, operates as a self-wave-guiding antenna having an extremely increased directivity.

Figure 9B:
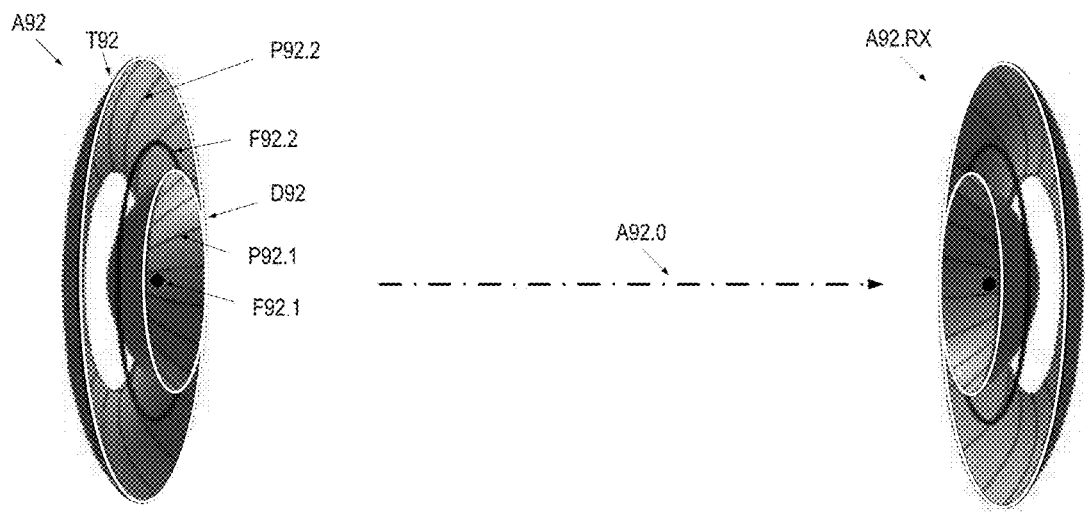
FIG. 9b is a schematic illustration of a modified split-reflector antenna.

FIG. 9b is a schematic illustration of a specifically modified cloven parabolic wave-guiding antenna, namely, a modified split-reflector antenna A92, as an exemplary enhancing embodiment of the present invention, comprising insular reflecting parabolic dish D92, having paraboloid arches with radially-sectional contour fragments P92.1, and cladding toroidal parabolic reflecting trough T92, having arches with radially-sectional contour fragments P92.2. For simplicity and without loss of generality, radially-sectional contour fragments P92.1 and P92.2 are parabolically-curved contour fragments of identical parabolas. Parabolic dish D92 comprises an RF source arranged in the paraboloid focus point F92.1 and the toroidal parabolic reflecting trough T92 comprises RF source F92.2 taking place in the locus of the focuses of the radially-sectional parabolic contour fragments of reflecting trough T92. Modified split-reflector antenna A92 operates analogously to modified double-dish antenna A91 described herein before referring to FIG. 9a, wherein, in contrast to big parabolic dish D91.2 having point RF source F91.2 positioned in the paraboloid focus point, toroidal parabolic reflecting trough T92 of modified split-reflector antenna A92 comprises RF source F92.2 taking place in the locus of focuses of the radially-sectional parabolically-curved contour fragments of the toroidal parabolic reflecting trough T92.

The inventor points out that the two geometrically identical and electronically matched self-wave-guiding antennas, for instance,
- modified split-reflector antenna A92, operating in a transmission mode, and
- modified split-reflector antenna A92.RX, operating in a receiving mode, arranged, to have a common sagittal axis A92.0 and to be faced each to other, become capable of an efficient communication through a homogeneous poorly-permeable and so lossy medium.

Figure 9C:
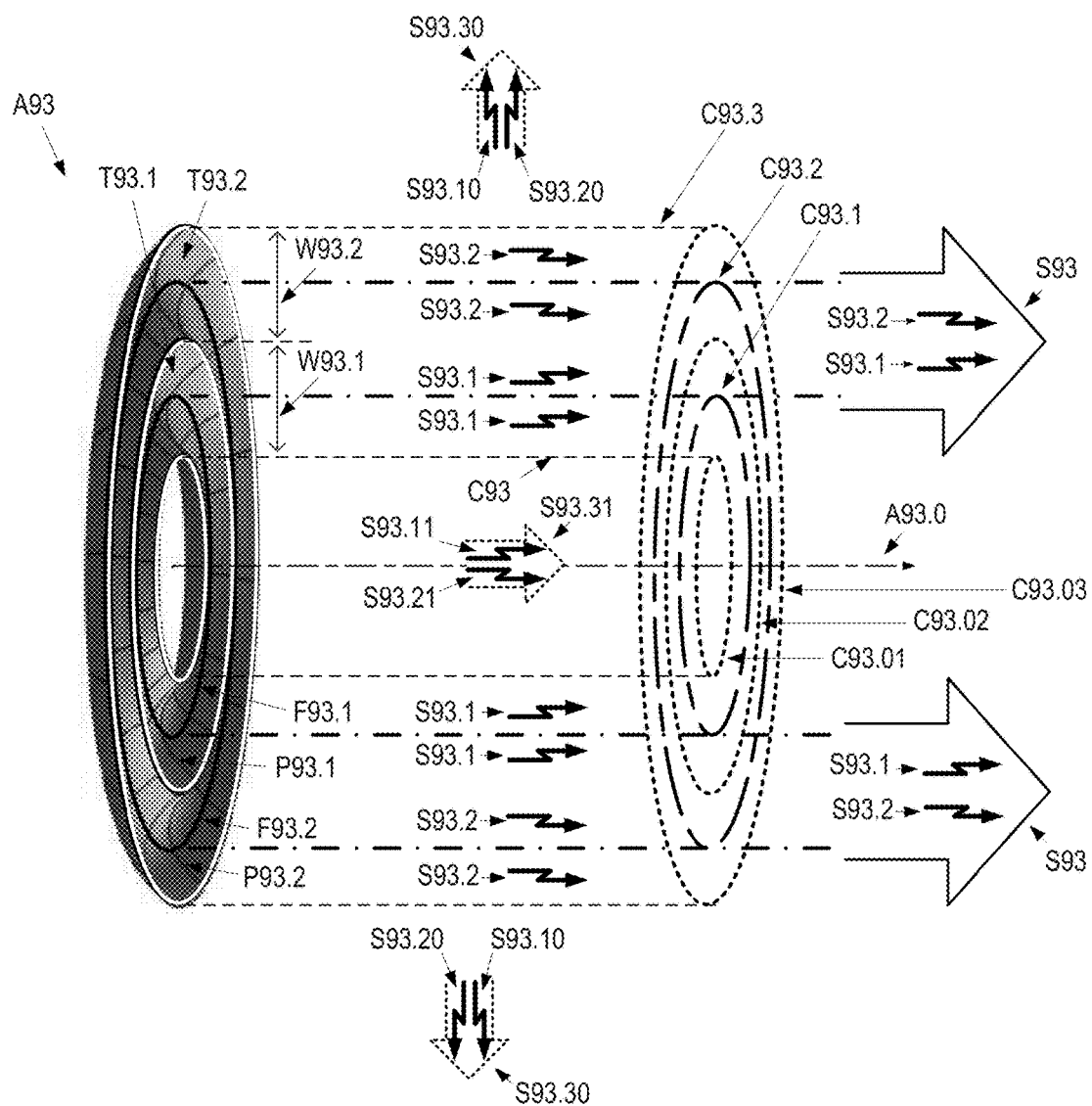
FIG. 9c is a schematic illustration of a modified double-trough antenna.

FIG. 9c is a schematic illustration of a specifically modified cloven parabolic wave-guiding antenna, namely, a modified double-trough antenna A93, as an exemplary enhancing embodiment of the present invention, comprising two mutually-adjacently-aligned sub-antennas having reflecting troughs T93.1 and T93.2, both having a cross-sectional shape in a closed ring-like form, having toroidal parabolic arches with radial sectional contour fragments P93.1 and P93.2 of parabolas with identical widths W93.1 and W93.2, each equal to $n \times \lambda$, where $\lambda$ is the wavelength of the radiated carrier RF wave, and n is chosen such that the distance $2 \times n \times \lambda$ corresponds to the time period $\tau$ of the ultra-short-time pulses repeating. For simplicity and without loss of generality, n is integer. For simplicity and without loss of generality, the mentioned parabolas, as well as radially-sectional parabolically-curved contour fragments P93.1 and P93.2, are identical. Two sources of RF radiation F93.1 and F93.2 take places in loci of the focuses of the toroidal parabolic arches P93.1 and P93.2 correspondingly. Thereby, two RF signals: insular S93.1 and cladding S93.2 are originally launched and parallelized to propagate dominantly along sides of imaginary cylinders C93.1 and C93.2, correspondingly, wherein each of signals S93.1 and S93.2 originally has the cross-sectional width of n×λ in a frontal cross-sectional plane. Two RF signals: insular S93.1 and cladding S93.2, differing in a spatial way, together form the cumulative spatially modulated signal S93 in an imaginary cylindrical corridor within cylinder C93.3 excluding cylinder C93, wherein the cumulative spatially modulated signal S93 has the cross-sectional division between two RF signals: insular S93.1 and cladding S93.2. Each of signals S93.1 and S93.2 has a tendency to propagate also out of the imaginary cylindrical corridor due to the signals scattering in the cross-sectional directions perpendicular to sagittal axis A93.0. Here, RF signal S93.11 is the scattered part of insular RF signal S93.1, which has tendency to propagate within cylinder C93;

RF signal S93.21 is the scattered part of cladding RF signal S93.2, which has tendency to propagate within cylinder C93;

RF signal S93.31 is the superposition of RF signals S93.11 and S93.21;

RF signal S93.10 is the scattered part of insular RF signal S93.1, which has tendency to propagate outside cylinder C93.3;

RF signal S93.20 is the scattered part of cladding RF signal S93.2, which tendency to propagate outside cylinder C93.3; and RF signal S93.30 is the superposition of RF signals S93.10 and S93.20.

An antenna-interface [not shown here] splits the periodically modulated RF signal and provides that two RF sources F93.1 and F93.2 radiate identically-modulated RF signals S93.1 and S93.2, wherein cladding RF signal S93.2 being delayed on n×λ and in addition differing in sign with respect to insular RF signal S93.1. Therefore, the inter-delayed identically modulated insular and cladding RF signals S93.1 and S93.2, correspondingly, when scattered in the frontal cross-sectional directions and superposed in points outside the imaginary cylinder C93.3 as RF signals S93.10 and S93.20 as well as when scattered in the frontal cross-sectional directions and superposed in points within the imaginary cylinder C93 as RF signals S93.11 and S93.21, are differing in phase on 180°.

The delay and sign difference result in the dominant inter-compensation of superposed signals S93.10 and S93.20 such that combined signal S93.30 brings no energy outside imaginary cylindrical corridor C93.3 as well as result in the dominant inter-compensation of superposed signals S93.11 and S93.21 such that combined signal S93.31 brings no energy within imaginary cylindrical corridor C93.

The superposition of scattered components of insular and cladding RF signals S93.1 and S93.2, correspondingly, propagating in the frontal cross-sectional directions perpendicular to sagittal axis A93.0, gives a standing wave within the frontal cross-section of the imaginary cylindrical corridor formed within cylinder C93.3 excluding cylinder C93. Thus, there are no energetic signals propagating in the frontal cross-sectional directions perpendicular to sagittal axis A93.0. This allows for a propagation of cumulative spatially modulated signal S93, superposed of identically modulated insular and cladding RF signals S93.1 and S93.2, correspondingly, along sagittal axis A93.0 within the imaginary cylindrical corridor between cylindrical sides C93.3 and C93 only.

In other words, the imaginary cylindrical corridor within cylinder C93.3 excluding cylinder C93 performs an imaginary waveguide for signal S93 composed and superposed of the identically modulated insular and cladding RF signals S93.1 and S93.2, correspondingly, having a modulation periodicity of τ corresponding to 2×n×λ, differing in delay corresponding to phase difference of n×360°, differing in sign (i.e. in addition differing in phase of 180°), and differing in cross-sectional distribution of intensity wherein the frontal cross-sections are separated by the distance of n×λ.

I.e. identically modulated insular and cladding RF signals S93.1 and S93.2, correspondingly, form modulated signal S93, self-wave-guiding along the imaginary waveguide within an imaginary cylindrical corridor formed between the sides of imaginary cylinders C93 and C93.3. Thereby, modified double-trough antenna A93, when radiating a specifically periodically modulated electromagnetic signal, operates as a wave-guiding antenna having an extremely increased directivity.

In view of the foregoing description referring to FIG. 9c, it will be evident to a person skilled in the art, that, defining a closed ring-like shape in a wide sense as a locus of points belonging to a portion of frontal plane bordered by two disjoint equidistantly-aligned closed curves [for instance, bordered by circle contours C93.01 and C93.02 bordering a projection of trough T93.1 on the frontal plane], the cross-sectional overall ring-like shape of troughs T93.1 and T93.2 in a frontal plane perpendicular to sagittal axis A93.0 may be similar to either circle, or ellipse, or any smoothly rounded closed form.

Figure 9D:
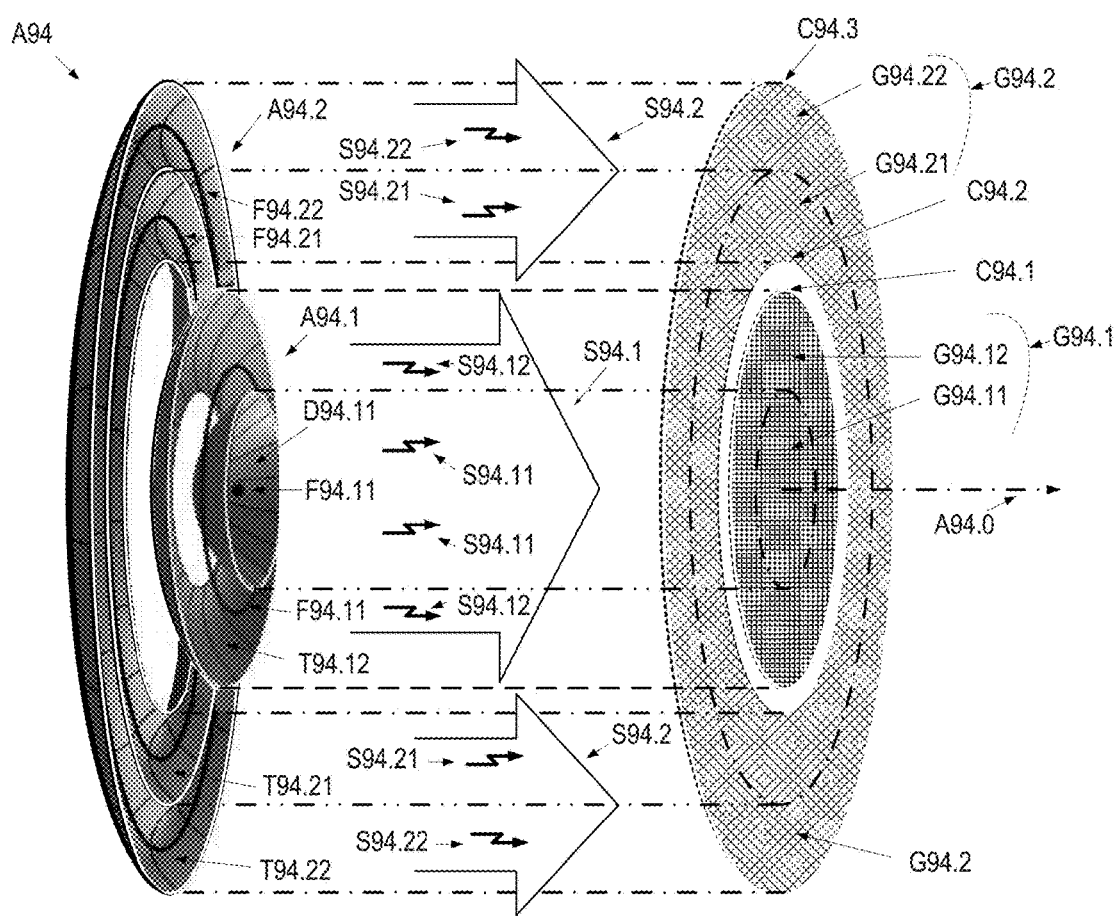
FIG. 9d a schematic illustration of a complicated cloven parabolic wave-guiding antenna.

FIG. 9d is a schematic illustration of a specifically modified cloven parabolic wave-guiding antenna, namely, a complicated antenna A94, as an exemplary enhancing embodiment of the present invention, comprising two sub-antennas:

A94.1, geometrically and constructively similar to the aforementioned modified split-reflector antenna A92 described hereinbefore with the reference to FIG. 9b, and A94.2, constructed to operate similarly to the operation of modified double-trough antenna A93 described hereinbefore with the reference to FIG. 9c.

Namely, the complicated antenna A94 comprises:

RF source (emitter) F94.11 and parabolic dish D94.11 of sub-antenna A94.1 launching insular sub-signal S94.11, RF source (emitter) F94.12 and toroidal parabolic trough T94.12 of sub-antenna A94.1 launching sub-signal S94.12, cladding with respect to insular sub-signal S94.11, RF source (emitter) F94.21 and toroidal parabolic trough T94.21 of sub-antenna A94.2 launching insular sub-signal S94.21, and RF source (emitter) F94.22 and toroidal parabolic trough T94.22 of sub-antenna A94.2 launching sub-signal S94.22, cladding with respect to insular sub-signal S94.21;

Wherein:
two sub-signals: insular S94.11 and cladding S94.12, form sub-signal S94.1, self-wave-guiding along axis A94.0 and within imaginary waveguide G94.1 comprising two cylindrical corridors: insular G94.11 and cladding G94.12 and being bordered by imaginary cylinder C94.1; and two sub-signals: insular S94.21 and cladding S94.22, form sub-signal S94.2, self-wave-guiding along axis A94.0 and within imaginary waveguide G94.2 comprising two cylindrical corridors: insular G94.21 and cladding G94.22 and being bordered by the sides of imaginary cylinders C94.2 and C94.3.

In view of the foregoing description referring to FIG. 9d, it will be evident to a person skilled in the art, that:
modulating all the sub-signals S94.11, S94.12, S94.21, and S94.22 by the same modulation-function and providing certain delay-conditions and sign-alternation conditions, sub-signal S94.12, cladding sub-signal S94.11, can become insular being cladded by sub-signal S94.21, in turn, being insular, cladded by sub-signal S94.22, and that such a multi-cladding and multi-insulating provides for a higher reliable condition for the self-wave-guiding of the cumulative spatially modulated signal, composed of the multi-cladding and multi-insular sub-signals; and a multiplicity of imaginary waveguides similar to G94.2 can be added forming a more complicated antenna thereby allowing for a multiplicity of disjoint waveguides conveying a multiplicity of orthogonally modulated and processed sub-signals.

In view of the foregoing description referring to FIGS. 9a, 9b, 9c, and 9d in combination with the foregoing description referring to FIG. 8e, it will be evident to a person skilled in the art, that:
as imaginary waveguides G94.1 and G94.2 are disjoint, conveyed self-wave-guiding sub-signals S94.1 and S94.2, correspondingly, remain orthogonal and can be modulated and further processed independently that, in turn, provides additional degrees of freedom to enhance a communication system by increasing a link budget;

a multiplicity of self-wave-guiding orthogonal signals, coaxial as well as propagating along different axes, can be formed by a more complicated antenna thereby allowing for additional degrees of freedom to enhance a communication system by increasing the link budget;

a plenty of spatial geometrical configurations of parabolic troughs of sub-antennas, not obligatorily in the form of rings, can be designed to satisfy the desired condition to parallelize and direct RF electromagnetic wave rays which are originally radiated from a distributed sources, placed in a certain spatial curve;

one can create phase conditions for sub-signals to make a cumulative spatially modulated signal self-focusing (i.e. more resistive to dissipation) when penetrating in a homogeneous lossy medium, using a sheaf of the big number N of refractive waveguides having output butt-ends supplied with parabolic dishes especially distributed and oriented in space; and one can use a pair of wave-guiding matched antennas, for instance, A92 and A92.RX.

Acoustic Antenna

In view of the foregoing description referring to FIGS. 4, 5a, 5b, 5c, 6, 7a, 7b, 8a, 8b, 8c, 8d, 8e, 9a, 9b, 9c, and 9d, it will be evident to a person skilled in the art, that the logic to use waveguides is applicable to acoustic (for instance, ultrasound) wave energy catch, concentration, redirection, guiding, and detection, i.e. for instance, one can:
supply an acoustic antenna of sonar with a sheaf of a big number of elastic fibers playing the role of acoustic waveguides and thereby increase the sensitivity of acoustic signals detection;

design an acoustic wave-guiding antenna to improve a directivity of effective propagation of the acoustic waves through a homogeneous viscous and so lossy medium; as well as design an acoustic wave-guiding antenna playing a role of a precise "pusher" and/or acoustic sail, wherein supplying the acoustic antenna with acoustic waveguides thereby catching, concentrating, and parallelizing the acoustic waves to increase the acoustic radiation pressure and so to increase an efficacy of a transportation in the condition of weightlessness (for example, in zero gravity, one can design an acoustic pusher for stabilizing objects in indoor space and for pumping of fluids).

An Improving Shaped Component for a Receiving-Transmitting Antenna

To formulate the essence of the invention, the formulation of the invention essence is divided between two blocks:
first, called "Terminology for Generalization", comprising terminology and definitions, and second, called "Formulation of the invention Essence", comprising description of the invention essence itself.

Terminology for Generalization

For the purposes of the present invention to generalize the suggested constructive solution, the term "generalized unclad waveguide" should be understood in a wide sense as a construction providing inter-superposition of propagating wave beam portions in accordance with the Huygens-Fresnel principle resulting in a directional conveying of the wave beam as a whole and the term "generalized waveguide beam-maker" should be understood as applied to the generalized unclad waveguide supplied with an interface parabolic reflector, wherein an interface butt-end of the generalized unclad waveguide is located at the focus of parabola associated with the interface parabolic reflector.

The inventor points out that the terms:
"forcedly-conveying waveguide effect", applied to optic fibers, and "self-focusing waveguide effect", applied to a parabolic reflector: either parabolic dish and/or parabolic trough, have a common sense meaning the effect of superposition of wave portions of said beam of rays causing constructive-destructive interference in accordance with the Huygens-Fresnel principle of beam propagation and thereby resulting in said jumping changes of a beam of rays interference map pattern in a cross-sectional beam-front plane.

The inventor points out that the definition of the generalized waveguide beam-maker, based on the definition of the generalized unclad waveguide, is common for:
an unclad optic fiber supplied with an interface parabolic reflector, an imaginary corridor comprising a parabolic reflector portion, and a combination of both: the unclad optic fiber and the imaginary corridor.

Thus,
on the one hand, in view of the foregoing description referring to FIGS. 4, 5a, 5b, 5c, 6, 7a, 7b, 8a, 8b, 8c, 8d, and 8e, and on the other hand, in view of the foregoing description referring to FIGS. 9a, 9b, 9c, and 9d,
the suggested constructive solution can quintessentially be formulated as an improving shaped component for a receiving-transmitting antenna, wherein the primary feature of the improving shaped component is a sheaf of a big number of generalized unclad waveguide beam-makers as a whole being either:
  exposed to ambient radiation allowing for reflections and refractions of the ambient radiation multi-stage repeatedly, when the receiving-transmitting antenna functioning in a receiving mode; and/or
  oriented to direct an emitted complicated spatially modulated beam composed of a big number of sub-beams differing in delays and phases and propagating along parallel paths, when the receiving-transmitting antenna functioning in a transmitting mode,
correspondingly.
For the purposes of the present invention, to generalize the suggested constructive solutions and to describe the primary features strictly, a set of interrelated terms is defined in order to be understood in a wide sense as follows:
(a) a wave, called also a propagating wave, is defined as, commonly known in physics, an oscillation accompanied by a transfer of energy that travels through a medium being at least one of vacuum and matter; said propagating wave is at least one of:
  an electromagnetic wave, being at least one of a radio frequency electromagnetic wave and an electromagnetic wave as sunlight, wherein said sunlight is at least one of infrared, visible, and ultraviolet light; and
  an acoustic wave, being at least one of hearable sound and ultrasound;
  wherein accompanying terms are specified as follows:
  a wave-front is defined as a surface of an equal phase;
  a plane wave is defined as a wave whose wave-fronts are portions of parallel planes;
  a ray is defined as said plane wave propagating in a certain direction;
  a radiation defined as said wave composed of said rays;
  a beam of said rays is defined as a beam composed of rays propagating in parallel;
(b) an ambient wave beam is defined as at least one of:
  a direct wave, emitted by a source of radiation and reaching said improving shaped component on a line of sight;
  a reflected wave, emitted by said source of radiation, reflected from reflective surroundings, and then reaching said improving shaped component; and
  a scattered wave, originally emitted by said source of radiation, then being subjected to scattering in ambient medium, and then partially reaching said improving shaped component;
(c) a homogeneous medium is defined as medium, characterized by uniformity of spatial physical parameters: density, elasticity, viscosity, dielectric constant, and electrical conductivity; wherein said medium being subjected to penetration of said propagating wave, and wherein said uniformity is defined with respect to said propagating wave; namely, said uniformity is defined as a condition wherein said medium having heterogeneousness of a linear size being much smaller than the wavelength of the propagating wave; wherein said homogeneous medium is further called at least one of:
  a dielectric medium, when said wave is said electromagnetic wave and wherein said medium is primarily characterized by a uniform dielectric constant and negligible electrical conductivity;
  a conductive medium, when said wave is said electromagnetic wave and wherein said medium is primarily characterized by a uniform dielectric constant and uniform electrical conductivity; and
  an elastic medium, when said wave is said acoustic wave and wherein said medium is primarily characterized by a uniform density, uniform elasticity, and uniform viscosity;
  wherein a homogeneous easily-permeable medium is defined as the homogeneous medium being at least one of:
  said dielectric medium having heterogeneousness of a linear size being smaller than one-tenth of the wavelength of the propagating wave; and
  an elastic medium, having a negligible viscosity;
  wherein a homogeneous poorly-permeable medium is defined as the homogeneous medium being at least one of:
  said dielectric medium having heterogeneousness of a linear size being smaller than the wavelength of the propagating wave and bigger than one-tenth of the wavelength of the propagating wave;
  said conductive medium; and
  an elastic and viscous medium;
(d) an angle of incidence is defined as an angle between said ray and a normal to a surface, wherein said angle of incidence which equals zero is further called "the zero angle of incidence";
(e) a generalized unclad waveguide is defined as a certain spatial wave-conveying corridor having:
  a shape of an elongated pipe having a substantially long length and a cross-section having the maximal linear size being small with respect to the substantially long length such that the substantially long length is longer than the maximal cross-sectional size by a factor of at least 10, and wherein the substantially long length having the claimed sense is longer than 10 cm;
  wherein said elongated pipe comprising:
    a core, being transparent for said waves, wherein said transparent core is made from a material, having a refractive index, applicable to the ambient wave beams and being higher than the refractive index of the ambient medium; and
    a butt-end being at least one of an interface butt-end and an outlet butt-end, wherein said butt-end being transparent for said ambient wave beams; and
  an unclad transparent side shell bordering the elongated pipe along the elongated pipe substantially long length, wherein said unclad transparent side shell being characterized by jumping changes of said beam of rays interference map pattern, namely, said unclad transparent side shell, in turn, being defined as a spatial boundary separating a portion of medium, being subjected to the propagation of said beam of rays, from a portion of the medium, being free from the propagation of the beam of rays; wherein said unclad transparent side shell being at least one of:
    real solid walls being transparent for said ambient wave beam,
    imaginary walls of said certain spatial wave-conveying corridor being unclad, wherein said imaginary walls being formed by jumping changes of spatial physical parameters of medium of said certain spatial wave-conveying corridor with respect to ambient medium, and imaginary walls, formed by superposition of wave portions of said beam of rays causing constructive-destructive interference and thereby resulting in said jumping changes of said beam of rays interference map pattern;

(f) a generalized unclad waveguide beam-maker is defined as the generalized unclad waveguide being supplied with a parabolic reflector, being at least one of interface and outlet and having an inner concave paraboloid arch-vault capable of reflection said rays, wherein the butt-end is located in the paraboloid's focus:
  to parallelize the rays released from the butt-end, and
  to direct the parallelized rays to an impacted surface at the zero angle of incidence,
  when the receiving-transmitting antenna functioning in a receiving mode;
    wherein the inventor points out that the definition of said generalized unclad waveguide beam-maker should be understood in a wide sense including:
    an unclad wave-conveying corridor, called dielectric waveguide, comprising a dielectric core, being transparent for said electromagnetic radiation, having a refractive index being higher than the refractive index of ambient medium, and being supplied with said parabolic reflector of electromagnetic waves;
    an unclad wave-conveying corridor, called acoustic waveguide, comprising an elastic core, being transparent for said acoustic wave, having a refractive index being higher than the refractive index of ambient medium, and being supplied with said parabolic reflector of acoustic waves; and
    an imaginary bordered uniform wave-conveying corridor, called self-bordering elemental waveguide, comprising a portion of a parabolic reflector being at least one of a parabolic dish and a parabolic trough:
      to form a spatial boundary separating a portion of medium, being subjected to the propagation of said beam of rays along a sagittal axis perpendicular to the directrix of parabola associated with said parabolic reflector, from a portion of the medium, being free from the propagation of the beam of rays; and thereby
      to become capable of conveying the beam of rays through said homogeneous easily-permeable medium;

(g) a conveyed wave beam is defined as said beam of rays, propagating within said generalized unclad waveguide;

(h) a forcedly-conveying waveguide effect is defined as a phenomenon of said wave propagation along a zig-zag path between two boundaries within the generalized unclad waveguide due to the phenomenon of total internal reflection in accordance with the Huygens-Fresnel principle;

(i) a self-focusing waveguide effect is defined for said generalized wave, being reflected from said parabolic reflector, as a phenomenon of said reflected wave propagation along a sagittal axis perpendicular to a directrix of parabola associated with said parabolic reflector in accordance with the Huygens-Fresnel principle;

(j) a generalized waveguide effect is defined in a widen sense as superposition and thereby interference of wave beam portions in accordance with the Huygens-Fresnel principle of wave propagation thereby resulting in a tendency of wave beam propagation along and within a wave-conveying corridor, namely, the generalized waveguide effect is further specified as at least one of:

the forcedly-conveying waveguide effect, wherein the wave-conveying corridor being formed by a spatial boundary separating different materials, to provide for conditions of a total internal reflection of said conveyed wave beam; and the self-focusing waveguide effect, wherein the wave-conveying corridor being imaginary bordered by jumping changes of said beam of rays interference map pattern, namely, the wave-conveying corridor being formed by a spatial imaginary unclad transparent side shell separating between two portions of medium:
  conveying, being subjected to the propagation of said conveyed wave beam, and
  ambient, being free from the propagation of the wave beam; and (k) a sheaf of a big number N of the generalized unclad waveguide beam-makers is defined as a multiplicity of the big number N of the generalized unclad waveguides, wherein the big number N is defined as at least 10, and wherein the generalized unclad waveguide beam-makers are densely-arranged near to each other such that the average distance between the nearest generalized unclad waveguides is at most of one-tenth of the average length of the waveguides;
  wherein the inventor points out that the definition of the sheaf of a big number N of the generalized unclad waveguide beam-makers should be understood in a wide sense including at least one of:
    a multiplicity of the big number N of dielectric waveguide beam-makers bundled together and;
    a multiplicity of the big number N of elastic waveguide beam-makers bundled together; and
    an imaginary bordered complicated wave-conveying corridor comprising a multiplicity of the big number N of said generalized unclad waveguide beam-makers specified as said self-bordering elemental waveguides having parabolic reflector portions, wherein said parabolic reflector portions being divided between at least two groups of the parabolic reflector portions differing in position of focal points of parabolas associated with said at least two groups of the parabolic reflector portions, correspondingly, to provide a spatial modulation of said beam of rays and, in turn, to provide an enhanced self-focusing waveguide effect, namely:
      to provide anti-phase superposition resulting in destructive interference and thereby resulting in inter-compensation of wave portions being scattered and thereby reached a point outside the imaginary bordered complicated wave-conveying corridor, thereby
      to provide conditions for:
        an effective suppression of the scattering of said propagating wave, and thereby
        a conservation the propagating wave energy within the imaginary bordered complicated wave-conveying corridor, and thus,
      to make the imaginary bordered complicated wave-conveying corridor be capable of conveying the beam of rays through a homogeneous poorly-permeable medium.

Formulation of the Invention Essence

Thus, referring to the expound definitions, an improving shaped component for the receiving-transmitting antenna is claimed as a component comprising:

a surface at least one of:
being subjected to impact by said conveyed wave beam, further called an impacted surface, when the receiving-transmitting antenna operates in a receiving mode; and
emitting said conveyed wave beam, further called an emitting surface, when the receiving-transmitting antenna operates in a transmitting mode; and
said sheaf of a big number N of said generalized unclad waveguide beam-makers to be submerged in ambient medium and oriented to provide that at least one of:
each of the interface butt-ends of the big number N of said generalized unclad waveguides being supplied with said interface parabolic reflector becoming faced to at least one of:
said impacted surface, and
said emitting surface, and
each of the outlet butt-ends of the big number N of said generalized unclad waveguides being supplied with said outlet parabolic reflector becoming faced away from at least one of:
said impacted surface, and
said emitting surface;
wherein:
when the receiving-transmitting antenna operates in the receiving mode,
said sheaf of a big number N of said generalized unclad waveguide beam-makers as a whole being exposed to said ambient wave beams, yet to be subjected to the forcedly-conveying waveguide effect, at an arbitrary angle of incidence to allow for a penetration of said ambient wave beams into said sheaf of a big number N of said generalized unclad waveguides across said unclad transparent side shells of said generalized unclad waveguides and through said generalized unclad waveguides thereby subjecting said ambient wave beams to partial refraction within each said generalized unclad waveguide so resulting in scattering a portion of wave energy, brought by said ambient wave beams, among the multiplicity of said generalized unclad waveguides multi-stage repeatedly, to provide that each of said generalized unclad waveguides of said sheaf entrapping at least a sub-portion of the wave energy portion, brought by said ambient wave beams, due to the effect of total internal reflection, thereby, in the final analysis, providing conditions to redirect and convey the sub-portions of the wave energy portion,
which is brought by the ambient wave beams becoming reincarnated into a multiplicity of the big number N of conveyed sub-beams propagating within the multiplicity of the big number N of the generalized unclad waveguides, correspondingly, along zig-zag paths to said interface butt-ends of said waveguides due to the generalized waveguide effect,
to said interface butt-end supplied with said interface parabolic reflector faced to said impacted surface; and
when the receiving-transmitting antenna operates in the transmitting mode,
each of said generalized unclad waveguide beam-makers comprising said outlet parabolic reflector faced away from said emitting surface.

Beneficial Qualities

The inventor points out that in relation to really bordered refractive waveguides originating the forcedly-conveying waveguide effect, the combined seemingly obvious features of the improving shaped component, namely:
an increased length of the generalized unclad waveguides,
a transparency of unclad side shell of the generalized unclad waveguides,
a sheaf of a big number of the generalized unclad waveguides,
exposition of the sheaf of the big number of the waveguides as a whole to the ambient waves at an arbitrary angle of incidence, such that just the transparent unclad side shells are exposed to the ambient generalized waves, yet to be:
subjected to the refractive waveguide effect, and, thereby,
reincarnated into conveyed waves;
locating the interface butt-ends in focuses of paraboloid arch-vaults of butt-end dishes to reflect and parallelize rays, emitted from the interface butt-ends omni-directionally, and
facing the interface parabolic reflectors (in the focuses of which the interface butt-ends of the generalized unclad waveguides are placed) to a surface, subjected to impact by the waves,
altogether provide a new beneficial quality of the improving shaped component. The new beneficial quality includes the features mentioned hereinabove in the description referring to FIG. 7a, namely, these are the desirably provided:
a substantial increase in a cross-sectional area of direct rays reaching the impacted surface;
efficient entrapping of the direct and indirect rays using the multi-stage repeatedly entrapping the waves by the sheaf of the relatively narrow and long generalized unclad waveguides;
principle allowance for indirect rays, scattered and/or reflected, to reach the impacted surface;
parallelizing the direct and indirect rays and making the parallelized rays becoming incident on the impacted surface at the right angle (i.e. at the zero angle of incidence);
the concentration of the entrapped ambient radiation, having the increased cross-sectional area, before reaching the impacted surface such that the increased cross-sectional area of the entrapped ambient radiation is substantially bigger than the area of the impacted surface;
making it substantially unnecessary to orient the impacted surface and/or input butt-ends of the generalized waveguides permanently tracing after the source of radiation (for instance, to orient a solar panel permanently tracing after the sun position or to face a solar sail to the sun); and
that, when trying to redirect the collected sunrays to an absorbing solar power tower, the originally in-phase and orthogonal sunlight rays as well as the pairs of originally anti-phase sunlight rays, the all becoming redirected to the goal as illustrated in FIG. 7a.
Further, in relation to imaginary bordered waveguides originating the self-focusing waveguide effect, the combined seemingly obvious features of the improving shaped component, namely:
a set of parabolic reflectors,
a surface emitting said generalized wave, further called an emitting surface, when the modulating transmitting antenna operates in a transmitting mode; and
the complicated parabolic antenna composed of the big number N of parabolic antenna portions operating as the generalized unclad waveguide beam-makers specified as having imaginary walls, wherein the multiplicity of the generalized unclad waveguide beam-makers is divided between at least two groups differing in phase of conveying wave beams wave-fronts in a cross-sectional plane,
altogether provide for a new beneficial quality, namely, for enhanced conveying of the wave beams through a homogeneous poorly-permeable and thereby lossy medium as described hereinabove referring to FIGS. 8d, 8e, 9a, and 9b. As well, a combination of two kinds of sheaves:
  a sheaf of a big number of the really bordered generalized unclad waveguide beam-makers; and
  a sheaf of a big number of the imaginary bordered generalized unclad waveguide beam-makers;
provides for a new beneficial quality, namely, for enhanced both: wide-directional receiving and narrow-directional transmitting of wave beam as described hereinabove referring to FIG. 8d in connection with the sub-paragraph "Enhanced Concentration of Electromagnetic Waves" described hereinabove referring to FIG. 7a.

Terminology, Related to Cloven Parabolic Self-Focusing Antenna

In view of the foregoing description of sub-paragraph "Further Derivative Idea: Self-Wave-Guiding Parabolic Antennas" referring to FIGS. 9a, 9b, 9c, and 9d,
In continuation of the generalization of the claimed improving shaped component for the receiving-transmitting antenna, and
For the purposes of the present invention, to generalize the suggested constructive solutions for a cloven parabolic self-focusing antenna and to describe the primary features of the antenna strictly,
a set of interrelated terms is defined as follows:
(a) an ordinary antenna is defined as a shaped transducer designed to transmit, when operating in a transmission mode, and to receive, when operating in a receiving mode, said waves propagating wirelessly through said ambient medium; wherein said shaped transducer comprising:
  an interface defined as at least one of:
    an exit-directed interface transforming electrical signals generated by an electrical device;
    an entrance-directed interface transforming electrical signals to control an electrical device;
  a reincarnating transformer of wave-power defined as at least one of:
    an emitter of said waves, when said ordinary antenna operating in said transmission mode, and
    a detector of said waves, when said ordinary antenna operating in said receiving mode;
  a feeder defined as a component at least one of:
    conveying said electrical signals from said exit-directed interface to said emitter of said waves, when said ordinary antenna operating in said transmission mode, and
    conveying said electrical signals from said detector to an entrance-directed interface, when said ordinary antenna operating in said receiving mode; and
  a primary reflector defined as a shaped mirror of said waves to provide that:
    when said ordinary antenna operating in said transmission mode, said waves, launched by said emitter of said waves, are subjected to a reflection from said primary reflector to be redirected to a desired direction of propagation through said homogeneous medium, and
    when said ordinary antenna operating in said receiving mode, said waves, arrived to said primary reflector, are subjected to a reflection from said primary reflector to be redirected to said detector of said waves;
(b) a forcedly-conveying wave-guiding antenna is defined as said ordinary antenna, further supplied with the improving wave-guiding component; wherein said generalized unclad waveguide is a transparent refractive waveguide being at least one of: said dielectric waveguide and said acoustic waveguide;
(c) a self-focusing wave-guiding antenna is defined as said ordinary antenna, further supplied with the improving wave-guiding component, wherein said generalized unclad waveguide is said self-bordering elemental waveguide comprising said portion of said parabolic reflector;
(d) a wave-guiding antenna is specified as at least one of: said forcedly-conveying wave-guiding antenna; and said self-focusing wave-guiding antenna;
(e) said interface is further specified as at least one of: said exit-directed interface further specified as comprising:
    a modulator of said electrical signal,
    a splitter of said electrical signal,
    an electronic component to implement a time-delay of said electrical signal, and
    an electronic component to implement a phase manipulation of said electrical signal with a certain time-periodicity;
    to divide said electrical signal between two anti-phased sub-signals: positive and negative, differing in a sign and in said time-delay on a half of the certain time-periodicity, when said ordinary antenna operating in said transmission mode; and
  said entrance-directed interface further specified as comprising:
    a demodulator of said electrical signal,
    a combiner of said sub-signals to form said electrical signal,
    an electronic component to implement a time-delay of said electrical signal, and
    an electronic component to implement a phase manipulation of said electrical signal with said certain time-periodicity;
    to form said electrical signal from two anti-phased sub-signals: positive and negative, differing in a sign and in said time-delay on a half of the certain time-periodicity, when said ordinary antenna operating in said receiving mode;
(f) a closed ring-like shape is defined as a locus of points belonging to a portion of a plane, wherein the portion of the plane being bordered by two disjoint equidistantly-aligned closed curves, wherein each of said two disjoint equidistantly-aligned closed curves is at least one of a circle, an ellipse, and a close contour;
(g) a width of said closed ring-like shape is specified as the distance between said two disjoint equidistantly-aligned closed curves;
(h) a unidirectionally-reflecting paraboloidal surface is defined as a concave surface, reflecting said radiation incident upon said concave surface, wherein said concave surface is a locus of planar parabolically-curved contour fragments, wherein each of said planar parabolically-curved contour fragments being characterized by:
the vertex point,
the focal point,
the focal distance, defined by the distance between the vertex point and the focal point,
a sagittal axis, defined as an axis parallel to the straight line connecting the vertex point to the focal point,
a frontal plane, defined as a plane perpendicular to said sagittal axis, and
a cumulative distance along said sagittal axis, defined as the sum of the focal distance and the distance between the focal point and said frontal plane;
wherein the locus of planar parabolically-curved contour fragments being associated with a locus of the focal points wherein the locus of the focal points being a continuous curve of focuses, and wherein all the cumulative distances, corresponding to said planar parabolically-curved contour fragments belonging to the unidirectionally-reflecting paraboloidal surface and corresponding to the same said frontal plane, are identical; and wherein the unidirectionally-reflecting paraboloidal surface being a concave side of at least one of:
a paraboloidal dish, and
a complete toroidal parabolic trough,
composed of said portions of said parabolic reflector;
(i) a cylindrical-like shape is defined as a spatial locus of lines parallel to said sagittal axis perpendicular to said frontal plane, wherein a cross-section of the spatial locus in any said frontal plane is a connected surface having said closed ring-like shape;
(j) a parabolic sub-antenna of said waves is defined as said ordinary antenna, wherein:
said primary reflector of said waves comprising said unidirectionally-reflecting paraboloidal surface composed of said portions of said parabolic reflector associated with said self-bordering elemental waveguides, wherein a projection of the unidirectionally-reflecting paraboloidal surface to said frontal plane has said closed ring-like shape; and
said reincarnating transformer of wave-power being located at the continuous curve of focuses, corresponding to said unidirectionally-reflecting paraboloidal surface of said primary reflector of said waves, and wherein the reincarnating transformer of wave-power electrically-contacting with said interface, thereby allowing:
to derive said electrical signal released from said exit-directed interface to said emitter of said waves, when said ordinary antenna operating in said transmission mode; and
to derive said electrical signal released from said detector of said waves to said entrance-directed interface, when said ordinary antenna operating in said receiving mode;
thereby, when said parabolic sub-antenna of waves being submerged in said homogeneous easily-permeable medium and operating in a transmission mode, to satisfy the condition for said rays, originally radiated by said emitter of waves and further reflected by said primary reflector of waves, to become parallelized and directed along said sagittal axis and within an imaginary corridor having said cylindrical-like shape characterized by an invariable cross-section with said closed ring-like shape in said frontal plane;

(k) a modulated signal is specified as a kind of power incarnated and reincarnated as follows:
an electrical signal being modulated in and released from said exit-directed interface;
said wave originally being modulated and radiated from said emitter of said waves of said parabolic sub-antenna and further propagating in said homogeneous poorly-permeable medium;
modulated scattered waves further propagating in said homogeneous poorly-permeable medium in all directions and so having a traverse-scattered component propagating in a direction perpendicular to said sagittal axis;
(l) the mean line of said closed ring-like shape is defined as a closed curve in said frontal plane, wherein said closed curve being the locus of points equidistant from said two disjoint equidistantly-aligned closed curves;
(m) the specific characteristic length is defined as the path length which said modulated wave propagates in said homogeneous poorly-permeable medium for the certain time-periodicity; and
(n) an imaginary combined corridor is defined as an integration of the two said imaginary corridors: insular and cladding; said imaginary combined corridor comprising both: said insular and said cladding imaginary corridors, and thereby having said cylindrical-like shape characterized by an invariable cross-section with said closed ring-like shape in said frontal plane and so having a combined cross-section characterized by said width of said closed ring-like shape equal to the specific characteristic length;

Essential Formulation of the Cloven Parabolic Self-Focusing Antenna

A cloven parabolic self-focusing antenna comprising the improving shaped component for the receiving-transmitting antenna, wherein each of said generalized unclad waveguides being said self-bordering elemental waveguide comprising said portion of said parabolic reflector; wherein:
said self-focusing wave-guiding antenna comprising said interface and two said parabolic sub-antennas, further called: "insular" and "cladding", being mutually-adjacently-aligned, arranged, and oriented to have a common said sagittal axis;
each of said insular and cladding parabolic sub-antennas having:
said unidirectionally-reflecting paraboloidal surface, called insular and cladding, correspondingly;
said reincarnating transformer of wave-power, called insular and cladding, correspondingly; and
said primary reflector of waves, called insular and cladding, correspondingly, being composed of one of said at least two groups of said parabolic reflector portions; said one of said at least two groups of said parabolic reflector portions: called insular and cladding, correspondingly;
said insular and cladding mutually-adjacently-aligned parabolic sub-antennas being inter-scaled to satisfy the condition for the mean lines of said closed ring-like shapes corresponding to two said closed cross-sections of said imaginary corridors, insular and cladding, correspondingly, to be distanced on a half of the specific characteristic length in said cross-sectional plane;
said insular and said cladding reincarnating transformers of wave-power being anti-phased:
to radiate, when said ordinary antenna operating in said transmission mode, and to detect, when said ordinary antenna operating in said receiving mode, and said modulated signal being divided between two said anti-phased sub-signals: positive and negative, being at least one of:
released from said exit-directed interface, conveyed to said insular and cladding emitter, correspondingly, to become reincarnated as two differing in sign said waves, further called "insular" and "cladding", correspondingly, when said ordinary antenna operating in said transmission mode; and
reincarnated from said insular and cladding waves into said insular and cladding electrical signals, correspondingly, to be conveyed from said insular and cladding detectors to said entrance-directed interface, when said ordinary antenna operating in said receiving mode;

thereby, when said self-focusing wave-guiding antenna operating in said transmission mode, said insular and cladding primary reflectors of waves, parallelizing and directing said insular and cladding modulated waves, correspondingly; thus, said insular and cladding waves, both being parallelized and directed to have unison tendencies:
to be coaxially-propagating along the common sagittal axis and within said imaginary corridors, insular and cladding, correspondingly, in said homogeneous poorly-permeable medium having a property of at least one of:
said dielectric medium, and
said elastic medium; and
to become partially reincarnating into said scattered waves, insular and cladding, correspondingly, being modulated and propagating in directions perpendicular to the common sagittal axis as said homogeneous poorly-permeable medium having a property of at least one of:
said conductive medium, and
said viscous medium;

thereby, said coaxially-propagating insular and cladding modulated waves and said scattered insular and cladding modulated waves, both having an identical modulation with the certain time-periodicity, but differing in sign, in time-delay, and in spatial location of the sources of said waves; and wherein interrelated said time-delay and said spatial location being chosen for each of said insular and cladding emitters of said waves to be subjected to reflection from said at least two groups of said parabolic reflector portions: insular and cladding, associated with said at least two groups of self-bordering elemental waveguides, called insular and cladding, correspondingly, such that said coaxially-propagating insular and cladding modulated waves reaching said frontal plane with a path difference corresponding to a half of the certain time-periodicity to satisfy the condition for said traverse-scattered insular and cladding modulated waves, propagating together and being superposed, to be inter-compensated outside of said imaginary combined corridor and thereby to satisfy the condition for said coaxially-propagating insular and cladding modulated waves, propagating together and being superposed, to become self-wave-guiding within said imaginary combined corridor, thus, to form an interrogation signal being self-wave-guiding.

Method for Use of an Improving Shaped Component for Wave Energy Absorption

Figure 10:
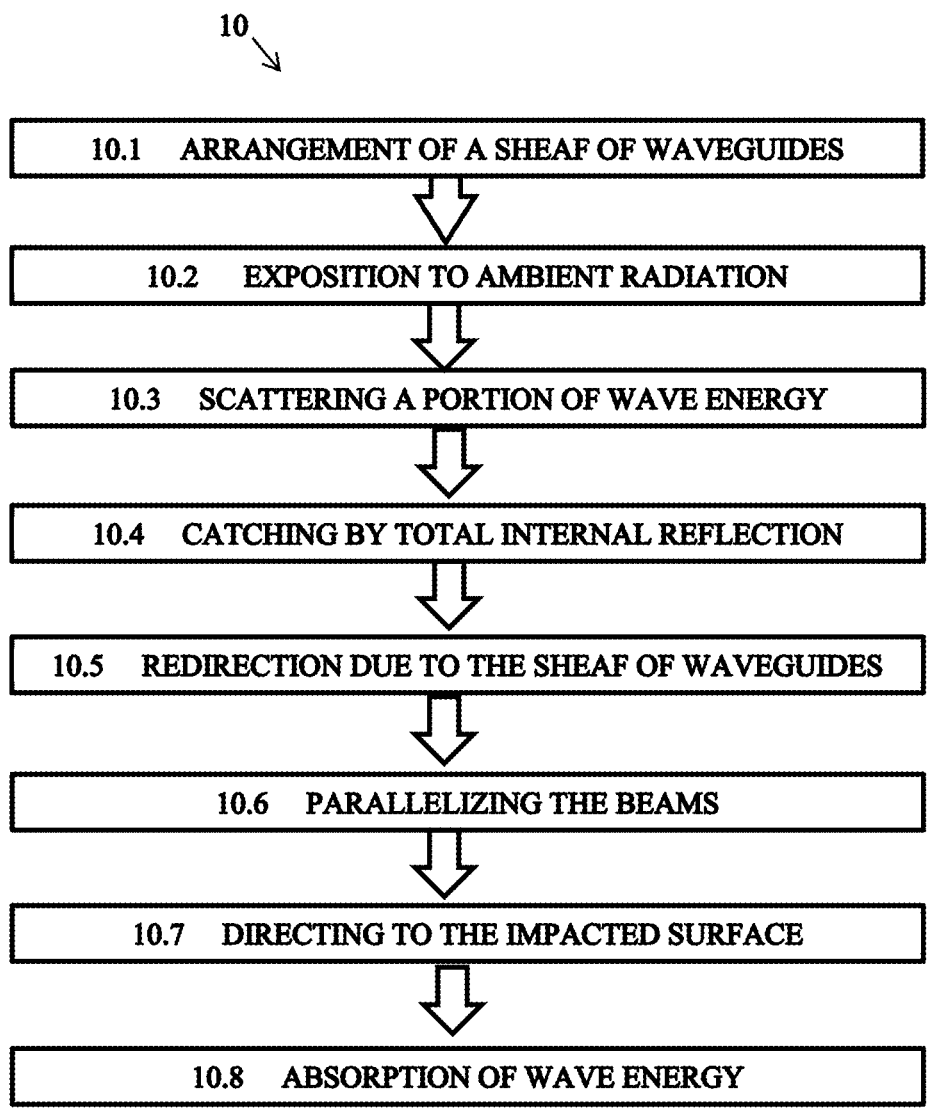
FIG. 10 shows a schematic block-diagram of a method for wave beams energy absorption.

Reference is now made to FIG. 10, showing a schematic block-diagram 10 of a method for use of an improving shaped component for wave beams energy absorption.

In view of the foregoing description referring to FIGS. 4, 5a, 5b, 5c, 6, 7a, 7b, 8a, 8b, 8c, and 8d, it will be evident to a person skilled in the art that a concept to use the waveguide-effect can be generalized as a method for use of an improving shaped component for wave beams energy absorption, wherein the mentioned wave beams are at least one of electromagnetic rays and acoustic signals, and wherein the method comprising the following implementation steps, having corresponding blocks marked by numerals in block-diagram 10, namely:

10.1, arranging the improving shaped component, comprising a sheaf of a big number N of waveguide beam-makers, between a source of ambient wave beams and a wave beams detecting antenna, wherein each of the mentioned waveguide makers comprises a waveguide having an unclad elongated pipe-like corpus, being at least one of straight and screwed and being unclad providing for transparency for the ambient wave beams, and wherein at least one butt-end of each waveguide, further called an interface butt-end, supplied with an interface parabolic reflector, comprising a reflecting arch-vault having a concave profile of parabola and being oriented to direct wave beams, released from the interface butt-end, to an impacted surface of the wave beams detecting antenna at the zero angle of incidence, wherein the big number N is defined as at least 10, wherein the mentioned elongated pipe-like corpus of each of waveguides having a substantially long length and a cross-section having the maximal linear size being small with respect to the substantially long length such that the substantially long length is longer than the maximal cross-sectional size by a factor of at least 10, and wherein the substantially long length having the claimed sense is longer than 10 cm, and wherein the waveguides are densely-arranged near to each other such that the average distance between the nearest waveguides is at most of one-tenth of the average length of the waveguides;

10.2, exposing the sheaf of waveguide beam-makers as a whole to the ambient wave beams, yet to be subjected to the forcedly-conveying waveguide effect and thereby reincarnated into conveyed waves, wherein the ambient wave beams being at least one of:
direct, reaching from the ambient wave beams source to the sheaf of waveguides along a line of sight, and
indirect, partially have been subjected to the Rayleigh scattering of the waves in the environment and partially have been reflected from reflective surroundings;

thereby resulting in:

10.3, scattering a portion of wave energy, brought by ambient wave beams, among the multiplicity of said waveguides multi-stage repeatedly, 10.4, catching the ambient wave beams by the sheaf of waveguides due to at least one of:
the phenomenon of partial internal reflection, and
the phenomenon of total internal reflection,
both occurred within the unclad waveguides to provide that each of said unclad waveguides entrapping at least a sub-portion of the wave energy portion, brought by said ambient wave beams, due to the effect of total internal reflection and the waveguide effect; thereby, in the final analysis, 10.5, providing conditions to redirect and convey the sub-portions of the wave energy portion, brought by the conveyed waves, to said interface butt-end located in the focus of parabola of said reflecting arch-vault faced to said impacted surface;

10.6, parallelizing the conveyed beams as a result of reflection of waves, released through the interface butt-end, from a reflecting arch-vault;

10.7, directing of the parallelized ambient wave beams to the impacted surface of the wave beams detecting antenna at the zero angle of incidence, wherein the directing is at least one of:
along a line of sight,
by a use of a focusing or defocusing mirror, and
by a use of a focusing or defocusing lens; and 10.8, absorbing the wave beams energy and thereby detecting the wave beams, released from the interface butt-end, by the detector of wave beams.

Method for Wave Energy Transmission

Figure 11:
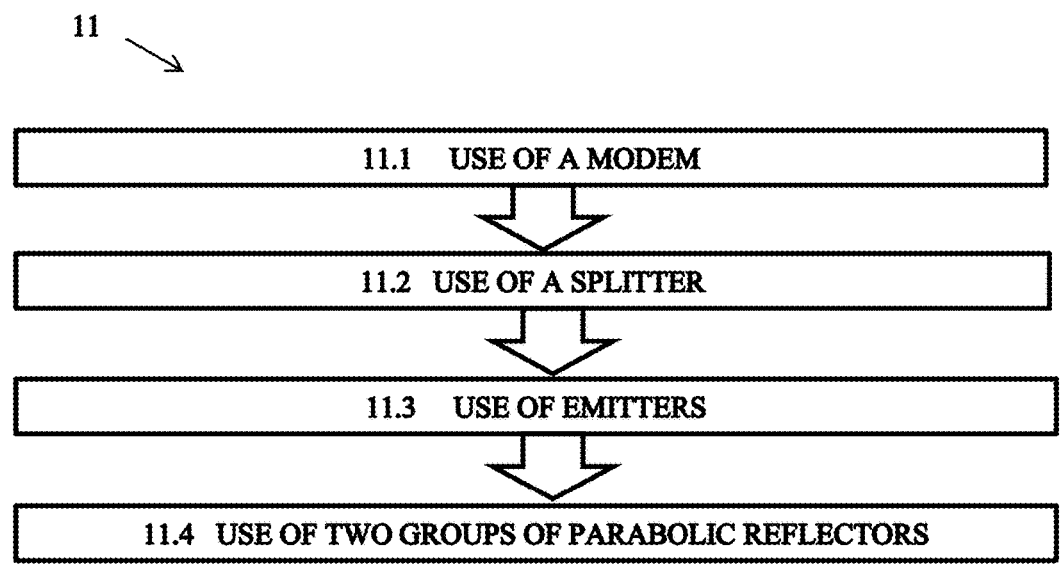
FIG. 11 shows a schematic block-diagram of a method for wave beams energy transmission.

Reference is now made to FIG. 11, showing a schematic block-diagram 11 of a method for wave beams energy transmission through a poorly-permeable medium.

In view of the foregoing description referring to FIGS. 9a, 9b, 9c, and 9d, it will be evident to a person skilled in the art that a concept to use the self-waveguide effect can be generalized as a method for wave beams energy transmission, wherein the mentioned wave beams are at least one of electromagnetic rays and acoustic signals, and wherein the method comprising the following implementation steps, having corresponding blocks marked by numerals in block-diagram 12, namely:

11.1, using a modem,
modulating an electric signal with a certain modulation periodicity τ;

11.2, using an exit-directed interface,
playing the role of a splitter dividing the periodically modulated electric signal between two periodically modulated sub-signals: positive and negative, differing in sign and differing in time-delay of a half of the time-periodicity, thereby, the time-delay being specified as equal to τ/2;

11.3, using emitters of waves,
reincarnating the two periodically modulated sub-signals: positive and negative into two differing in sign and periodically modulated inter-delayed beams: insular and cladding, correspondingly; and 11.4, using two parabolic reflectors, called insular and cladding, correspondingly, wherein each of said two parabolic reflectors having a shape of a closed paraboloid of revolution around a sagittal axis and having said emitter of waves located in the focus of said closed paraboloid of revolution,
thereby providing for a focusing of said two periodically modulated sub-signals: positive and negative, thereby creating two differing in sign and periodically modulated inter-delayed beams: insular and cladding, correspondingly, wherein said two beams being propagating directionally along said sagittal axis and remaining separated in space, wherein an effective distance between the sagittal axis and said cladding beam is longer than an effective distance between the sagittal axis and said insular beam on a value corresponding to the time-delay of τ/2.

It should be understood that the sketched exemplary embodiments are merely for purposes of illustrating the teachings of the present invention and should in no way be used to unnecessarily narrow the interpretation of, or be construed as, being exclusively definitive of the scope of the claims which follow.

It is anticipated that one of skill in the art will make many alterations, re-combinations, and modifications of the embodiments taught herein without departing from the spirit and scope of the claims.

I claim:

1. An improving shaped component for an antenna, comprising:
a surface being at least one of:
an impacted surface, being subjected to impact by a conveyed wave beam when said antenna operating in a receiving mode; and
an emitting surface, emitting a conveyed wave beam when said antenna operating in a transmitting mode; and
a sheaf of a multiplicity of generalized unclad waveguide beam-makers composed of a big number N of generalized unclad waveguide beam-makers, wherein each of said generalized unclad waveguide beam-makers, in turn, is composed of a generalized unclad waveguide and a parabolic reflector, being at least one of interface and outlet, wherein said sheaf of said multiplicity of said generalized unclad waveguide beam-makers to be submerged in ambient medium and oriented to provide that at least one of:
each of interface butt-ends of the big number N of generalized unclad waveguides being supplied with said interface parabolic reflector becoming faced to at least one of:
said impacted surface, and
said emitting surface;
at least one of:
directly, and
indirectly, using at least one intermediate reflector, and
each of outlet butt-ends of the big number N of said generalized unclad waveguides being supplied with said outlet parabolic reflector becoming faced away from at least one of:
said impacted surface, and
said emitting surface;
wherein:
when said antenna, being wide-directional, operating in the receiving mode to entrap, redirect, and convey a propagating wave to said impacted surface,
said sheaf of said multiplicity of said generalized unclad waveguide beam-makers as a whole being exposed to ambient wave beams, yet to be subjected to forcedly-conveying waveguide effect, at an arbitrary angle of incidence to allow for a penetration of said ambient wave beams into said sheaf of said multiplicity of said generalized unclad waveguides across unclad transparent side shells of said generalized unclad waveguides and through said generalized unclad waveguides thereby subjecting said ambient wave beams to partial refraction within each of said generalized unclad waveguides so resulting in scattering a portion of wave energy, brought by said ambient wave beams, among the big number N of said generalized unclad waveguides multi-stage repeatedly, to provide that each of said generalized unclad waveguides of said sheaf entrapping at least a sub-potion of the wave energy portion, brought by said ambient wave beams, due to the effect of total internal reflection,
thereby, providing conditions to entrap, redirect, and convey the sub-potions of the wave energy portion, which is brought by the ambient wave beams becoming reincarnated into a multiplicity of conveyed sub-beams propagating within the big number N of the generalized unclad waveguides, correspondingly, along zig-zag paths to said interface butt-ends of said waveguides due to the generalized waveguide effect, to said interface butt-end supplied with said interface parabolic reflector, wherein said interface parabolic reflector is faced to said impacted surface; and when said antenna, being narrow-directional and being submerged in homogeneous poorly-permeable medium to operate in the transmitting mode, each of said generalized unclad waveguide beam-makers comprising said outlet parabolic reflector faced away from said emitting surface;

wherein a set of used interrelated terms being defined as follows:
  (a) a wave, called also a propagating wave, is defined as an oscillation accompanied by a transfer of energy that travels through a medium being at least one of vacuum and matter, said propagating wave is at least one of:
    an electromagnetic wave, being at least one of a radio frequency electromagnetic wave and an electromagnetic radiation as sunlight, wherein said sunlight is at least one of infrared, visible, and ultraviolet light; and
    an acoustic wave, being at least one of hearable sound and ultrasound;
    wherein accompanying terms are specified as follows:
    a wave-front is defined as a surface of an equal phase;
    a plane wave is defined as a wave whose wave-fronts are portions of parallel planes;
    a ray is defined as said plane wave propagating in a certain direction;
    a radiation is defined as said wave composed of said rays;
    a beam of said rays is defined as a beam composed of rays propagating in parallel;
  (b) an ambient wave beam is defined as at least one of:
    a direct wave, emitted by a source of radiation and reaching said improving shaped component on a line of sight;
    a reflected wave, emitted by said source of radiation, reflected from reflective surroundings, and then reaching said improving shaped component; and
    a scattered wave, originally emitted by said source of radiation, then being subjected to scattering in ambient medium, and then partially reaching said improving shaped component;
  (c) a homogeneous medium is defined as medium, characterized by uniformity of spatial physical parameters: density, elasticity, viscosity, dielectric constant, and electrical conductivity; wherein said medium being subjected to penetration of said propagating wave, and wherein said uniformity is defined with respect to said propagating wave; namely, said uniformity is defined as a condition wherein said medium having heterogeneousness of a linear size being much smaller than the wavelength of the propagating wave; wherein said homogeneous medium is further called at least one of:
    a dielectric medium, when said wave is said electromagnetic wave and wherein said medium is primarily characterized by a uniform dielectric constant and negligible electrical conductivity;
    a conductive medium, when said wave is said electromagnetic wave and wherein said medium is primarily characterized by a uniform dielectric constant and uniform electrical conductivity; and
    an elastic medium, when said wave is said acoustic wave and wherein said medium is primarily characterized by a uniform density, uniform elasticity, and uniform viscosity;
    wherein a homogeneous easily-permeable medium is defined as the homogeneous medium being at least one of:
      said dielectric medium having heterogeneousness of a linear size being smaller than one-tenth of the wavelength of the propagating wave; and
      an elastic medium, having a negligible viscosity;
    wherein a homogeneous poorly-permeable medium is defined as the homogeneous medium being at least one of:
      said dielectric medium having heterogeneousness of a linear size being smaller than the wavelength of the propagating wave and bigger than one-tenth of the wavelength of the propagating wave;
      said conductive medium; and
      said elastic medium;
  (d) an angle of incidence is defined as an angle between said ray and a normal to a surface, wherein said angle of incidence which equals zero is further called "the zero angle of incidence";
  (e) a generalized unclad waveguide is defined as a certain spatial wave-conveying corridor having:
    a shape of an elongated pipe having a substantially long length and a cross-section having a maximal cross-sectional linear size being at most small with respect to the substantially long length such that the substantially long length is longer than the maximal cross-sectional linear size by a factor of at least 10, and wherein the substantially long length having a claimed sense is longer than 10 cm;
    wherein said elongated pipe comprising:
      a core, being transparent for said waves, wherein said transparent core is made from a material, having a refractive index, applicable to ambient wave beams and being higher than the refractive index of ambient medium; and
      a butt-end being at least one of an interface butt-end and an outlet butt-end, wherein said butt-end being transparent for ambient wave beams; and
    an unclad transparent side shell bordering an elongated pipe along a substantially long length of the elongated pipe, wherein said unclad transparent side shell being characterized by jumping changes of an interference map pattern of beam of rays, namely, said unclad transparent side shell, in turn, being defined as a spatial boundary separating a portion of medium, being subjected to propagation of said beam of rays, from a portion of the medium, being free from the propagation of the beam of rays; wherein said unclad transparent side shell being at least one of:
      real solid walls being transparent for an ambient wave beam,
      imaginary walls of said certain spatial wave-conveying corridor being unclad, wherein said imaginary walls being formed by jumping changes of spatial physical parameters of medium of said certain spatial wave-conveying corridor with respect to the ambient medium, and imaginary walls, formed by superposition of wave portions of said beam of rays causing constructive-destructive interference and thereby resulting in said jumping changes of said beam of rays interference map pattern;

(f) a generalized unclad waveguide beam-maker is defined as the generalized unclad waveguide being supplied with a parabolic reflector, being at least one of interface and outlet and having an inner concave paraboloid arch-vault, having a concave profile of parabola in a sectional plane and being capable of reflection of rays, wherein the butt-end is located in a paraboloid's focus:

to parallelize the rays released from the butt-end, and
to direct the parallelized rays to an impacted surface at the zero angle of incidence,
when the antenna functioning in a receiving mode;
wherein the generalized unclad waveguide beam-maker is at least one of:

a dielectric waveguide beam-maker specified as an unclad wave-conveying corridor, called dielectric waveguide, comprising a dielectric core, being transparent for electromagnetic radiation, having a refractive index being higher than the refractive index of ambient medium, and being supplied with said parabolic reflector of electromagnetic waves;

an elastic waveguide beam-maker specified as an unclad wave-conveying corridor, called acoustic waveguide, comprising an elastic core, being transparent for an acoustic wave, having said refractive index being higher than the refractive index of the ambient medium, and being supplied with said parabolic reflector of acoustic waves; and an imaginary bordered uniform wave-conveying corridor, called a self-bordering elemental waveguide, comprising a portion of said parabolic reflector:

to form a spatial boundary separating a portion of medium, being subjected to propagation of a beam of rays along a sagittal axis perpendicular to the directrix of said parabola associated with said parabolic reflector, from a portion of the medium, being free from the propagation of the beam of rays; and thereby to become capable of conveying the beam of rays through homogeneous easily-permeable medium;

(g) a conveyed wave beam is defined as a beam of rays, propagating within a generalized unclad waveguide;

(h) a forcedly-conveying waveguide effect is defined as a phenomenon of wave propagation along a zig-zag path between two boundaries within a generalized unclad waveguide due to a phenomenon of total internal reflection in accordance with the Huygens-Fresnel principle;

(i) a self-focusing waveguide effect is defined for a propagating wave, being reflected from a parabolic reflector, as a phenomenon of reflected wave propagation along a sagittal axis perpendicular to a directrix of parabola associated with said parabolic reflector in accordance with the Huygens-Fresnel principle;

(j) a generalized waveguide effect is defined in a widen sense as superposition and thereby interference of wave beam portions in accordance with the Huygens-Fresnel principle of wave propagation thereby resulting in a tendency of wave beam propagation along and within a wave-conveying corridor, namely, the generalized waveguide effect is further specified as at least one of:

a forcedly-conveying waveguide effect, wherein the wave-conveying corridor being formed by a spatial boundary separating different materials, to provide for conditions of a total internal reflection of a conveyed wave beam; and the self-focusing waveguide effect, wherein the wave-conveying corridor being imaginary bordered by jumping changes of an interference map pattern of a beam of rays, namely, the wave-conveying corridor being formed by a spatial imaginary unclad transparent side shell separating between two portions of medium:

conveying, being subjected to propagation of said conveyed wave beam, and
ambient, being free from the propagation of the wave beam; and (k) a big number N is defined as at least 10;

wherein a sheaf of a multiplicity of generalized unclad waveguide beam-maker composed of the big number N of generalized unclad waveguide beam-makers is defined such that the big number N of the generalized unclad waveguides are densely-arranged near to each other such that the average distance between the nearest generalized unclad waveguides is at most of one-tenth of the average length of the generalized unclad waveguides;

wherein the sheaf of the big number N of the generalized unclad waveguide beam-makers is at least one of:

a multiplicity of the big number N of dielectric waveguide beam-makers bundled together, a multiplicity of the big number N of elastic waveguide beam-makers bundled together, and an imaginary bordered complicated wave-conveying corridor comprising a multiplicity of the big number N of the generalized unclad waveguide beam-makers, wherein each of the generalized unclad waveguides being specified as a self-bordering elemental waveguide having a parabolic reflector portion, wherein the said self-bordering elemental waveguides being divided between at least two groups associated with at least two groups of said parabolic reflector portions, correspondingly, wherein said at least two groups of the parabolic reflector portions differing in position of focal points of parabolas associated with said at least two groups of the parabolic reflector portions, correspondingly, to provide a spatial modulation of a beam of rays and, in turn, to provide an enhanced self-focusing waveguide effect, namely:

to provide anti-phase superposition resulting in destructive interference and thereby resulting in inter-compensation of wave portions being scattered and thereby reached a point outside the imaginary bordered complicated wave-conveying corridor, thereby to provide conditions for:
an effective suppression of the scattering of a propagating wave, and thereby
a conservation the propagating wave energy within the imaginary bordered complicated wave-conveying corridor, and thus,
to make the imaginary bordered complicated wave-conveying corridor be capable of conveying the beam of rays through homogeneous poorly-permeable medium.

2. A system for sunlight energy accumulation, comprising:
the improving shaped component for said antenna of claim 1, and
a detector of electromagnetic radiation, wherein said detector is at least one of:
a solar thermal collector capable of converting sunlight rays into warmth, and
a photovoltaic panel capable of converting sunlight rays into electricity due to the photovoltaic effect;
wherein:
an electromagnetic radiation is given off by the Sun as infrared, visible, and ultraviolet light;
said generalized unclad waveguides are unclad optical fibers; and
said impacted surface is a surface of an electromagnetic radiation detector being at least one of:
a solar thermal collector capable of converting sunlight rays to warmth, and
a photovoltaic panel capable of converting sunlight rays into electricity due to the photovoltaic effect.

3. The improving shaped component for an antenna of claim 1; wherein said generalized unclad waveguides are dielectric waveguides further comprising an implanted electro-conductive or super-conductive core.

4. A cloven antenna comprising two sub-antennas: first and second, wherein each of said two sub-antennas: first and second, comprising the improving shaped component for an antenna of claim 1 and a detector of electromagnetic radiation; wherein each of said generalized unclad waveguides having two interface butt-ends: first and second, and wherein each of said generalized unclad waveguide beam-makers belongs to both said two sub-antennas: first and second, correspondingly.

5. The improving shaped component for an antenna of claim 1; wherein each of said generalized unclad waveguide beam-makers comprising two said parabolic reflectors: interface and outlet, wherein:
each of said interface parabolic reflectors being faced to said impacted surface; and
each of said outlet parabolic reflectors being faced away from said emitting surface.

6. A directional antenna comprising the improving shaped component for an antenna of claim 5.

7. A solar sail comprising the improving shaped component for an antenna of claim 5;
wherein:
a sagittal axis of said solar sail is defined as an axis collinear to said solar sail tendentious motion direction, and
a frontal cross-section of said solar sail is defined as said solar sail's cross-section in a plane perpendicular to said sagittal axis;
a frontal cross-sectional area of said solar sail is defined as an area of said frontal cross-section of said solar sail;
wherein said impacted surface is a surface of said solar sail subjected to impact of electromagnetic radiation characterized by the Poynting vector, wherein said impacted surface is reflective for said electromagnetic radiation thereby redirecting the Poynting vector, thus, said electromagnetic radiation characterized by the Poynting vector providing a radiation pressure causing a mechanical thrust acting on said solar sail,
wherein a cumulative frontal cross-sectional area of all the outlet butt-end dishes is at least one of:
commensurate with the frontal cross-sectional area of said solar sail, and
many times less than the frontal cross-sectional area of said solar sail.

8. An acoustic sail comprising the improving shaped component for an antenna of claim 5;
wherein:
a sagittal axis of said acoustic sail is defined as an axis collinear to said acoustic sail tendentious motion direction,
a frontal cross-section of said acoustic sail is defined as said acoustic sail's cross-section in a plane perpendicular to said sagittal axis, and
a frontal cross-sectional area of said acoustic sail is defined as an area of said frontal cross-section of said acoustic sail;
wherein said impacted surface is a surface of said acoustic sail subjected to impact of an acoustic wave characterized by the Umov-Poynting vector, wherein said impacted surface is reflective for said acoustic wave, thus, said acoustic wave characterized by the Umov-Poynting vector providing an acoustic radiation pressure causing a mechanical thrust acting on said acoustic sail.

9. An acoustic antenna;
said acoustic antenna comprising the improving shaped component for an antenna of claim 1 and an acoustic detector, wherein said sheaf of a multiplicity of said generalized unclad waveguide beam-makers is submerged in ambient homogeneous fluid medium, comprising a source of acoustic signals and bringing said acoustic signals to said sheaf of a multiplicity of said generalized unclad waveguide beam-makers;
wherein said acoustic signals are at least one of:
sound waves, directly reaching from said source of acoustic signals on a direct path in a line of sight;
sound waves, reflected from a sound wave reflecting object; and
sound waves, scattered in said ambient homogeneous fluid medium.

10. A wave-guiding antenna comprising the improving shaped component for an antenna of claim 1;
wherein a set of interrelated terms being defined as follows:
(a) an ordinary antenna is defined as a shaped transducer designed to transmit, when operating in a transmission mode, and to receive, when operating in a receiving mode, waves propagating wirelessly through ambient medium; wherein said shaped transducer comprising:
an interface defined as at least one of:
an exit-directed interface transforming electrical signals generated by an electrical device;
an entrance-directed interface transforming electrical signals to control an electrical device;
a reincarnating transformer of wave-power defined as at least one of:

an emitter of said waves, when said ordinary antenna operating in said transmission mode, and
a detector of said waves, when said ordinary antenna operating in said receiving mode;
a feeder defined as a component at least one of:
conveying said electrical signals from said exit-directed interface to said emitter of said waves, when said ordinary antenna operating in said transmission mode, and
conveying said electrical signals from said detector to an entrance-directed interface, when said ordinary antenna operating in said receiving mode; and
said intermediate reflector further specified as a shaped mirror of said waves to provide that:
when said ordinary antenna operating in said transmission mode, said waves, launched by said emitter of said waves, are subjected to a reflection from said intermediate reflector to be redirected to a desired direction of propagation through said homogeneous medium, and
when said ordinary antenna operating in said receiving mode, said waves, arrived to said intermediate reflector, are subjected to a reflection from said intermediate reflector to be redirected to said detector of said waves;
(b) a forcedly-conveying wave-guiding antenna is defined as an ordinary antenna, further supplied with the improving shaped component for said antenna of claim 1; wherein said generalized unclad waveguide is a transparent refractive waveguide being at least one of: a dielectric waveguide and an acoustic waveguide; and
(c) a self-focusing wave-guiding antenna is defined as an ordinary antenna, further supplied with the improving shaped component for said antenna of claim 1, wherein said generalized unclad waveguide is a self-bordering elemental waveguide comprising a portion of said parabolic reflector;
wherein
said wave-guiding antenna is specified as at least one of:
a forcedly-conveying wave-guiding antenna; and
a self-focusing wave-guiding antenna.

11. A receiving cloven wave-guiding antenna comprising two wave-guiding antennas of claim 10, namely:
first forcedly-conveying wave-guiding antenna, and
second forcedly-conveying wave-guiding antenna;
wherein:
each of said generalized unclad waveguides having two interface butt-ends:
first and second;
each of said generalized unclad waveguides belongs to both said two forcedly-conveying wave-guiding antennas: first and second;
each of said two interface butt-ends: first and second, is supplied by an interface dish having said interface parabolic reflector at an inner concave arch-vault, shaped as a paraboloid to reflect rays, and
each of said two interface butt-ends: first and second, occupying the paraboloid's focus to parallelize said rays reflected from said interface parabolic reflector being faced to said impacted surface belonging to a detector of waves of one of the two forcedly-conveying wave-guiding antennas: first and second, correspondingly.

12. A directional wave-guiding antenna comprising a wave-guiding antenna of claim 10;
wherein said generalized unclad waveguides being transparent refractive waveguides being characterized by:
a substantially long length,
a maximal cross-sectional linear size of a cross-section, and
a refractive index being higher than the refractive index of ambient medium;
wherein said transparent refractive waveguides differ in at least one of said substantially long length, said cross-section, and said refractive index, thereby, providing for a tolerance of zig-zag path lengths of emitted sub-beams of an emitted wave beam, propagating within and along the generalized unclad waveguides, wherein the tolerance is at least of a half of wavelength of the conveyed wave beam to result in random varying of the zig-zag path lengths of said conveyed sub-beams of the conveyed wave beam and thereby to result in random distribution of phases of said emitted sub-beams of said emitted wave beam.

13. An enhanced directional wave-guiding antenna comprising a wave-guiding antenna of claim 10;
wherein:
a sagittal axis of said directional antenna is defined as an axis collinear to a prevalent direction of radiation of said directional antenna, and
a frontal cross-section of said directional antenna is defined as a portion of a plane perpendicular to said sagittal axis, wherein an emitted wave beam crosses the frontal cross-section of said directional antenna;
wherein said generalized unclad waveguides being transparent refractive waveguides being characterized by:
a substantially long length,
a maximal cross-sectional linear size of a cross-section, and
a refractive index being higher than the refractive index of ambient medium;
wherein said transparent refractive waveguides differ in at least one of said substantially long length, said cross-section, and said refractive index, thereby, providing for a variance of zig-zag path lengths of the conveyed sub-beams of said conveyed wave beam, propagating within and along the generalized unclad waveguides, wherein the variance is distributed in said frontal cross-section among the generalized unclad waveguides to provide that,
when emitted sub-beams of an emitted wave beam becoming subjected to scattering in homogeneous lossy medium thereby resulting in that portions of said emitted sub-beams of said emitted wave beam becoming reincarnated into scattered portions of said emitted sub-beams of said emitted wave beam, wherein the scattered portions comprise scattered sub-portions propagating in directions perpendicular to the sagittal axis,
a condition for standing waves origination within said frontal cross-section of said emitted wave beam in directions perpendicular to the sagittal axis is satisfied for the scattered sub-portions propagating in directions perpendicular to the sagittal axis, thereby causing an increased directivity of said enhanced directional antenna in the prevalent direction of radiation.

14. A cloven parabolic self-focusing antenna comprising a wave-guiding antenna of claim 10;
wherein each of said generalized unclad waveguides being a self-bordering elemental waveguide comprising a portion of said parabolic reflector;

wherein a set of interrelated terms being defined as follows:
(a) an interface is further specified as at least one of:
an exit-directed interface further specified as comprising:
a modulator of an electrical signal,
a splitter of said electrical signal,
an electronic component to implement a time-delay of said electrical signal, and
an electronic component to implement a phase manipulation of said electrical signal with a certain time-periodicity;
to divide said electrical signal between two anti-phased sub-signals: positive and negative, differing in a sign and in said time-delay on a half of the certain time-periodicity, when an ordinary antenna operating in a transmission mode; and
said entrance-directed interface further specified as comprising:
a demodulator of said electrical signal,
a combiner of sub-signals to form said electrical signal,
an electronic component to implement a time-delay of said electrical signal, and
an electronic component to implement a phase manipulation of said electrical signal with said certain time-periodicity;
to form said electrical signal from two anti-phased sub-signals: positive and negative, differing in a sign and in said time-delay on a half of the certain time-periodicity, when said ordinary antenna operating in said receiving mode;
(b) a closed ring-like shape is defined as a locus of points belonging to a portion of a plane, wherein the portion of the plane being bordered by two disjoint equidistantly-aligned closed curves, wherein each of said two disjoint equidistantly-aligned closed curves is at least one of a circle, an ellipse, and a close contour;
(c) a width of a closed ring-like shape is specified as the distance between two disjoint equidistantly-aligned closed curves;
(d) a unidirectionally-reflecting paraboloidal surface is defined as a concave surface, reflecting radiation incident upon said concave surface, wherein said concave surface is a locus of planar parabolically-curved contour fragments, wherein each of said planar parabolically-curved contour fragments being characterized by:
a vertex point,
a focal point,
a focal distance, defined by distance between the vertex point and the focal point,
a sagittal axis, defined as an axis parallel to the straight line connecting the vertex point to the focal point,
a frontal plane, defined as a plane perpendicular to said sagittal axis, and
a cumulative distance along said sagittal axis, defined as the sum of the focal distance and the distance between the focal point and said frontal plane;
wherein the locus of planar parabolically-curved contour fragments being associated with a locus of the focal points wherein the locus of the focal points being a continuous curve of focuses, and wherein all the cumulative distances, corresponding to said planar parabolically-curved contour fragments belonging to the unidirectionally-reflecting paraboloidal surface and corresponding to the same said frontal plane, are identical; and wherein the unidirectionally-reflecting paraboloidal surface being a concave side of at least one of:
a paraboloidal dish, and
a complete toroidal parabolic trough,
composed of said portions of said parabolic reflector,
(e) a cylindrical-like shape is defined as a spatial locus of lines parallel to a sagittal axis perpendicular to a frontal plane, wherein a cross-section of a spatial locus in any said frontal plane is a connected surface having a closed ring-like shape;
(f) a parabolic sub-antenna of waves is defined as an ordinary antenna, wherein:
said intermediate reflector of said waves comprising a unidirectionally-reflecting paraboloidal surface composed of portions of said parabolic reflector associated with self-bordering elemental waveguides, wherein a projection of the unidirectionally-reflecting paraboloidal surface to a frontal plane has a closed ring-like shape; and
said reincarnating transformer of wave-power being located at the continuous curve of focuses, corresponding to a unidirectionally-reflecting paraboloidal surface of said intermediate reflector of said waves, and wherein the reincarnating transformer of wave-power electrically-contacting with an interface, thereby allowing:
to derive an electrical signal released from an exit-directed interface to an emitter of said waves, when said ordinary antenna operating in a transmission mode; and
to derive an electrical signal released from a detector of said waves to an entrance-directed interface, when said ordinary antenna operating in a receiving mode;
thereby, when said parabolic sub-antenna of waves being submerged in a homogeneous easily-permeable medium and operating in a transmission mode, to satisfy the condition for said rays, originally radiated by said emitter of waves and further reflected by said intermediate reflector of waves, to become parallelized and directed along a sagittal axis and within an imaginary corridor having a cylindrical-like shape characterized by an invariable cross-section with a closed ring-like shape in said frontal plane;
(g) a modulated signal is specified as a kind of power incarnated and reincarnated as follows:
an electrical signal being modulated in and released from an exit-directed interface;
a wave originally being modulated and radiated from an emitter of waves of a parabolic sub-antenna and further propagating in a homogeneous poorly-permeable medium;
modulated scattered waves further propagating in said homogeneous poorly-permeable medium in all directions and so having a traverse-scattered component propagating in a direction perpendicular to a sagittal axis;
(h) the mean line of a closed ring-like shape is defined as a closed curve in a frontal plane, wherein said closed curve being the locus of points equidistant from two disjoint equidistantly-aligned closed curves;
(i) a specific characteristic length is defined as a path length which a modulated wave propagates in a homogeneous poorly-permeable medium for a certain time-periodicity; and (j) an imaginary combined corridor is defined as an integration of the two imaginary corridors: insular and cladding; said imaginary combined corridor comprising both: said insular and said cladding imaginary corridors, and thereby having a cylindrical-like shape characterized by an invariable cross-section with a closed ring-like shape in a frontal plane and so having a combined cross-section characterized by width of said closed ring-like shape equal to the specific characteristic length;

wherein:

said self-focusing wave-guiding antenna comprising an interface and two parabolic sub-antennas, further called: "insular" and "cladding", being mutually-adjacently-aligned, arranged, and oriented to have a common sagittal axis;

each of said insular and cladding parabolic sub-antennas having:
a unidirectionally-reflecting paraboloidal surface, called insular and cladding, correspondingly;
a reincarnating transformer of wave-power, called insular and cladding, correspondingly; and
an intermediate reflector of waves, called insular and cladding, correspondingly, being composed of one of at least two groups of parabolic reflector portions; one of the at least two groups of said parabolic reflector portions: called insular and cladding, correspondingly;

said insular and cladding mutually-adjacently-aligned parabolic sub-antennas being inter-scaled to satisfy the condition for the mean lines of closed ring-like shapes corresponding to two closed cross-sections of imaginary corridors: insular and cladding, correspondingly, to be distanced on a half of the specific characteristic length in a cross-sectional plane;

said insular and said cladding reincarnating transformers of wave-power being anti-phased:
to radiate, when an ordinary antenna operating in a transmission mode, and
to detect, when said ordinary antenna operating in a receiving mode, and said modulated signal being divided between two antiphased sub-signals: positive and negative, being at least one of:
released from an exit-directed interface, conveyed to insular and cladding emitters, correspondingly, to become reincarnated as two differing in sign waves, further called "insular" and "cladding", correspondingly, when said ordinary antenna operating in said transmission mode; and
reincarnated from insular and cladding waves into insular and cladding electrical signals, correspondingly, to be conveyed from insular and cladding detectors to an entrance-directed interface, when said ordinary antenna operating in said receiving mode;

thereby, when said self-focusing wave-guiding antenna operating in said transmission mode, said insular and cladding intermediate reflectors of waves, parallelizing and directing said insular and cladding modulated waves, correspondingly; thus, said insular and cladding waves, both being parallelized and directed to have unison tendencies:
to be coaxially-propagating along the common sagittal axis and within said imaginary corridors, insular and cladding, correspondingly, in a homogeneous poorly-permeable medium having a property of at least one of:
a dielectric medium, and
an elastic medium; and
to become partially reincarnating into scattered waves, insular and cladding, correspondingly, being modulated and propagating in directions perpendicular to the common sagittal axis as said homogeneous poorly-permeable medium having a property of at least one of:
a conductive medium, and
a viscous medium;

thereby, said coaxially-propagating insular and cladding modulated waves and said scattered insular and cladding modulated waves, both having an identical modulation with a certain time-periodicity, but differing in sign, in time-delay, and in spatial location of the sources of waves; and wherein interrelated said time-delay and said spatial location being chosen for each of said insular and cladding emitters of waves to be subjected to reflection from said at least two groups of said parabolic reflector portions: insular and cladding, associated with at least two groups of self-bordering elemental waveguides, called insular and cladding, correspondingly, such that said coaxially-propagating insular and cladding modulated waves reaching a frontal plane with a path difference corresponding to a half of the certain time-periodicity to satisfy the condition for traverse-scattered insular and cladding modulated waves, propagating together and being superposed, to be inter-compensated outside of an imaginary combined corridor and thereby to satisfy the condition for said coaxially-propagating insular and cladding modulated waves, propagating together and being superposed, to become self-wave-guiding within said imaginary combined corridor, thus, to form an interrogation signal being self-wave-guiding.

15. A method for use of an improving shaped component for an antenna to focus wave energy when said antenna functioning in a mode being at least one of:
a receiving mode for wave energy absorption, and
a transmission mode for wave energy directional transportation;

wherein said method comprising conceptual implementation steps, namely:
when said antenna, being wide-directional, operating in the receiving mode, exposition of a sheaf of a multiplicity of a generalized unclad waveguide beam-makers as a whole to ambient wave beams, wherein:

said sheaf of said multiplicity of said generalized unclad waveguide beam-makers is composed of a big number N of said generalized unclad waveguide beam-makers, wherein each of said generalized unclad waveguide beam-makers, in turn, is composed of a generalized unclad waveguide and a parabolic reflector, being at least one of interface and outlet, and ambient wave beams yet to be subjected to a generalized waveguide effect, at an arbitrary angle of incidence to allow for a penetration of said ambient wave beams into said sheaf of said multiplicity of said generalized unclad waveguide beam-makers across unclad transparent side shells of the big number N of said generalized unclad waveguides and through said generalized unclad waveguides thereby subjecting said ambient wave beams to partial refraction within each of said generalized unclad waveguides so resulting in scattering a portion of wave energy, brought by said ambient wave beams, among the big number N of said generalized unclad waveguides multi-stage repeatedly, to provide that each of said generalized unclad waveguides of said sheaf entrapping at least a sub-potion of the wave energy portion, brought by said ambient wave beams, due to the effect of total internal reflection, thereby, providing conditions to redirect and convey the sub-potions of the wave energy portion, brought by the ambient wave beams becoming reincarnated into conveyed wave beams, to said at least one interface butt-end faced to an impacted surface due to the generalized waveguide effect;

thereby, resulting in:
scattering a portion of wave energy, brought by said ambient wave beams, among the big number N of said waveguides multi-stage repeatedly,
catching the ambient wave beams, penetrated into cores of said generalized unclad waveguides through unclad side shells of elongated pipes, by the sheaf of the multiplicity of the generalized unclad waveguide beam-makers due to at least one of:
  a phenomenon of partial internal reflection, and
  a phenomenon of total internal reflection,
both occurred within the generalized unclad waveguides to provide that each of said generalized unclad waveguides entrapping at least a sub-potion of the wave energy portion, brought by said ambient wave beams, due to the effect of total internal reflection and the generalized waveguide effect; thereby;
providing conditions to redirect and convey the sub-potions of the wave energy portion, brought by the ambient wave beams, to said interface butt-end located in a focus of parabola of a reflecting arch-vault faced to said impacted surface;
parallelizing the conveyed wave beams as a result of reflection of waves, released through the interface butt-end, from the reflecting arch-vault;
directing of the parallelized ambient wave beams to the impacted surface of the wave beams detecting antenna at the zero angle of incidence, wherein the directing is at least one of:
  along a line of sight,
  by a use of a focusing or defocusing mirror, and
  by a use of a focusing or defocusing lens; and
absorbing the wave beams energy and thereby detecting the wave beams, released from the interface butt-end, by a detector of wave beams; and
when said antenna, being narrow-directional and being submerged in a homogeneous poorly-permeable medium to operate in the transmitting mode,
orientation of said sheaf of the multiplicity of said generalized unclad waveguide beam-makers, wherein each of said generalized unclad waveguide beam-makers, having a portion of said parabolic reflector, comprising an outlet butt-end located in the focus of said outlet parabolic reflector having an arch-vault faced away from an emitting surface to direct and convey emitted wave beams to a receiving antenna due to an enhanced self-focusing waveguide effect;
wherein a set of interrelated terms being defined as follows:
(a) an angle of incidence is defined as an angle between a ray and a normal to a surface, wherein said angle of incidence which equals zero is further called "the zero angle of incidence";
(b) a generalized waveguide effect is defined in a widen sense as superposition and thereby interference of wave beam portions in accordance with the Huygens-Fresnel principle of wave propagation thereby resulting in a tendency of wave beam propagation along and within a wave-conveying corridor;
(c) a generalized unclad waveguide is defined as a certain spatial wave-conveying corridor having:
  a shape of an elongated pipe having a substantially long length and a cross-section having the maximal cross-sectional linear size being at most small with respect to the substantially long length such that the substantially long length is longer than a maximal cross-sectional linear size by a factor of at least 10, and wherein the substantially long length having a claimed sense is longer than 10 cm;
  wherein said elongated pipe comprising:
    a core, being transparent for waves, wherein said transparent core is made from a material, having a refractive index, applicable to ambient wave beams and being higher than a refractive index of ambient medium; and
    a butt-end being at least one of an interface butt-end and an outlet butt-end, wherein said butt-end being transparent for said ambient wave beams; and
  an unclad transparent side shell bordering the elongated pipe along the elongated pipe substantially long length, wherein said unclad transparent side shell being characterized by jumping changes of interference map of a beam of rays, namely, said unclad transparent side shell, in turn, being defined as a spatial boundary separating a portion of medium, being subjected to propagation of said beam of rays, from a portion of the medium, being free from the propagation of the beam of rays; wherein said unclad transparent side shell being at least one of:
    real solid walls being transparent for an ambient wave beam,
    imaginary walls of said certain spatial wave-conveying corridor being unclad, wherein said imaginary walls being formed by jumping changes of spatial physical parameters of medium of said certain spatial wave-conveying corridor with respect to the ambient medium, and
    imaginary walls, formed by superposition of wave portions of said beam of rays causing constructive-destructive interference and thereby resulting in said jumping changes of interference map pattern of said beam of rays;
(d) a generalized unclad waveguide beam-maker is defined as the generalized unclad waveguide being supplied with a parabolic reflector, being at least one of interface and outlet and having an inner concave paraboloid arch-vault capable of reflection of rays, wherein the butt-end is located in a focus of parabola of the paraboloid arch-vault:
  to parallelize the rays released from the butt-end, and
  to direct the parallelized rays to an impacted surface at the zero angle of incidence,
when the antenna functioning in a receiving mode;
wherein the generalized unclad waveguide beam-maker is at least one of:
  a dielectric waveguide beam-maker specified as an unclad wave-conveying corridor, called dielectric waveguide, comprising a dielectric core, being transparent for electromagnetic radiation, having a refractive index being higher than the refractive index of the ambient medium, and being supplied with a parabolic reflector of electromagnetic waves;

an elastic waveguide beam-maker specified as an unclad wave-conveying corridor, called acoustic waveguide, comprising an elastic core, being transparent for acoustic wave, having a refractive index being higher than the refractive index of the ambient medium, and being supplied with a parabolic reflector of acoustic waves; and an imaginary bordered uniform wave-conveying corridor, called a self-bordering elemental waveguide, comprising a portion of a parabolic reflector:
to form a spatial boundary separating a portion of medium, being subjected to propagation of said beam of rays along a sagittal axis perpendicular to the directrix of parabola associated with said parabolic reflector, from a portion of the medium, being free from the propagation of the beam of rays; and thereby
to become capable of conveying the beam of rays through a homogeneous easily-permeable medium;

(e) a big number N is defined as at least 10;
wherein a sheaf of a multiplicity of generalized unclad waveguide beam-makers composed of the big number N of the generalized unclad waveguide beam-makers is defined as such that the big number N of the generalized unclad waveguides are densely-arranged near to each other such that the average distance between the nearest generalized unclad waveguides is at most of one-tenth of the average length of the generalized unclad waveguides;
wherein the sheaf of the multiplicity of the generalized unclad waveguide beam-makers is at least one of:
a multiplicity of the big number N of dielectric waveguide beam-makers bundled together,
a multiplicity of the big number N of the elastic waveguide beam-makers bundled together, and
an imaginary bordered complicated wave-conveying corridor comprising a multiplicity of the big number N of said generalized unclad waveguide beam-makers, wherein each of the generalized unclad waveguides being specified as a self-bordering elemental waveguide having a portion of said parabolic reflector, wherein the said self-bordering elemental waveguides being divided between at least two groups associated with at least two groups of said parabolic reflector portions, correspondingly, wherein said at least two groups of the parabolic reflector portions differing in position of focal points of parabolas associated with said at least two groups of the parabolic reflector portions, correspondingly, to provide a spatial modulation of a beam of rays and, in turn, to provide an enhanced self-focusing waveguide effect, namely:
to provide anti-phase superposition resulting in destructive interference and thereby resulting in inter-compensation of wave portions being scattered and thereby reached a point outside the imaginary bordered complicated wave-conveying corridor, thereby
to provide conditions for:
an effective suppression of scattering of a propagating wave, and thereby
a conservation the propagating wave energy within the imaginary bordered complicated wave-conveying corridor, and thus,
to make the imaginary bordered complicated wave-conveying corridor be capable of conveying the beam of rays, further called a conveyed wave beam, through a homogeneous poorly-permeable medium;

(f) an improving shaped component for an antenna is defined as a component comprising:
a surface at least one of:
being subjected to impact by a conveyed wave beam, further called an impacted surface, when said antenna operating in a receiving mode; and
emitting said conveyed wave beam, further called an emitting surface, when said antenna operating in a transmitting mode; and
said sheaf of said multiplicity of said generalized unclad waveguide beam-makers to be submerged in ambient medium and oriented to provide that at least one of:
each of interface butt-ends of the big number N of said generalized unclad waveguides being supplied with said interface parabolic reflector becoming faced to at least one of:
said impacted surface, and
said emitting surface; and
each of the outlet butt-ends of the big number N of said generalized unclad waveguides being supplied with said outlet parabolic reflector becoming faced away from at least one of:
said impacted surface, and
said emitting surface.

* * * * *